US010210568B2

(12) United States Patent
Lian et al.

(10) Patent No.: US 10,210,568 B2
(45) Date of Patent: Feb. 19, 2019

(54) COORDINATION OF THERMOSTATICALLY CONTROLLED LOADS WITH UNKNOWN PARAMETERS

(71) Applicant: Battelle Memorial Institute, Richland, WA (US)

(72) Inventors: Jianming Lian, Richland, WA (US); Karanjit Kalsi, Richland, WA (US); Sen Li, Columbus, OH (US); Wei Zhang, Columbus, OH (US)

(73) Assignees: Battelle Memorial Institute, Richland, WA (US); Ohio State Innovation Foundation, Columbus, OH (US)

( * ) Notice: Subject to any disclaimer, the term of this patent is extended or adjusted under 35 U.S.C. 154(b) by 523 days.

(21) Appl. No.: 14/866,457

(22) Filed: Sep. 25, 2015

(65) Prior Publication Data

US 2016/0092986 A1    Mar. 31, 2016

Related U.S. Application Data

(60) Provisional application No. 62/056,221, filed on Sep. 26, 2014, provisional application No. 62/056,212, filed on Sep. 26, 2014.

(51) Int. Cl.
*G06Q 30/08* (2012.01)
*G06Q 50/06* (2012.01)
(Continued)

(52) U.S. Cl.
CPC ........ *G06Q 30/08* (2013.01); *G05B 13/041* (2013.01); *G06N 7/005* (2013.01); *G06Q 40/04* (2013.01);
(Continued)

(58) Field of Classification Search
CPC .......... G06Q 50/06; G05B 2219/45031; H01L 22/20
(Continued)

(56) References Cited

U.S. PATENT DOCUMENTS 4,010,614 A    3/1977 Arthur
5,572,438 A    11/1996 Ehlers et al.
(Continued)

OTHER PUBLICATIONS

AEP gridSmart demonstration project, Available: http://www.gridsmartohio.com/, Aug. 2013, 1 page.
(Continued)

*Primary Examiner* — Michael Rutland Wallis
(74) *Attorney, Agent, or Firm* — Klarquist Sparkman, LLP

(57) ABSTRACT

Apparatus and methods are disclosed for coordination of a population of Thermostatically Controlled Loads (TCLs) with unknown parameters to achieve group objectives including bidding and market clearing strategies designed to motivate self-interested users to realize efficient energy allocation subject to a peak power constraint. In one examples of the disclosed technology, a method of operating a load includes estimating a set of values for unmeasured parameters of the load's thermal environment based on output measurements of the thermal environment, determining an energy response based on the estimated set of values for the unmeasured parameters, and transmitting a bid for power for a finite time period based on the determined energy response to the coordinator. A clearing price is received from the coordinator responsive to the transmitted bid and power is sent to the load responsive to the received clearing price.

22 Claims, 21 Drawing Sheets

(51) Int. Cl.
*G05B 13/04* (2006.01)
*G06N 7/00* (2006.01)
*G06Q 40/04* (2012.01)
*H02J 3/14* (2006.01)

(52) U.S. Cl.
CPC .............. *G06Q 50/06* (2013.01); *H02J 3/14* (2013.01); *Y04S 10/58* (2013.01); *Y04S 50/10* (2013.01)

(58) Field of Classification Search
USPC ........................................ 700/121, 286, 291
See application file for complete search history.

(56) References Cited

U.S. PATENT DOCUMENTS

| | | | |
|---|---|---|---|
| 5,684,710 A | 11/1997 | Ehlers et al. | |
| 5,696,695 A | 12/1997 | Ehlers et al. | |
| 5,924,486 A | 7/1999 | Ehlers et al. | |
| 6,216,956 B1 | 4/2001 | Ehlers et al. | |
| 6,343,277 B1 | 1/2002 | Gaus et al. | |
| 6,633,823 B2 | 10/2003 | Bartone et al. | |
| 6,681,156 B1 | 1/2004 | Weiss | |
| 6,895,325 B1 | 5/2005 | Munson, Jr. | |
| 6,963,854 B1 | 11/2005 | Boyd et al. | |
| 7,043,380 B2 | 5/2006 | Rodenberg et al. | |
| 7,085,739 B1 | 8/2006 | Winter et al. | |
| 7,130,719 B2 | 10/2006 | Ehlers et al. | |
| 7,135,956 B2 | 11/2006 | Bartone et al. | |
| 7,141,321 B2 | 11/2006 | McArthur et al. | |
| 7,243,044 B2 | 7/2007 | McCalla | |
| 7,249,169 B2 | 7/2007 | Blouin et al. | |
| 7,343,226 B2 | 3/2008 | Ehlers et al. | |
| 7,343,360 B1 | 3/2008 | Ristanovic et al. | |
| 7,379,997 B2 | 5/2008 | Ehlers et al. | |
| 7,418,428 B2 | 8/2008 | Ehlers et al. | |
| 7,516,106 B2 | 4/2009 | Ehlers et al. | |
| 7,599,866 B2 | 10/2009 | Yan et al. | |
| 7,716,101 B2 | 5/2010 | Sandholm et al. | |
| 7,953,519 B2 | 5/2011 | Hamilton, II et al. | |
| 7,996,296 B2 | 8/2011 | Lange | |
| 8,126,794 B2 | 2/2012 | Lange et al. | |
| 8,271,345 B1 | 9/2012 | Milgrom et al. | |
| 8,355,827 B2 * | 1/2013 | Egnor ................... | G06Q 50/06 700/291 |
| 8,478,452 B2 | 7/2013 | Pratt et al. | |
| 8,504,463 B2 | 8/2013 | Johnson et al. | |
| 8,527,389 B2 | 9/2013 | Johnson et al. | |
| 8,577,778 B2 | 11/2013 | Lange et al. | |
| 8,639,392 B2 | 1/2014 | Chassin | |
| 8,694,409 B2 | 4/2014 | Chassin et al. | |
| 8,700,225 B2 | 4/2014 | Pratt et al. | |
| 8,706,650 B2 * | 4/2014 | Ozog ................... | G06Q 10/06 705/412 |
| 8,788,415 B2 | 7/2014 | Chassin et al. | |
| 8,892,264 B2 * | 11/2014 | Steven ................... | G06Q 50/06 700/286 |
| 9,026,473 B2 | 5/2015 | Chassin et al. | |
| 9,087,359 B2 | 7/2015 | Chassin | |
| 9,094,385 B2 | 7/2015 | Akyol et al. | |
| 9,129,337 B2 | 9/2015 | Chassin et al. | |
| 9,240,026 B2 | 1/2016 | Chassin et al. | |
| 9,245,297 B2 | 1/2016 | Chassin et al. | |
| 9,269,108 B2 | 2/2016 | Chassin et al. | |
| 9,342,850 B2 | 5/2016 | Chassin et al. | |
| 9,425,620 B2 | 8/2016 | Chassin et al. | |
| 9,589,297 B2 | 3/2017 | Fuller et al. | |
| 9,817,375 B2 * | 11/2017 | Li .......................... | G05B 13/04 |
| 2001/0032029 A1 | 10/2001 | Kauffman | |
| 2002/0038279 A1 | 3/2002 | Samuelson et al. | |
| 2002/0091626 A1 | 7/2002 | Johnson et al. | |
| 2002/0128747 A1 | 9/2002 | Mima | |
| 2002/0132144 A1 | 9/2002 | McArthur et al. | |
| 2002/0178047 A1 | 11/2002 | Or et al. | |
| 2003/0014379 A1 | 1/2003 | Saias et al. | |
| 2003/0023540 A2 | 1/2003 | Johnson et al. | |
| 2003/0036820 A1 | 2/2003 | Yellepeddy et al. | |
| 2003/0040844 A1 | 2/2003 | Spool et al. | |
| 2003/0040845 A1 | 2/2003 | Spool et al. | |
| 2003/0041002 A1 | 2/2003 | Hao et al. | |
| 2003/0041016 A1 | 2/2003 | Spool et al. | |
| 2003/0041017 A1 | 2/2003 | Spool et al. | |
| 2003/0055774 A1 | 3/2003 | Ginsberg | |
| 2003/0078797 A1 | 4/2003 | Kanbara et al. | |
| 2003/0093332 A1 | 5/2003 | Spool et al. | |
| 2003/0093357 A1 | 5/2003 | Guler et al. | |
| 2003/0139939 A1 | 7/2003 | Spool et al. | |
| 2003/0144864 A1 | 7/2003 | Mazzarella | |
| 2003/0149672 A1 | 8/2003 | Laskoski | |
| 2003/0216971 A1 | 11/2003 | Sick et al. | |
| 2004/0010478 A1 | 1/2004 | Peljto et al. | |
| 2004/0024483 A1 | 2/2004 | Holcombe | |
| 2004/0128266 A1 | 7/2004 | Yellepeddy et al. | |
| 2004/0133529 A1 | 7/2004 | Munster | |
| 2004/0140908 A1 | 7/2004 | Gladwin et al. | |
| 2004/0153330 A1 | 8/2004 | Miller et al. | |
| 2004/0254688 A1 | 12/2004 | Chassin et al. | |
| 2005/0015283 A1 | 1/2005 | Iino et al. | |
| 2005/0027636 A1 | 2/2005 | Gilbert et al. | |
| 2005/0065867 A1 | 3/2005 | Aisu et al. | |
| 2005/0114255 A1 | 5/2005 | Shields et al. | |
| 2005/0125243 A1 | 6/2005 | Villalobos | |
| 2005/0137959 A1 | 6/2005 | Yan et al. | |
| 2005/0197875 A1 | 9/2005 | Kauffman | |
| 2005/0228553 A1 | 10/2005 | Tryon | |
| 2006/0036357 A1 | 2/2006 | Isono et al. | |
| 2006/0241951 A1 | 10/2006 | Cynamom et al. | |
| 2006/0259199 A1 | 11/2006 | Gjerde et al. | |
| 2006/0293980 A1 | 12/2006 | Corby et al. | |
| 2007/0011080 A1 | 1/2007 | Jain et al. | |
| 2007/0061248 A1 | 3/2007 | Shavit et al. | |
| 2007/0087756 A1 | 4/2007 | Hoffberg | |
| 2007/0124026 A1 | 5/2007 | Troxell et al. | |
| 2008/0021628 A1 | 1/2008 | Tryon | |
| 2008/0027639 A1 | 1/2008 | Tryon | |
| 2008/0039980 A1 | 2/2008 | Pollack et al. | |
| 2008/0046387 A1 | 2/2008 | Gopal et al. | |
| 2008/0051977 A1 | 2/2008 | Tryon | |
| 2008/0243664 A1 | 10/2008 | Shavit et al. | |
| 2008/0243682 A1 | 10/2008 | Shavit et al. | |
| 2008/0243719 A1 | 10/2008 | Shavit et al. | |
| 2008/0297113 A1 | 12/2008 | Saeki et al. | |
| 2008/0300907 A1 | 12/2008 | Musier et al. | |
| 2008/0300935 A1 | 12/2008 | Musier et al. | |
| 2008/0306801 A1 | 12/2008 | Musier et al. | |
| 2008/0319893 A1 | 12/2008 | Mashinsky et al. | |
| 2009/0063228 A1 | 3/2009 | Forbes | |
| 2009/0132360 A1 | 5/2009 | Arfin et al. | |
| 2009/0177591 A1 | 7/2009 | Thorpe et al. | |
| 2009/0195349 A1 | 8/2009 | Frader-Thompson et al. | |
| 2009/0228151 A1 | 9/2009 | Wang et al. | |
| 2009/0307059 A1 | 12/2009 | Young et al. | |
| 2009/0313174 A1 | 12/2009 | Hafner et al. | |
| 2010/0010939 A1 | 1/2010 | Arfin et al. | |
| 2010/0049371 A1 | 2/2010 | Martin | |
| 2010/0057625 A1 | 3/2010 | Boss et al. | |
| 2010/0076835 A1 * | 3/2010 | Silverman .............. | G06Q 10/06 705/14.33 |
| 2010/0106332 A1 | 4/2010 | Chassin et al. | |
| 2010/0106641 A1 | 4/2010 | Chassin et al. | |
| 2010/0107173 A1 | 4/2010 | Chassin | |
| 2010/0114387 A1 | 5/2010 | Chassin | |
| 2010/0121700 A1 | 5/2010 | Wigder et al. | |
| 2010/0179862 A1 | 7/2010 | Pratt et al. | |
| 2010/0216545 A1 | 8/2010 | Lange et al. | |
| 2010/0217550 A1 | 8/2010 | Crabtree et al. | |
| 2010/0218108 A1 | 8/2010 | Crabtree et al. | |
| 2010/0256999 A1 | 10/2010 | Ghani et al. | |
| 2010/0332373 A1 | 12/2010 | Crabtree et al. | |
| 2011/0015801 A1 | 1/2011 | Mazzarella | |
| 2011/0016055 A1 | 1/2011 | Mazzarella | |
| 2011/0081955 A1 | 4/2011 | Lange et al. | |
| 2011/0301964 A1 | 12/2011 | Conwell | |
| 2012/0022995 A1 | 1/2012 | Lange | |

(56) References Cited

U.S. PATENT DOCUMENTS

| | | |
|---|---|---|
| 2012/0083930 A1 | 4/2012 | Ilic et al. |
| 2012/0278220 A1 | 11/2012 | Chassin et al. |
| 2012/0278221 A1 | 11/2012 | Fuller et al. |
| 2013/0218743 A1 | 8/2013 | Chassin et al. |
| 2013/0218744 A1 | 8/2013 | Chassin et al. |
| 2013/0254090 A1 | 9/2013 | Chassin et al. |
| 2013/0268132 A1 | 10/2013 | Pratt et al. |
| 2013/0325691 A1 | 12/2013 | Chassin et al. |
| 2013/0325692 A1 | 12/2013 | Chassin et al. |
| 2014/0172503 A1 | 6/2014 | Hammerstrom et al. |
| 2014/0188689 A1 | 7/2014 | Kalsi et al. |
| 2014/0201018 A1 | 7/2014 | Chassin |
| 2016/0092978 A1 | 3/2016 | Lian et al. |

OTHER PUBLICATIONS

AEP Ohio power company standard tariff, Available: https://www.aepohio.com/account/bills/rates/AEPOhioRatesTariffsOH.aspx, Issued: Aug. 28, 2015, 187 pages.

Allcott, "Real Time Pricing and Electricity Markets," Harvard University, Feb. 5, 2009, 77 pages.

Basar, Lecture Notes on Noncooperative Game Theory, Jul. 26, 2010, 142 pages.

Bilgin et al., "Smart building real time pricing for offering load-side regulation service reserves," In 52nd IEEE Conference on Decision and Control, pp. 4341-4348, 2013.

Bishop et al., "Pattern recognition and machine learning," vol. 1, Springer, New York, 2006, 703 pages.

Borenstein et al., "Diagnosing Market Power in California's Deregulated Wholesale Electricity Market," University of California Energy Institute, POWER, PWP-064, 54 pp. (Aug. 2000).

Borenstein et al., "Diagnosing Market Power in California's Deregulated Wholesale Electricity Market," University of California Energy Institute, POWER, PWP-064, 52 pp. (Mar. 2000).

Borenstein et al., "Dynamic Pricing, Advanced Metering, and Demand Response in Electricity Markets," Center for the Study of Energy Markets, 2002, 103 pages.

Boyd et al., "Load Reduction, Demand Response, and Energy Efficient Technologies and Strategies," Pacific Northwest National Laboratory PNNL-18111, 44 pp. (Nov. 2008).

Brambley, "Thinking Ahead: Autonomic Buildings," ACEEE Summer Study on the Energy Efficiency in Buildings, vol. 7, pp. 73-86 (2002).

Burke et al., "Robust Control of Residential Demand Response Network with Low Bandwidth Input," In Proceedings of Dynamic Systems and Control Conference, American Society of Mechanical Engineers, pp. 413-415, Oct. 20-22, 2008.

Cai et al., "Economic Dispatch in Microgrids Using Multi-Agent System," In North American Power Grid Symposium (NAPS), Sep. 2012, 5 pages.

Chandley, "How RTOs Set Spot Market Prices (And How It Helps Keep the Lights On)," PJM Interconnection, 23 pp. (Sep. 2007).

Chang et al., "Modeling and Control of Aggregated Air Conditioning Loads Under Realistic Conditions," 2013 IEEE PES Innovative Smart Grid Technologies (ISGT), Feb. 2013, 6 pages.

Chao, "Price-Responsive Demand Management for a Smart Grid World," The Electricity Journal, vol. 23, No. 1, Jan. 2010, pp. 7-20.

Chassin, "The Abstract Machine Model for Transaction-based System Control," Pacific Northwest National Laboratory PNNL-14082, 28 pp. (Nov. 2002).

Chassin et al., "Decentralized Coordination through Digital Technology, Dynamic Pricing, and Customer-Driven Control: The GridWise Testbed Demonstration Project," The Electricity Journal, vol. 21, pp. 51-59 (Oct. 2008).

Chassin et al., "Gauss-Seidel Accelerated: Implementing Flow Solvers on Field Programmable Gate Arrays," IEEE Power Engineering Society General Meeting, 5 pp. (Jun. 2006).

Chassin et al., "GridLAB-D: An Open-source Power Systems Modeling and Simulation Environment," In IEEE Transmission and Distribution Conference and Exposition, Aug. 2008, 5 pages.

Chassin, "GridLAB-D Technical Support Document: Tape Modules Version 1.0," Pacific Northwest National Laboratory PNNL-17614, 8 pp. (May 2008).

Chassin, "GridLAB-D Technical Support Document: Commercial Modules Version 1.0," Pacific Northwest National Laboratory PNNL-17615, 8 pp. (May 2008).

Chassin, "GridLAB-D Technical Support Document: Network Module Version 1.0," Pacific Northwest National Laboratory PNNL-17616, 10 pp. (May 2008).

Chassin et al., "Modeling Power Systems as Complex Adaptive Systems," Pacific Northwest National Laboratory PNNL-14987, 151 pp. (Dec. 2004).

Chassin et al., "The pacific northwest demand response market demonstration," IEEE, 6 pp. (Jul. 2008).

Chassin et al., "Project 2.6—Enhancement of the Whole-Building Diagnostician," Pacific Northwest National Laboratory PNNL-14383, 17 pp. (Aug. 2003).

Chassin, "Statistical Mechanics: A Possible Model for Market-based Electric Power Control", Proc. of the 37th Hawaii Int'l Conf. on System Sciences, 10 pp. (Jan. 2004).

Chen et al., "The Influence of Topology Changes on Inter-area Oscillation Modes and Mode Shapes," IEEE Power and Energy Society General Meeting, 7 pp. (Jul. 2011).

Chen et al., "Real-time power control of data centers for providing regulation service," In 52nd IEEE Conference on Decision and Control, Dec. 10-13, 2013, pp. 4314-4321.

Chen et al., "Two Market Models for Demand Response in Power Networks," In Proceedings of 2010 First IEEE International Conference on Smart Grid Communications (SmartGridComm), Oct. 4-6, 2010, pp. 397-402.

Clearwater et al., "Thermal Markets for Controlling Building Environments," Energy Engineering, vol. 91, No. 3, pp. 26-56 (1994).

Collins, "Error Analysis in Scanned Holography," Oregon State University, Ph.D. thesis, Jun. 1970, 110 pages.

Conejo et al., "Price-Taker Bidding Strategy Under Price Uncertainty," IEEE Transactions on Power Systems, vol. 17, No. 4, Nov. 2002, pp. 1081-1088.

Cong et al., "FlowMap: An Optimal Technology Mapping Algorithm for Delay Optimization in Lookup-Table Based FPGA Designs," IEEE Transactions on Computer-Aided Design of Integrated Circuits and Systems, vol. 13, No. 1, Jan. 1994, 12 pages.

De Ladurantaye et al., "Strategic Bidding for Price-Taker Hydroelectricity Producers," IEEE Transactions on Power Systems, vol. 22, No. 4, Nov. 2007.

Denholm et al., "An Evaluation of Utility System Impacts and Benefits of Optimally Dispatched Plug-In Hybrid Electric Vehicles," NREL Technical Report NREL/TP-620-40293, 30 pp. (Oct. 2006).

Denton et al., "Spot Market Mechanism Design and Competitivity Issues in Electric Power," Proc. of the 31st Hawaii International Conference on System Sciences, vol. 3, pp. 48-56 (Jan. 1998).

Diao et al., "Deriving Optimal Operational Rules for Mitigating Inter-area Oscillations," IEEE/PES Power Systems Conference & Exposition, 8 pp. (Mar. 2011).

Dominguez-Garcia et al., "Resilient Networked Control of Distributed Energy Resources," IEEE Journal on Selected Areas in Communications, vol. 30, No. 6, Jul. 2012, pp. 1137-1148.

Driesen et al., "Design for Distributed Energy Resources," IEEE Power & Energy Magazine, vol. 6, No. 3, pp. 30-40, May/Jun. 2008.

Fahrioglu et al., "Designing Incentive Compatible Contracts for Effective Demand Management," IEEE Transactions on Power Systems, vol. 15, No. 4, Nov. 2000, pp. 1255-1260.

Farhangi, "The Path of the Smart Grid," IEEE Power & Energy Magazine, vol. 8, No. 1, pp. 18-28, Jan./Feb. 2010.

Faruqui et al., "The impact of informational feedback on energy consumption—A survey of the experimental evidence," Energy, vol. 35, No. 4, 2010, pp. 1598-1608.

Feigenbaum et al., "Distributed Algorithmic Mechanism Design: Recent Results and Future Directions," In Proceedings of the 6th International Workshop on Discrete Algorithms and Methods for Mobile Computing and Communications, Sep. 2002, 13 pages.

(56) References Cited

OTHER PUBLICATIONS

Fernandez et al., "Self Correcting HVAC Controls: Algorithms for Sensors and Dampers in Air-Handling Units," Pacific Northwest Laboratory PNNL-19104, 49 pp. (Dec. 2009).

Francis et al., "Chortle-crf: Fast Technology Mapping for Lookup Table-Based FPGAs," 28th ACM/IEEE Design Automation Conference, Jun. 21, 1991, pp. 227-233.

Fuller et al., "Analysis of Residential Demand Response and Double-Auction Markets," In Power and Energy Society General Meeting, IEEE, Jul. 24-29, 2011, 7 pages.

Fuller et al., "Analysis of Residential Demand Response and Double-Auction Markets," IEEE Power and Energy Society General Meeting, 7 pp. (Jul. 2011).

Fuller et al., "Evaluation of Representative Smart Grid Investment Grant Project Technologies: Demand Response," Pacific Northwest National Laboratory PNNL-20772, 349 pp. (Feb. 2012).

Fuller et al., "Modeling of GE Appliances in GridLAB-D: Peak Demand Reduction," Pacific Northwest National Laboratory PNNL-21358, 157 pp. (Apr. 2012).

Gatterbauer, "Interdependencies of Electricity Market Characteristics and Bidding Strategies of Power Producers," Master's Thesis, Massachusetts Institute of Technology, 33 pp. (May 2002).

Georgilakis, "Market Clearing Price Forecasting in Deregulated Electricity Markets Using Adaptively Trained Neural Networks," Hellenic Conference on Artificial Intelligence, vol. 3955, pp. 56-66 (2006).

Gjerstad et al., "Price Formation in Double Auctions," Games and Economic Behavior, vol. 22, article No. GA970576, pp. 1-29 (1998). (Document marked as Received Nov. 30, 1995).

Green Car Congress, "PG&E and Tesla to Research Smart Recharging Vehicle-to-Grid Technology," downloaded from http://www.greencarcongress.com/2007/09/pge-and-tesla-t.html, 3 pp. (Sep. 12, 2007).

GridLAB-D residential module user's guide, Available: http://sourceforeg.net/apps/mediawiki/gridlab-d, last modified on Oct. 22, 2013, 24 pages.

Guttromson et al., "Residential energy resource models for distribution feeder simulation," IEEE, vol. 1, pp. 108-113 (Jul. 2003).

Hammerstrom et al., "Pacific Northwest GridWise™ Testbed Demonstration Projects," Part I, Olympic Peninsula Project, Pacific Northwest National Laboratory, Oct. 2007, 157 pages.

Hammerstrom et al., "Pacific Northwest GridWise Testbed demonstration Projects: Part II. Grid Friendly Appliance Project," Pacific Northwest National Laboratory PNNL-17079, 123 pp. (Oct. 2007).

Hammerstrom et al., "Standardization of a Hierarchical Transactive Control System," Grid Interop Conf., 7 pp. (Nov. 2009).

Han et al., "Development of an Optimal Vehicle-to-Grid Aggregator for Frequency Regulation," IEEE Transactions on Smart Grid, vol. 1, No. 1, Jun. 2010, pp. 65-72.

Hao et al., "Aggregate Flexibility of Thermostatically Controlled Loads," IEEE Transactions on Power Systems, vol. 30, No. 1, Jan. 2015, pp. 189-198.

Hao et al., "Ancillary Service for the Grid via Control of Commercial Building HVAC Systems," In 2013 American Control Conference, IEEE, Jun. 17-19, 2013, pp. 467-472.

Hatley et al., "Energy Management and Control System: Desired Capabilities and Functionality," Pacific Northwest National Laboratory PNNL-15074, 46 pp. (Apr. 2005).

Hô et al., "Econophysical Dynamics of Market-Based Electric Power Distribution Systems," IEEE, pp. 1-6 (Jan. 2006).

Hsu et al., "Dispatch of Direct Load Control Using Dynamic Programming," IEEE Transactions on Power Systems, vol. 6, No. 3, Aug. 1991, pp. 1056-1061.

Huang et al., "Analytics and Transactive Control Design for the Pacific Northwest Smart Grid Demonstration Project," In 2010 First IEEE International Conference on Smart Grid Communications (SmartGridCom), IEEE, Oct. 4-6, 2010, pp. 449-454.

Huang et al., "MANGO—Modal Analysis for Grid Operation: A Method for Damping Improvement through Operating Point Adjustment," Pacific Northwest National Laboratory PNNL-19890, 92 pp. (Oct. 2010).

Huang et al., "Transforming Power Grid Operations," Scientific Computing, vol. 45, No. 5, pp. 22-27 (Apr. 2007).

Huberman et al., "A Multi-Agent System for Controlling Building Environments," In Proceedings of the First International Conference on Multiagent Systems, Jun. 12-14, 1995, pp. 171-176.

Human Solutions, "Anthroscan—System Solution for Serial Measurements" [undated], 4 pages.

Hurwicz, "The Design of Mechanisms for Resource Allocation," In The American Economic Review, Papers and Proceedings of the Eighty-fifth Annual Meeting of the American Economic Association, vol. 63, No. 2, May 1973, 31 pages.

Kakhbod et al., "Power Allocation and Spectrum Sharing in Wireless Networks: An Implementation Theory Approach," Mechanisms and Games for Dynamic Spectrum Allocation (Chapter 5), Feb. 2014, 42 pages.

Kannberg et al., "GridWise: The Benefits of a Transfottned Energy System," Pacific Northwest National Laboratory PNNL-14396, 48 pp. (Sep. 2003).

Kar et al., "Distributed Robust Economic Dispatch in Power Systems: A Concensus + Innovations Approach," In Proc. IEEE Power and Energy Society General Meeting, Jul. 2012, 8 pages.

Katipamula et al., "Evaluation of Residential HVAC Control Strategies for Demand Response Programs," ASHRAE Trans., Symp. on Demand Response Strategies for Building Systems, 12 pp (Jan. 2006).

Katipamula et al., "Transactive Controls: A Market-Based GridWise Controls for Building Systems," Pacific Northwest National Laboratory PNNL-15921, 14 pp. (Jul. 2006).

Kersting, "Radial Distribution Test Feeders," IEEE Transactions on Power Systems, vol. 6, No. 3, pp. 975-985, Aug. 1991.

Kiesling, "Retail Electricity Deregulation: Prospects and Challenges for Dynamic Pricing and Enabling Technologies," The Searle Center Annual Review of Regulation, 44 pp. (May 2007).

Kim et al., "Scheduling Power Consumption With Price Uncertainty," IEEE Transactions on Smart Grid, vol. 2, No. 3, Sep. 2011, pp. 519-527.

Kinter-Meyer et al., "Final Report for the Energy Efficient and Affordable Small Commercial and Residential Buildings Research Program—Project 3.3—Smart Load Control and Grid Friendly Appliances," Pacific Northwest National Laboratory PNNL-14342, 147 pp. (Jul. 2003).

Kok et al., "Agent-based Electricity Balancing with Distributed Energy Resources, A Multiperspective Case Study," Proc. Hawaii Int'l Conf. on System Sciences, 10 pp. (Jan. 2008).

Kok et al., "Dynamic Pricing by Scalable Energy Management Systems—Field Experiences and Simulation Results using Powermatcher," In IEEE Power and Energy Society General Meeting, Jul. 2012, 8 pages.

Kok et al., "Intelligence in Electricity Networks for Embedding Renewables and Distributed Generation," In Intelligent infrastructures, Springer, 2010, pp. 179-209.

Kok et al., "PowerMatcher: Multiagent Control in the Electricity Infrastructure," AAMAS, 8 pp. (Jul. 2005).

Lasseter et al., "Integration of Distributed Energy Resources. The CERTS MicroGrid Concept," Lawrence Berkeley National Laboratory, Oct. 2013, 32 pages.

Lemay et al., "An Integrated Architecture for Demand Response Communications and Control," Hawaii Int'l Conf. on System Sciences, 10 pp. (Jan. 2008).

Li et al., "Integrated Power Management of Data Centers and Electric Vehicles for Energy and Regulation Market Participation," IEEE Transactions on Smart Grid, vol. 5, No. 5, Sep. 2014, pp. 2283-2294.

Li et al., Market-Based Coordination of Thermostatically Controlled Loads—Part I: Mechanism Design Formulation, IEEE Transactions on Power System, under review, Mar. 15, 2015, 11 pages.

(56) References Cited

OTHER PUBLICATIONS

Li et al., Market-Based Coordination of Thermostatically Controlled Loads—Part II: Unknown Parameters and Case Studies, IEEE Transactions on Power System, has been accepted for inclusion in a future issue, 9 pages.

Li et al., "A Market Mechanism Design Approach for Coordination of Thermostatically Controlled Loads With Unknown Parameters (Part I)," IEEE Transactions on Power System, 2014, 8 pages.

Li et al., "A Market Mechanism Design Approach for Coordination of Thermostatically Controlled Loads With Unknown Parameters (Part II)," IEEE Transactions on Power System, 2014, 8 pages.

Li et al., "A Mechanism Design Approach for Coordination of Thermostatically Controlled Loads," Available at http://arxiv.org/abs/1503.02705, last updated Jun. 15, 2015, 16 pages.

Li et al., "Optimal Demand Response Based on Utility Maximization in Power Networks," In Power and Energy Society General Meeting, IEEE, Jul. 24-29, 2011, 8 pages.

Liu et al., "Planning and Control of Electric Vehicles Using Dynamic Energy Capacity Models," In 52nd Annual Conference on Decision and Control (CDC), IEEE, Dec. 10-13, 2013, pp. 379-384.

Ljung, System Identification: Theory for the User, 255 pages (Prentice Hall 1987).

Lu et al., "Control Strategies of Thermostatically Controlled Appliances in a Competitive Electricity Market," IEEE Proc. Power Engineering Society General Meeting, pp. 202-207 (Jun. 2005).

Lu et al., "Design Considerations for Frequency Responsive Grid Friendly Appliances," IEEE PES Trans. and Distribution Conference and Exhibition, 6 pp. (May 2006).

Lu et al., "An Evaluation of the HVAC Load Potential for Providing Load Balance Service," IEEE Transactions on Smart Grid, vol. 3, No. 3, Sep. 2012, pp. 1263-1270.

Lu et al., "Grid Friendly Device Model Development and Simulation," Pacific Northwest National Laboratory PNNL-18998, 52 pp. (Nov. 2009).

Lu et al., "Modeling Uncertainties in Aggregated Thermostatically Controlled Loads Using a State Queueing Model," IEEE Trans. on Power Systems, vol. 20, No. 2, pp. 725-733 (May 2005).

Lu et al., "Reputation-Aware Transaction Mechanisms in Grid Resource Market," IEEE Sixth Int'l Conf. on Grid and Cooperative Computing, 6 pp. (Aug. 2007).

Lu et al., "Simulating Price Responsive Distributed Resources," IEEE, vol. 3, pp. 1538-1543 (Oct. 2004).

Lu et al., "A State-Queueing Model of Thermostatically Controlled Appliances," IEEE Trans. on Power Systems, vol. 19, No. 3, pp. 1666-1673 (Aug. 2004).

Marion et al., "User's Manual for TMY2s: Typical Meteorological Years: Derived from the 1961-1990 National Solar Radiation data Base," National Renewable Energy Laboratory, Jun. 1995, 55 pages.

Mas-Colell et al., "Microeconomic Theory," Oxford University Press, © 1995, 501 pages.

Maskin, "Mechanism Design: How to Implement Social Goals," In Les Prix Nobel 2007, pp. 296-307 (2008).

Mathieu et al., "State Estimation and Control of Electric Loads to Manage Real-Time Energy Imbalance," IEEE Transactions on Power Systems, vol. 28, No. 1, Feb. 2013, pp. 430-440.

Moeslund, et al., "A Survey of Computer Vision-Based Human Motion Capture," Computer Vision and Image Understanding, vol. 81, No. 3, Mar. 2001, pp. 231-268.

Mohsenian-Rad et al., "Optimal Residential Load Control With Price Prediction in Real-Time Electricity Pricing Environments," IEEE Transactions on Smart Grid, vol. 1, No. 2, Sep. 2010, pp. 120-133.

Nanduri et al., "A Methodology for Evaluating Auction Based Pricing Strategies in Deregulated Energy Markets," Working Paper, 12 pp. (2005).

Nanduri, et al., "A Reinforcement Learning Model to Assess Market Power Under Auction-Based Energy Pricing," IEEE Trans. on Power Systems, vol. 22, No. 1, pp. 85-95 (Feb. 2007).

Nguyen et al., "Optimal Bidding Strategy for Microgrids Considering Renewable Energy and Building Thermal Dynamics," IEEE Transactions on Smart Grid, vol. 5, No. 4, Jul. 2014, pp. 1608-1620.

Nicolaisen et al., "Market Power and Efficiency in a Computational Electricity Market With Discriminatory Double-Auction Pricing," ISU Economic Report No. 52, 26 pp. (Aug. 27, 2000; revised Aug. 24, 2001).

Ntakou et al., "Price Discovery in Dynamic Power Markets with Low-Voltage Distribution-Network Participants," In IEEE Transmission and Distribution Conference and Exposition, Apr. 14-17, 2014, 5 pages.

O'Neill et al., "Model-Based Thelma Load Estimation in Buildings," Fourth National Conference of IBPSA-USA, Aug. 2010, 9 pages.

Palensky et al., "Demand Side Management: Demand Response, Intelligent Energy Systems, and Smart Loads," IEEE Transactions on Industrial Informatics, vol. 7, No. 3, Aug. 2011, pp. 381-388.

Pantoja et al., "Dispatch of Distributed Generators under Local-Information Constraints," In 2014 American Control Conference (ACC), Jun. 4-6, 2014, pp. 2682-2687.

Parkes, "Iterative Combinatorial Auctions: Achieving Economic and Computational Efficiency," PhD thesis, University of Pennsylvania, 2000, 115 pages.

Paschalidis et al., "Demand-Side Management for Regulation Service Provisioning Through Internal Pricing," IEEE Transactions on Power System, vol. 27, No. 3, Aug. 2012, pp. 1531-1539.

Pedrasa et al., "Coordinated Scheduling of Residential Distributed Energy Resources to Optimize Smart Home Energy Services," IEEE Transactions on Smart Grid, vol. 1, No. 2, Sep. 2010, pp. 134-143.

PJM wholesale market energy price, available at: http://www.pjm.com/markets-and-operations/energy.aspx, uploaded Sep. 16, 2015, 3 pages.

Plott et al., "Instability of Equilibria in Experimental Markets: Upward-sloping Demands, Externalities, and Fad-like Incentives," Southern Economic Journal, vol. 65 (3), 23 pp. (Jan. 1999).

Pourebrahimi et al., "Market-based Resource Allocation in Grids," IEEE Int'l Conf. on e-Science and Grid Computing, 8 pp. (2006).

Pratt et al., "Potential Impacts of High Penetration of Plug-in Hybrid Vehicles on the U.S. Power Grid," DOE/EERE PHEV Stakeholder Workshop, 14 pp. (Jun. 2007).

Rahimi et al., "Demand Response as a Market Resource Under the Smart Grid Paradigm," IEEE Transactions on Smart Grid, vol. 1, No. 1, Jun. 2010, pp. 82-88.

Rasouli et al., "Electricity Pooling Markets with Strategic Producers Possessing Asymmetric Information I: Elastic Demand," arXiv:1401.4230, Jan. 17, 2014, 8 pages.

Reiter, "Infoiniation Incentive and Performance in the (new) Welfare Economics," reprinted from American Economic Review, vol. 67, No. 1, Feb. 1977, 27 pages.

Sage et al., Estimation Theory with Applications to Communications and Control, 540 pages (1971).

Salehfar et al., "A Production Costing Methodology for Evaluation of Direct Load Control," IEEE Transactions on Power Systems, vol. 6, No. 1, Feb. 1991, pp. 278-284.

Samadi et al., "Advanced Demand Side Management for the Future Smart Grid Using Mechanism Design," IEEE Transactions on Smart Grid, vol. 3, No. 3, Sep. 2012, pp. 1170-1180.

Satayapiwat et al., "A Utility-based Double Auction Mechanism for Efficient Grid Resource Allocation," Int'l Symp. on Parallel and Distributed Processing with Applications (ISPA '08), pp. 252-260 (Dec. 10-12, 2008).

Schneider et al., "Analysis of Distribution Level Residential Demand Response," IEEE/PES Power System Conference and Exposition, 6 pp. (Mar. 2011).

Schneider et al., "Detailed End Use Load Modeling for Distribution System Analysis," IEEE Power and Energy Society General Meeting, 7 pp. (Jul. 2010).

Schneider et al., "Distribution Power Flow for Smart Grid Technologies," IEEE/PES Power System Conference and Exhibition, 7 pp. (Mar. 2009).

(56) References Cited

OTHER PUBLICATIONS

Schneider et al., "Evaluation of Conservation Voltage Reduction (CVR) on a National Level," Pacific Northwest National Laboratory PNNL-19596, 114 pp. (Jul. 2010).
Schneider et al., "Modern Grid Strategy: Enhanced GridLAB-D Capabilities Final Report," Pacific Northwest National Laboratory PNNL-18864, 30 pp. (Sep. 2009).
Schneider et al., "Multi-State Load Models for Distribution System Analysis," IEEE Trans. on Power Systems, vol. 26, No. 4, pp. 2425-2433 (Nov. 2011).
Schneider et al., "A Taxonomy of North American Radial Distribution Feeders," IEEE Power & Energy Society General Meeting, 6 pp. (Jul. 2009).
Schneider et al., "Voltage Control Devices on the IEEE 8500 Node Test Feeder," IEEE PES Transmission & Distribution Conference & Exposition, 6 pp. (Apr. 2010).
Sharma et al., "Local public good provisioning in networks: A Nash implementation mechanism," IEEE Journal on Selected Areas in Communications, vol. 30, No. 11, Dec. 2012, pp. 2105-2116.
Singh et al., "Effects of Distributed Energy Resources on Conservation Voltage Reduction (CVR)," IEEE Power and Energy Society General Meeting, 7 pp. (Jul. 2011).
Sonderegger, "Diagnostic Tests Determining the Thermal Response of a House," Lawrence Berkeley Laboratory, Nov. 1977, 18 pages.
Sonderegger, "Dynamic models of house heating based on equivalent thermal parameters," Ph.D. Thesis, Princeton University, Dec. 1978, 277 pages.
Steinway, Book Review of "Estimation Theory with Applications to Communication and Control," IEEE Transactions on Systems, Man, and Cybernetics, Oct. 1971, p. 405.
Taylor et al., "GridLAB-D Technical Support Document: Residential End-Use Module Version 1.0," Pacific Northwest National Laboratory PNNL-17694, 30 pp. (Jul. 2008).
Vandael et al., "A Scalable Three-Step Approach for Demand Side Management of Plug-in Hybrid Vehicles," IEEE Transactions on Smart Grid, vol. 4, No. 2, Jun. 2013, pp. 720-728.
Vrettos et al., "Demand Response with Moving Horizon Estimation of Individual Thermostatic Load States from Aggregate Power Measurements," In 2014 American Control Conference (ACC), Jun. 4-6, 2014, pp. 4846-4853.
Weather History for KOSU, Aug. 2009, 5 pages.
Weather Underground: Weather History for Ohio State University, OH, downloaded from http://www.wunderground.com, 4 pages.
Wellman, "A Market-Oriented Programming Environment and its Application to Distributed Multicommodity Flow Problems," Journal of Artificial Intelligence Research, Aug. 1993, 23 pages.
Widergren et al., "Residential Real-time Price Response Simulation," IEEE Power and Energy Society General Meeting, pp. 3074-3078 (Jul. 2011).
Wilson et al., "Equivalent Thermal Parameters for an Occupied Gas-Heated House," ASHRAE Trans.; (United States), 91(CONF-850606-), 1985, pp. 1875-1885.
Wolak, "Residential Customer Response to Real-Time Pricing: The Anaheim Critical-Peak Pricing Experiment," document marked May 24, 2006, 49 pages (also published as Wolak, "Residential Customer Response to Real-Time Pricing: The Anaheim Critical-Peak Pricing Experiment," Center for the Study of Energy Markets (2007)).
Yang, "Adaptively Robust Kalman Filters with Applications in Navigation," Chapter 2 of Sciences of Geodesy-1, Jun. 2010, pp. 49-82.
Yang et al., "Consensus Based Approach for Economic Dispatch Problem in a Smart Grid," IEEE Transactions on Power Systems, vol. 28, No. 4, Nov. 2013, pp. 4416-4426.
Ygge et al., "Decentralized Markets versus Central Control: A Comparative Study," Journal of Artificial Intelligence Research, vol. 11, Oct. 1999, pp. 301-333.
Ygge et al., "Making a Case for Multi-Agent Systems," Research Report Apr. 1997, University of Karlskrona/Ronneby, Sweden 23 pages (also published as Ygge et al., "Making a Case for Multi-Agent Systems," In Multi-Agent Rationality, pp. 156-176, Springer Berlin Heidelberg (1997)).
Ygge, "Market-Oriented Programming and its Application to Power Load Management," Lund University, Ph.D. Thesis, 1998.
Ygge et al., "Power Load Management as a Computational Market," document not dated, 14 pages (published as Ygge et al., "Power Load Management as a Computational Marked," Proceedings of the 2nd International Conference on Multi-Agent Systems (ICMAS '96), pp. 393-400, (1996).
Yin et al., "A Novel Double Auction Mechanism for Electronic Commerce: Theory and Implementation," IEEE Proc. of the Third Int'l Conf. on Machine Learning and Cybernetics, pp. 53-58 (Aug. 2004).
Zhang et al., "Aggregated Modeling and Control of Air Conditioning Loads for Demand Response," IEEE Transactions on Power Systems, vol. 28, No. 4, Nov. 2013, pp. 4655-4664.
Zhang et al., "Convergence Analysis of the Incremental Cost Consensus Algorithm Under Different Communication Network Topologies in a Smart Grid," IEEE Transactions on Power System, vol. 27, No. 4, Nov. 12, pp. 1761-1768.
Zhang et al., "Decentralizing the Economic Dispatch Problem using a Two-Level Incremental Cost Consensus Algorithm in a Smart Grid Environment," In 2011 North American Power Symposium (NAPS), IEEE, Aug. 4-6, 2011, 7 pages.

* cited by examiner

COORDINATION OF THERMOSTATICALLY CONTROLLED LOADS WITH UNKNOWN PARAMETERS

ACKNOWLEDGMENT OF GOVERNMENT SUPPORT

This invention was made with Government support under Contract DE-ACO576RL01830 awarded by the U.S. Department of Energy. The Government has certain rights in the invention.

CROSS REFERENCE TO RELATED APPLICATIONS

This application claims the benefit of U.S. Provisional Patent Application No. 62/056,221, entitled "A MARKET MECHANISM DESIGN APPROACH FOR COORDINATION OF THERMOSTATICALLY CONTROLLED LOADS WITH UNKNOWN PARAMETERS," filed Sep. 26, 2014, and U.S. Provisional Patent Application No. 62/056,212, entitled "ON MARKET-BASED COORDINATION OF THERMOSTATICALLY CONTROLLED LOADS WITH USER PREFERENCE," filed Sep. 26, 2014, and which applications are incorporated herein by reference in their entireties.

BACKGROUND

The number of sensors and controllers connected to the electric power system is expected to grow by several orders of magnitude over the next several years. However, the information networks that are currently used to transmit and analyze data on the system are ill-equipped to handle the volume of communications resulting from the increased number of sensors. For example, the current information networks are incapable of delivering large amounts of data collected by the sensors in a predictable, time-effective, and reliable manner.

Without the ability to effectively manage and use data from the sensors, the deployment of sensors into the power grid (e.g., phasor measurement sensors into the transmission system and smart meters into the distribution system) will not result in the desired improvements. For example, existing bidding strategies for wholesale market are not readily adaptable to thermostatically controlled loads implemented at the consumer side. Further, requirements for multiple bidding iterations, large amounts of bid data, and an inability to encode private information into consumer bids hampers deployment of successful strategies for control schemes for demand response. Accordingly, there is ample opportunity for improved systems, methods, and apparatus for managing and using data in a power grid or other electric power distribution system.

SUMMARY

Apparatus and methods are disclosed for the design, analysis, testing, and manufacture of devices used to coordinate groups of thermostatically controlled loads (TCLs) to achieve system-level objects with price incentives. In some examples, the framework is based on improving social welfare of the system subject to one or more feeder power constraints. In the framework, each individual load submits a bid to the market based on its current state. The market collects all the bids and determines the cleared price accordingly. After receiving the cleared price, each individual load makes the local control decision to maximize its utility. This framework can provide a solid mathematical foundation to the disclosed transactive control techniques.

In some examples of the disclosed technology, a joint state and parameter estimation framework using expectation maximization is applied to determine consumer bidding price/quantity pairs. A market coordinator evaluates received bids and transmits a clearing price to bidding consumers, which in turn operate (or turn off) controlled loads based on the clearing price. The disclosed examples of such a coordination framework can effectively improve the efficiency of power grid operation and reduce power grid congestion at key times, as will be further illustrated in the figures and detailed description below.

In some examples of the disclosed technology, a method of operating a load coupled to a thermal environment with power received from a power grid by submitting bids to a coordinator includes estimating a set of values for one or more unmeasured parameters of the thermal environment based at least in part on a plurality of output measurements of the thermal environment, determining an energy response based on the estimated set of values for the unmeasured parameters, and transmitting a bid for power for a finite time period based on the determined energy response to the coordinator. In some examples, the method further includes receiving a clearing price from the coordinator responsive to the transmitted bid based at least in part on the transmitted bid and on bids received from a plurality of additional loads, and responsive to the received clearing price, determining to send power received from the power grid to the load.

In some examples, the estimating includes determining a distribution for a system state vector conditioned on the output measurements, the output measurements including a time-ordered sequence of air temperatures, the system state vector being based in part on values determined for one or more model parameters. In some examples, the estimating includes updating a set of values for one or more model parameters to substantially maximize a likelihood function. In some examples, the energy response is determined based at least in part on the following: a measured air temperature, a control deadband value, and/or the set of unmeasured parameters. In some examples, the set of values for the one or more unmeasured parameters is determined using an equivalent thermal parameter model to estimate an inner mass temperature of the thermal environment. In some examples the method includes estimating a state trajectory and determining the energy response based at least in part on the state trajectory.

In some examples, the estimating the parameters includes performing an initial estimation of values for the one or more unmeasured parameters and determining a conditional distribution of a state of the thermal environment using a recursive Bayes filter. In some examples, the recursive Bayes filter is a Kalman filter.

In some examples, estimating set of values for the unmeasured parameters includes performing an initial estimation of values for a set of model parameters, determining a conditional distribution of a set of state values for the thermal environment, determining new values for the set of model parameters selected to maximize a likelihood function based on the conditional distribution, repeating the determining the conditional distribution and the determining new values for the set of model parameters until a set of convergence criteria is met, and, after the convergence criteria has been met, providing an estimation of state trajectory and an updated set of parameters for determining the energy response.

In some examples of the disclosed technology, a controller for operating a thermostatically-controlled load includes one or more sensors configured to generate temperature data used to determine the energy response, a network adapter configured to transmit the bid to the coordinator, one or more processors, one or more actuators configured to activate and/or deactivate the thermostatically-controlled load responsive to one or more signals received from the processors, and one or more computer-readable storage media storing computer-executable instructions that when executed by the processors, cause the controller to perform any one or more of the methods disclosed herein.

In some examples of the disclosed technology, a coordinator is configured to send clearing prices for a retail power market to a plurality of controllers configured to operate thermostatically-controlled loads, the coordinator comprising one or more processors configured to: receive one respective bid for each of the loads, each of the plurality of received bids being generated using one of the disclosed methods, determining a clearing price for the plurality of received bids, and transmitting the clearing price to each of the loads.

In some examples of the disclosed technology, a method of allocating power to a plurality of loads coupled to a power grid includes receiving one respective bid for each of the loads, each of the plurality of received bids being generated based on an energy response determined by estimating a respective set of values for one or more unmeasured parameters of a thermal environment of each of the loads, determining a clearing price for the plurality of received bids; and transmitting the clearing price to each of the loads. In some examples, a method of allocating power further comprises sending power to a selected one or more of the loads, the loads being selected based on the received bids and the clearing price.

In some examples of the disclosed technology, a market-based control system is configured to coordinate a group of thermostatically controlled loads to achieve system-level objectives with pricing incentives, the system including a market coordinator configured to generate clearing price data based on a plurality of bids specifying a quantity and a price for consuming power, a plurality of thermostatically controlled loads (TCLs). Each of the TCLs is configured to transmit bid data to the market coordinator specifying a bid quantity and a bid price for power received via a power grid for a predetermined time period. The transmitted bid data is based at least in part on estimating unmeasured parameters for a thermal environment to which each of the respective TCLs is coupled to supply heating or cooling to, each of the TCLs being further configured to consume or not consume power from the power grid based at least in part on the clearing price data and the TCLs' respective bid for the predetermined time period. The system further includes a computer network configured to transmit the bid data and the clearing price data between the market coordinator and each of the TCLs.

In some examples, the system includes a power grid configured to distribute power to the TCLs based at least in part on a market cleared by the market coordinator. In some examples, the system includes a power generation market administrator configured to send wholesale energy price data to the market coordinator, the wholesale energy price data being used at least in part to determine the clearing price data.

In some examples of the disclosed technology, the consumer bid includes one price and one corresponding quantity. In some examples, one or more computer-readable storage media storing computer-executable instructions that when executed by a computer, cause the computer to perform any of the disclosed methods. In some examples, a power grid includes an electric power distribution system configured to transmit electric power from one or more power sources to a plurality of thermostatically controlled loads, and a market coordinator configured to perform any one or more of the disclosed methods.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The foregoing and other objects, features, and advantages of the disclosed technology will become more apparent from the following detailed description, which proceeds with reference to the accompanying figures.

DETAILED DESCRIPTION

I. General Considerations

Figure 1:
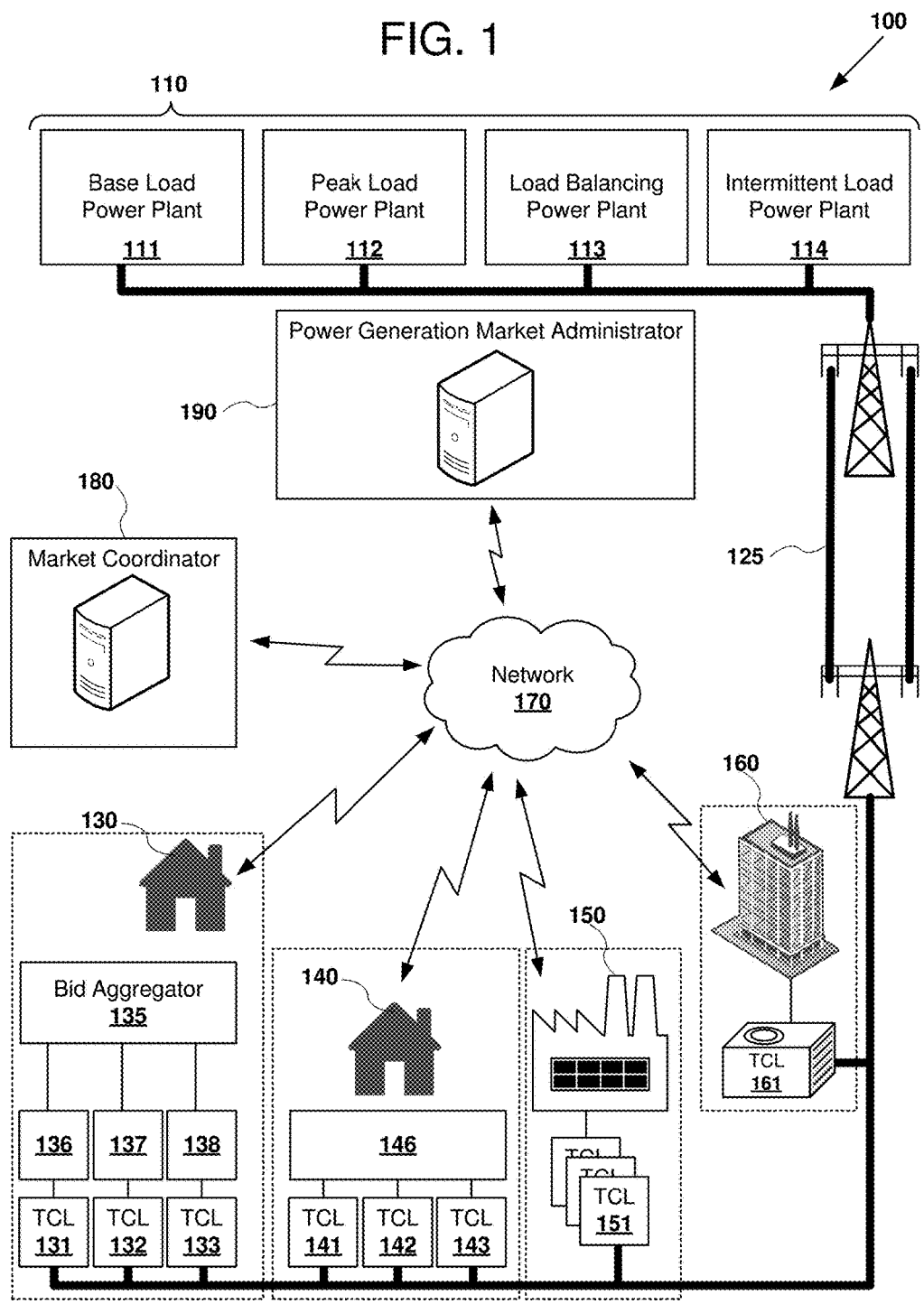
FIG. 1 illustrates an example environment in which certain apparatus and methods, including a market coordinator, can be implemented according to the disclosed technology.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "evaluate," "determine," "send," "transmit," and "perform" to describe the disclosed methods. These terms are high-level descriptions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., non-transitory computer-readable storage media, such as one or more optical media discs, volatile memory components (such as DRAM or SRAM), or nonvolatile memory components (such as hard drives and solid state drives (SSDs))) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., non-transitory computer-readable storage media). The computer-executable instructions can be part of, for example, a dedicated software application, or a software application that is accessed or downloaded via a web browser or other software application (such as a remote computing application). Such software can be executed, for example, on a single local computer (e.g., as a process executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods can also be implemented by specialized computing hardware that is configured to perform any of the disclosed methods. For example, the disclosed methods can be implemented by an integrated circuit (e.g., an application specific integrated circuit ("ASIC") or programmable logic device ("PLD"), such as a field programmable gate array ("FPGA")). The integrated circuit or specialized computing hardware can be embedded in or directly coupled to an electrical device (or element) that is configured to interact with controllers and coordinators. For example, the integrated circuit can be embedded in or otherwise coupled to a generator (e.g., a wind-based generator, solar-based generator, coal-based generator, or nuclear generator), an air-conditioning unit; heating unit; heating, ventilation, and air conditioning ("HVAC") system; hot water heater; refrigerator; dish washer; washing machine; dryer; oven; microwave oven; pump; home lighting system; electrical charger, electric vehicle charger; or home electrical system.

II. Introduction to the Disclosed Technology

Methods and apparatus are disclosed for implementing market based control frameworks to coordinate a group of autonomous Thermostatically Controlled Loads (TCL) to achieve system-level objectives with pricing incentives.

Examples of TCLs that can be coordinated according to the disclosed technology include air conditioners, heat pumps, hot water heaters, refrigerators, plug-in hybrid electric vehicles, and commercial and industrial loads. The electricity consumption of TCL can be modulated while still meeting desired end-user temperature requirements due to the inherent thermal storage properties of TCLs.

A population of TCLs can be coordinated to achieve group objectives. In such examples, each TCL controller privately observes user preferences and determines control actions based on market energy prices to maximize the individual utility, while the coordinator designs the bidding and market clearing strategy to efficiently allocate energy to users, subject to a feeder power constraint. Mechanisms are disclosed to elicit private information from individual users for collective decision making. In some examples, the proposed mechanism corresponds to a dominant strategy equilibrium, which enables the controllers to determine the bidding price without knowing other controllers' actions. A realistic bidding strategy is disclosed to simplify the bidding structure and reduce communication overhead. Disclosed technologies enable coordination of groups of TCLs for demand response with a systematic consideration of various practical factors, such as heterogeneous load dynamics, private information, communication resources, and other factors.

Full knowledge of system state and ETP model parameters are difficult to obtain in practice (e.g., because the mass temperature cannot practically be measured, and only some rough statistical information about the model parameters is available). In some examples, the output measurements of TCL devices can be used to estimate system state and/or to identify model parameters. For instance, if the model parameter is available, then the system state can be estimated using recursive Bayes filter (e.g., a Kalman filter); when the system state is known or measurable, the model parameters can be recovered using the system identification methods.

In some examples of the disclosed technology, an expectation maximization approach allows the bidding strategy of each TCL to depend only on its own online measurements (such as air temperature and "on/off" state) enabling implementation of suitable bidding strategies.

Demand response is a technique that can be applied to improve the efficiency and reliability of future smart power grids. Demand response can be implemented using various pricing schemes, such as Real Time Pricing (RTP), Time of Use (TOU) and Critical Peak Pricing (CPP). A time-varying price structure incentivizes users to shift demand from high price periods to low price periods with reduced electricity expenditures. Price-based demand response can achieve results in terms of payment reduction, load shifting, and/or power saving. However, price-based demand response approaches typically directly pass the wholesale energy price to end-users or modifies the wholesale price in a heuristic way. In some examples of the disclosed technology predictable and reliable aggregated response can be used to implement demand response techniques including power capping, load following, frequency regulation, among others.

In certain examples of the disclosed technology, a population of TCLs is coordinated to achieve certain group objectives. In the considered example scenarios, self-interested users with private information determine control actions based on the energy prices to maximize individual utility, while the coordinator designs the bidding and clearing rules to efficiently allocate energy to individual users subject to a peak power constraint. In some examples, a systematic consideration of various practical factors, such as heterogeneous load dynamics, private information of individual users, unknown parameters of the load model, communication resources for the information exchange are employed.

There are several challenges that can be addressed in certain examples of the disclosed technology. For example, user utilities are private information, making it challenging for the market coordinator to achieve group objectives while respecting individual user load control authorities. Further, it is often desirable to avoid multiple communication iterations between load control agents and the market coordinator. Furthermore, accurate load models do not always have known model parameters.

In certain examples of the disclosed technology, a market-based coordination framework is used to control residential air conditioning loads with a systematic consideration of one or more of the aforementioned factors. In certain examples of the disclosed framework, each TCL device is equipped with a control module that collects user energy use preferences, computes a bid based on the temperature measurement, and determines a control setpoint according to the cleared market price, while the market coordinator determines an energy price selected to achieve group objectives. A mechanism is disclosed to elicit private information for collective decision making. In some examples, this results in a dominant strategy equilibrium that enables each user to determine the optimal bid without knowing information about other loads within the control framework. Thus, certain examples of the disclosed technology allow for coordination of a group of TCLs for demand response with limited communication resources.

In some examples of the disclosed technology, the framework is configured to maximize social welfare subject to a feeder power constraint. The framework allows a market coordinator to affect the aggregated power of a group of dynamical systems, and creates an interactive market where the users and the coordinator cooperatively determine the optimal energy allocation and energy price. An optimal pricing strategy is derived, which maximizes social welfare while respecting the feeder power constraint. The bidding strategy is also designed to compute the optimal price in real time based on local device information. Numerical simulations based on realistic price and model data are performed. The simulation results demonstrate that the proposed approach can effectively maximize the social welfare and reduce power congestion at key times.

In one embodiment, an optimal pricing strategy is proposed, which maximizes the social welfare while respecting the feeder constraint. A bidding strategy is also proposed to enable the numerical computation of the optimal price. In some examples of the disclosed technology, certain advantages can be realized. First, the proposed pricing strategy has been proven optimality, where social welfare can be maximized while the feeder power constraint is respected. Second, certain disclosed proposed bidding strategies provide the market with a minimum amount of information that is sufficient for the market to implement an optimal pricing strategy. This enables implementation of the disclosed framework in real time (e.g., by clearing a market using one bid from each load in a 5-minute period).

The disclosed technology provides a foundation for a fully dynamic version of market-based control of Thermostatically Controlled Loads to maximize the social welfare over multiple control periods. In such cases, all loads bid a price vector for the entire planning horizon, and the market is cleared with all prices for the subsequent periods within the horizon. Thus, social welfare can be maximized for multiple periods, and shape the power consumption, thereby flattening the power curve.

Disclosed bidding strategies enables a market coordinator to estimate aggregate power demand in response to market prices more accurately. Therefore, given a power trajectory, the market coordinator can determine the cleared price to coordinate loads to match the power trajectory reference in real time.

In certain examples of the disclosed technology, a group of TCLs are coordinated by a market coordinator with price incentives to limit aggregated power demand and improve system efficiency. Each device adjusts its temperature setpoint control in response to the energy price to maximize individual utility. The change on the setpoint control will then modify the system dynamics and affect the system state, on which the generated bid is based. According to the received load bids, the coordinator clears the market with a price for the next cycle to maximize social welfare subject to a feeder power constraint. A systematic mathematical framework is provided for the analysis and design of this kind of market-based coordination of responsive loads with nontrivial dynamics.

In some examples of the disclosed technology, a market-based coordination framework includes a coordinator that coordinates a group of autonomous TCLs to achieve system-level objectives with price incentives. In some examples, adapting the technology to TCLs allows incorporation of more realistic load dynamics into a market-based coordination framework. In some examples, the framework allows for the users to indicate their preferences regarding how TCL temperature setpoints respond to market clearing price(s). In this way, an interactive market is created for the coordinator and the users cooperatively determine energy allocation in a decentralized manner. In some examples, an optimal price is found to align individual optimality and social optimality. This property does not hold in general when the feeder power constraint is imposed on the system. In some examples, the devices can only bid once during each market clearing cycle. Thus, multiple iterations between the load controllers and market coordinator for each market clearing cycle, which demands considerable communication and computational resources, can be avoided.

Optimal pricing strategies are disclosed, which maximize the social welfare of the system, subject to a feeder power constraint. Load device bidding strategies are also presented to compute the optimal price numerically in real time while respecting the computational and communication constraints of the system. The effectiveness of the disclosed technology is demonstrated via a number of simulations based on realistic models of residential air conditioning loads. Disclosed frameworks can effectively cap the aggregated power below the feeder capacity and thus maximize the social welfare.

III. Example Coordinated Power Grid Network

A diagram 100 illustrating an example of a possible network topology for an environment implementing coordination of thermostatically controlled loads (TCLs) according to the disclosed technology is depicted in FIG. 1. As shown, a number of energy sources 110, including a base load power plant 111 (e.g., a coal, nuclear, or hyrdoelectric power plant), a peak load power plant 112 (e.g., a gas or diesel turbine electric generator), a load balancing power plant 113 (e.g., pumped water storage or battery energy storage plants), and an intermittent load power plant 114 (e.g., including photovoltaic and other solar-based electric generators, wind turbines, and tidal energy sources) are coupled to a power grid 120. As will be readily understood to one of ordinary skill in the relevant art, the classification of energy sources 110 is for illustrative purposes to demonstrate the extent of power sources that can be used with the technologies used herein.

The power grid 120 includes transmission lines 125 that carry power from the energy sources 110 to a number of loads, including thermostatically-controlled loads. Energy consumers with suitable TCLs for deploying in the illustrated environment include residential consumers, including residential consumers 130 and 140, industrial consumers, such as industrial consumer 150, and commercial consumers, such as commercial consumer 160. Each of the associated consumers 130, 140, 150, and 160 is associated with one or more thermostatically-controlled loads. For example, the residential consumer 130 has three thermostatically-controlled loads (TCL) 131-133. Further, as shown, each of the TCLs 131-133 is coupled to a controller 136-138, respectively. Each of the controllers 136-138 can submit bids and receive clearing prices via a bid aggregator 135, and actuate their respective coupled TCLs 131-133 (e.g., by turning the associated load on or off by activating/deactivating the load). Additionally, residential consumer 140 has a number of TCLs 141-143 that are coupled to a single controller 146. The controller 146 can submit bids, receiving clearing prices, and actuate any of the coupled TCLs 141-143. Industrial consumer 150 has a number of TCLs (e.g., TCL 151) (controller(s) and any bid aggregator(s) being omitted from FIG. 1 for simplicity), and commercial consumer 160 has a number of TCLs (e.g., TCL 161) (controller(s) and any bid aggregator(s) being omitted from FIG. 1 for simplicity).

Each of the TCLs is coupled to a controller that is operable to submit data to and receive data from other components via a computer network 170. In some examples, a number of TCLs associated with a single consumer can have data aggregated and bids submitted together using a bid aggregator (e.g., bid aggregator 135). In some examples, one or more of the TCL controllers are implemented using a microcontroller, memory, and suitable input/output resources for receiving signals carrying sensor data local to the TCL and controlling the coupled TCL (e.g., by actuating motors and other components of a respective TCL). In other examples, TCL controllers can be implemented using programmable logic or a general-purpose computer configured to receiving signals carrying signal data and generate signals for controlling the coupled TCL.

Each of the TCLs can be coupled to, for example, computing devices having computer hardware that run software or is otherwise configured to communicate with other computing devices accessible by the network 170. In other examples, the TCLs send data to other computing devices associated with one or more of the energy consumers. Each of the controllers coupled to and/or associated with the TCLs, a market coordinator 180, and a power generation market administrator 190 can have computer architecture(s) similar to those illustrated in FIG. 2 and further discussed below. The computing devices associated with the TCLs, the coordinator, and the administrator, are not limited to traditional personal computer and server architectures, but can comprise other computing hardware configured to connect to and communicate with the network 170 (e.g., specialized computing hardware associated with an electrical device or a power generator, including hardware comprising one or more integrated circuits such as ASIC or programmable logic devices configured to perform any of the disclosed methods).

As shown in FIG. 1, each of the energy consumers 130, 140, 150, and 160 can send and receive data via the network to the market coordinator 180. The market coordinator 180 receives bid data from energy consumers and transmits coordination data, such as clearing prices back to energy consumers. The market coordinator 180 can also communicate with the power generation market administrator 190 in order to, for example, receive wholesale energy price data from producers associated with the energy sources 110.

Before each market clearing cycle, each device can measure its current room temperature and submit a bid based on a calculated energy response to the market coordinator 180.

In some examples of the disclosed technology, TCL controllers are configured to estimate a set of values for one or more unmeasured parameters of the thermal environment based at least in part on a plurality of output measurements of the thermal environment and determine an energy response based on the estimated set of values for the unmeasured parameters. The TCLs are further configured to determine an energy response relating price data for one or more energy prices to quantity data for power to be consumed by the associated TCL and to send bids for power for a finite time period based on the energy response to the market coordinator 180.

In some examples, each of the TCLs submits a single bid to the mark coordinator 180 for each finite time period. In other examples, additional bids are submitted in an iterative process. The market coordinator 180 in turn aggregates bids from a number of energy consumers participating in the market for the finite time period, and calculates a clearing price. The clearing price is transmitted from the market coordinator 180 to each of the energy consumers. The energy consumers respond to the clearing price by, for example, actuating their associated loads to activate or de-activate, thereby consuming, or not consuming, respectively, energy from the power grid according to the clearing price. For example, if an energy consumer did not bid a sufficient price to be allocated energy by the market coordinator, that consumer, a controller associated with the TCL, will not activate the device. Conversely, if a bid submitted for an associated TCL was sufficient to receive power, the controller can activate the associated thermostatically-controlled load. While the examples disclosed herein respond to the clearing price by either activating or de-activating the load, in other examples a finer-grained response of the loads can be performed (e.g., by consuming a portion of the loads maximum energy consumption). In some examples, the market coordinator 180 itself sends signals to activate or de-activate the loads, accordingly.

It should be noted that in some examples, individual TCLs associated with an energy consumer can submit different price and/or quantity values in their bid to the market coordinator 180 and thus, in certain instances, only a subset of TCLs associated with a particular TCL will be activated or de-activated according to the clearing price. As will be more fully explained below, this process can be repeated at fixed intervals (e.g., intervals of one hour or less, intervals of ten minutes or less, or intervals of five minutes or less).

In the illustrated example of FIG. 1, controllers coupled to the TCLs are accessed using the network 170, which can be implemented as a local area network ("LAN") using wired networking (e.g., using IEEE standard 802.3 or other appropriate wired networking standard), fiber optic cable, cable modem (e.g., using the DOCSIS standard), and/or wireless networking (e.g., IEEE standards 802.11a, 802.11b, 802.11g, or 802.11n, Wi-Max (e.g., IEEE standard 802.16), a metropolitan area network ("MAN"), satellite networking, microwave, laser, or other suitable wireless networking technologies). In certain examples, at least part of the network 170 includes portions of the internet or a similar public network. In certain examples, at least part of the network 170 can be implemented using a wide area network ("WAN"), a virtual private network ("VPN"), or other similar public and private computer communication networks. In some examples, controllers associated with the TCLs are located near or at a transmission node of the power grid 120 itself (e.g., in a distribution substation, subtransmission substation, transmission substations, or other nodal locale) or can alternatively be located remotely from the transmission node (e.g., at a centralized location such as using a central computing device that performs computations from multiple transmission nodes). In some examples, controller associated with the TCLs are coupled directly to the TCL, or located at another location within a residence, industrial building, or commercial building.

The various possible roles and functionalities of the TCLs, market coordinator 180, and power generation market administrator 190 will be described in more detail in the following sections.

IV. Example Computing Environment

Figure 2:
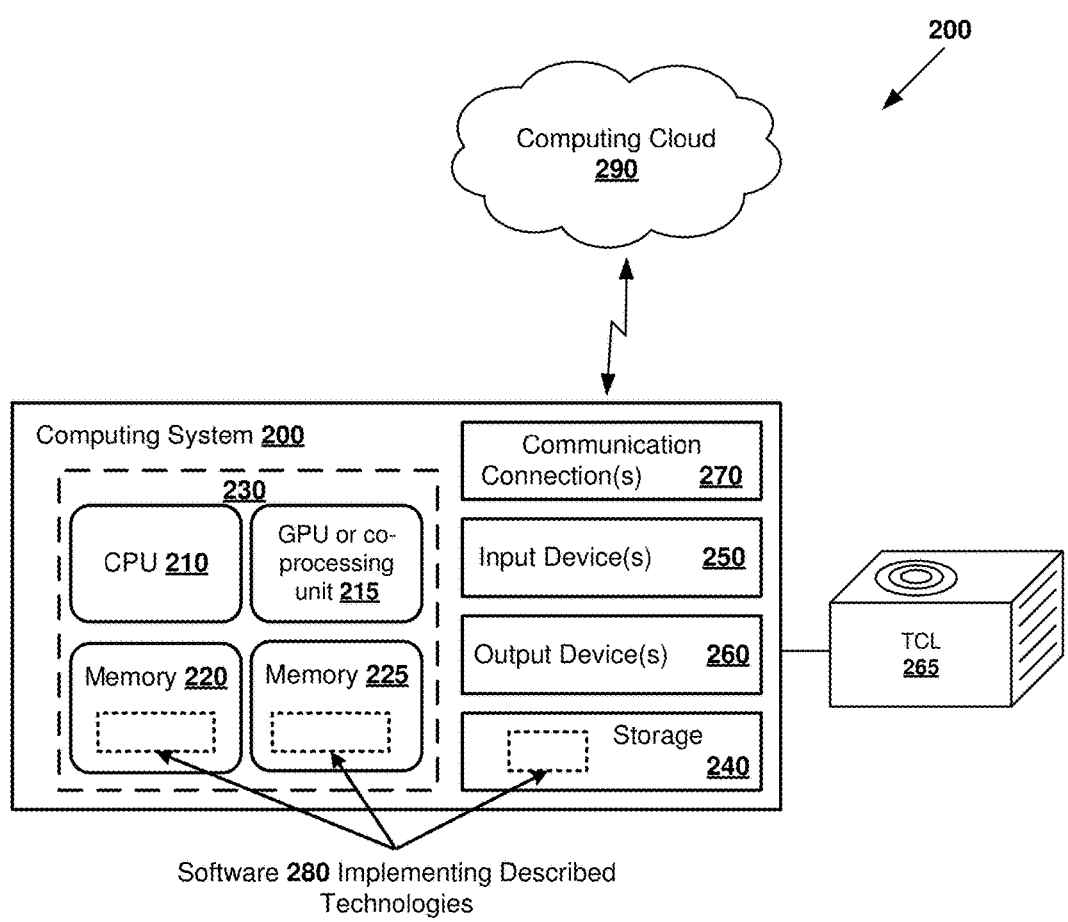
FIG. 2 illustrates an example computing environment in which certain examples of the disclosed technology can be implemented.

FIG. 2 illustrates a generalized example of a suitable computing environment 200 in which described embodiments, techniques, and technologies, including determining an energy response, generating and sending bids, and market coordination can be implemented. For example, the computing environment 200 can implement any of the TCL controllers, market coordinators, and/or market administrators, as described herein.

The computing environment 200 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 2, the computing environment 200 includes at least one central processing unit 210 and memory 220. In FIG. 2, this most basic configuration 230 is included within a dashed line. The central processing unit 210 executes computer-executable instructions and may be a real or a virtual processor. In a multi-processing system, multiple processing units execute computer-executable instructions to increase processing power and as such, multiple processors can be running simultaneously. The memory 220 may be volatile memory (e.g., registers, cache, RAM), non-volatile memory (e.g., ROM, EEPROM, flash memory, etc.), or some combination of the two. The memory 220 stores software 280, images, and video that can, for example, implement the technologies described herein. A computing environment may have additional features. For example, the computing environment 200 includes storage 240, one or more input devices 250, one or more output devices 260, and one or more communication connections 270. An interconnection mechanism (not shown) such as a bus, a controller, or a network, interconnects the components of the computing environment 200. Typically, operating system software (not shown) provides an operating environment for other software executing in the computing environment 200, and coordinates activities of the components of the computing environment 200.

The storage 240 may be removable or non-removable, and includes magnetic disks, magnetic tapes or cassettes, CD-ROMs, CD-RWs, DVDs, or any other medium which can be used to store information and that can be accessed within the computing environment 200. The storage 240 stores instructions for the software 280, plugin data, and messages, which can be used to implement technologies described herein.

The input device(s) 250 may be a touch input device, such as a keyboard, keypad, mouse, touch screen display, pen, or trackball, a voice input device, a scanning device, or another device, that provides input to the computing environment 200. For audio, the input device(s) 250 may be a sound card or similar device that accepts audio input in analog or digital form, or a CD-ROM reader that provides audio samples to the computing environment 200. The input device(s) 250 can also include sensors and other suitable transducers for generating data about the environment such as room temperature, humidity, and status information for one or more TCLs (e.g., TCL 265). The output device(s) 260 may be a display, printer, speaker, CD-writer, or another device that provides output from the computing environment 200. The output device(s) 260 can also include interface circuitry for sending actuating commands to the TCLs, (e.g., TCL 265), for example, to activate or deactivate actuators (e.g., motors, solenoids, hydraulic actuators, pneumatic actuators, etc.) the TCL, or to request sensor or other data from the TCL.

The communication connection(s) 270 enable communication over a communication medium (e.g., a connecting network) to another computing entity. The communication medium conveys information such as computer-executable instructions, compressed graphics information, video, or other data in a modulated data signal. The communication connection(s) 270 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed controllers and coordinators. Both wired and wireless connections can be implemented using a network adapter. In a virtual host environment, the communication(s) connections can be a virtualized network connection provided by the virtual host. In some examples, the communication connection(s) 270 are used to supplement, or in lieu of, the input device(s) 250 and/or output device(s) 260 in order to communicate with the TCLs and/or sensors.

Some embodiments of the disclosed methods can be performed using computer-executable instructions implementing all or a portion of the disclosed technology in a computing cloud 290. For example, data acquisition and TCL actuation can be performed in the computing environment while computing energy response functions or bid generation can be performed on servers located in the computing cloud 290.

Computer-readable media are any available media that can be accessed within a computing environment 200. By way of example, and not limitation, with the computing environment 200, computer-readable media include memory 220 and/or storage 240. As should be readily understood, the term computer-readable storage media includes the media for data storage such as memory 220 and storage 240, and not transmission media such as modulated data signals.

V. Example Consumer Controller

Figure 3:
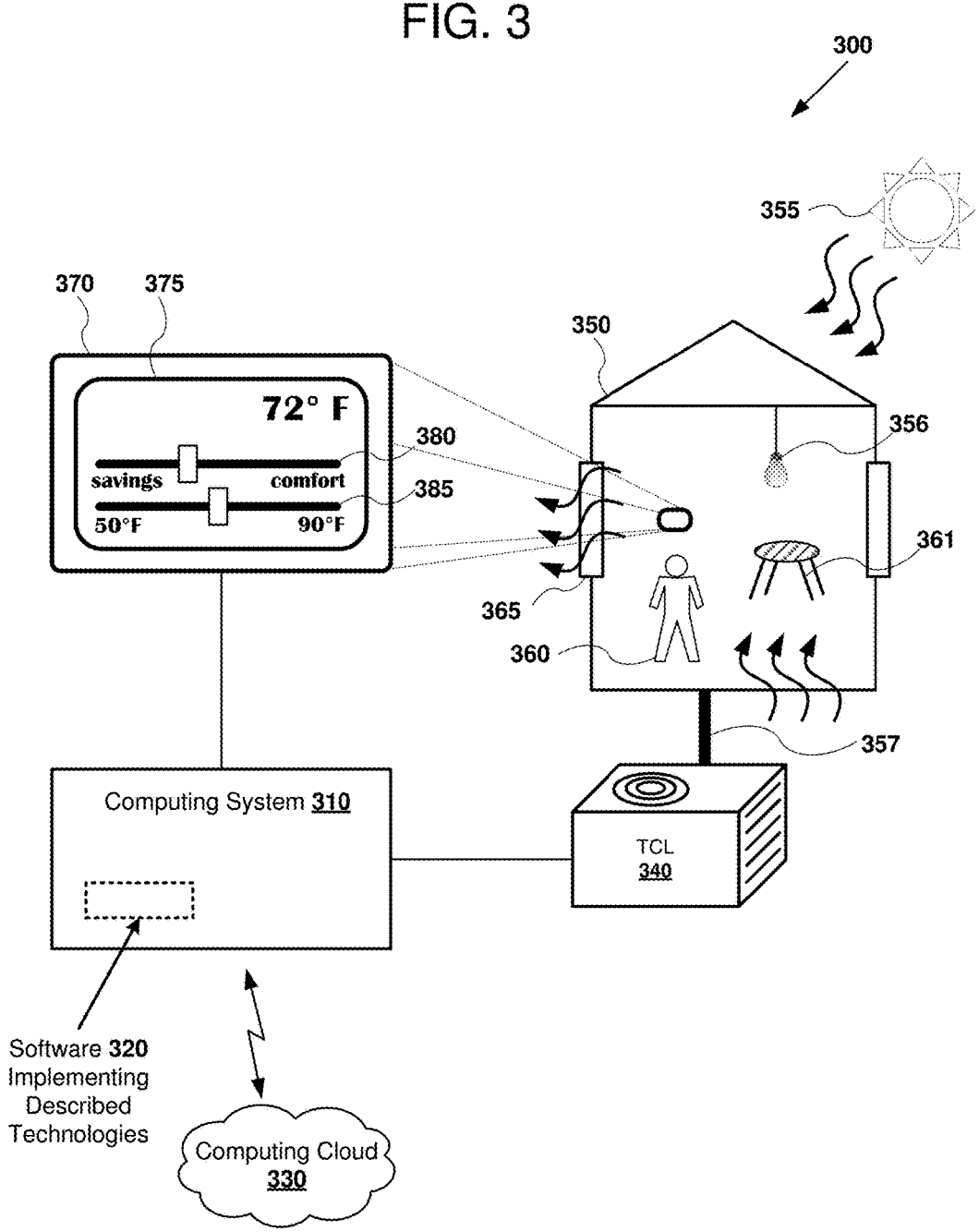
FIG. 3 illustrates an example consumer environment in which certain examples of the disclose technology can be implemented.

FIG. 3 illustrates a generalized example of a suitable consumer environment 300 in which described embodiments, techniques, and technologies, including determining an energy response, generating and sending bids, and market coordination can be implemented. For example, the consumer environment 300 can implement any of the TCL controllers, market coordinators, and/or market administrators, as described herein.

As shown in FIG. 3, a computing system 310 includes software 320 in the form of computer-readable instructions that can be operated within the computing system. For example, the computing system 310 can be implemented in a similar fashion as the computing environment 200 discussed above. In some examples, all or a portion of the functions performed by the computing system can be performed on one or more servers located within a computing cloud 330. The illustrated computing system 310 is coupled to a thermostatically-controlled load (TCL) 340. The TCL 340 in turn, is coupled to a residential building 350. The residential building receives heating and cooling loads from a number of sources, including solar radiation 355, lighting 356, and other components within the building, and heating and cooling energy 357 received from the TCL 340. The residential building 350 also includes a number of thermal masses, including people 360 and furniture 361. In addition, thermal energy can exit the consumer building 350 through, for example, windows 365 and doors.

FIG. 3 also depicts a controller 370 including a touch screen display 375 as can be used to control energy loads, including thermostatically controller loads (TCLs), in certain examples of the disclosed technology. As shown, the controller 370 includes user preference controls, including a user preference control 380, which allows a user to weight energy savings versus comfort, and a temperature control 385, which can be used to indicate a desired room air temperature. Data input using such user controls can be used in generating energy response, for example, energy response functions that relate price data to quantity data for power to be consumed by a load coupled to the controller 370. In some examples, the controller includes hardware for actuating associated TCLs, while in other examples, the controller sends signals to other hardware in order to actuate associated TCLs. In some examples, each TCL is associated with a single controller, while in other examples, a single controller is used to generate energy response data and send bids for two or more TCLs. In some examples of the disclosed technology, both the response and bidding processes are automatically executed by a programmable controller (e.g., controller 370). The user can slide the control bars to indicate user preferences, which is reflected in the energy response used to calculate bids.

VI. Example Market-Based Coordination Framework

Apparatus and methods are disclosed for implementing market-based coordination frameworks for TCLs. In an exemplary embodiment, a market coordinator procures energy from the wholesale market and manages N users to maximize the social welfare subject to a feeder power constraint. $C(\alpha)$ represents the cost for the coordinator to procure $\alpha$ unit of energy from the wholesale market. The unit price can then be the Locational Marginal Price plus some additional charge for using the distribution network. For ease of explanation for this example, it is assumed that C is convex and continuously differentiable.

The market is cleared (e.g., by the market coordinator) every T units of time. At the beginning of each time cycle, each of the local devices receives the energy price and make control decisions to maximize its individual utility. This control decision affects the load dynamics and state, and in turn influences user bidding for the next market clearing cycle. After collecting all the device bids, the coordinator determines the price such that the social welfare is maximized, and the aggregated power does not exceed the feeder power constraint. As used herein, the aggregated power is the average power consumed during each market cycle.

Figure 4:
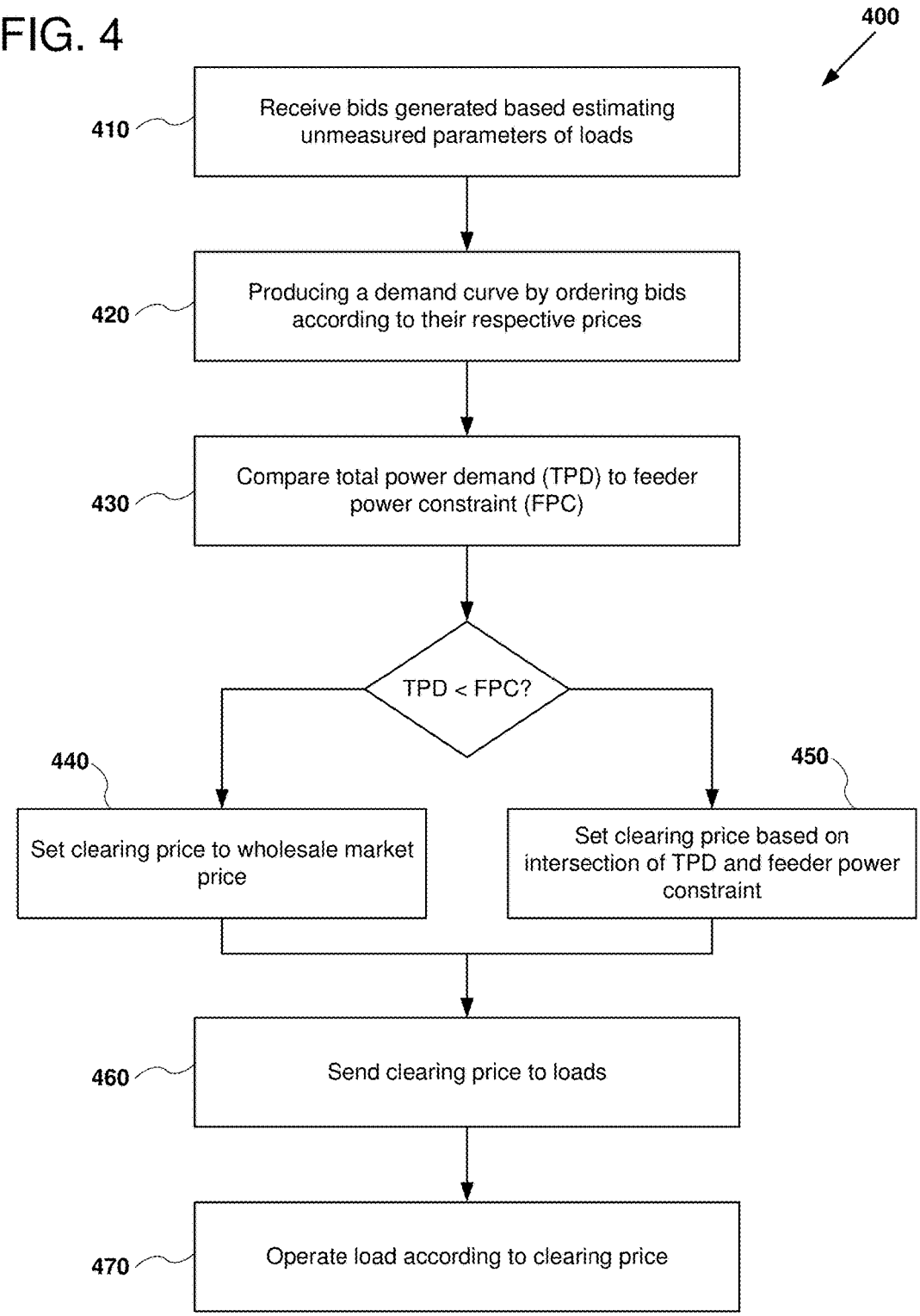
FIG. 4 illustrates an example method of setting a clearing price, as can be performed in certain examples of the disclosed technology.

FIG. 4 is a flowchart 400 outlining an example method of performing market coordination according to the disclosed technology. For example, the network environment illustrated in FIG. 1, computing environments such as those illustrated in FIG. 2, and controllers with user interfaces such as those described above regarding FIG. 3 can be used to perform the illustrated method.

At process block 410, a number of bids are received for a plurality of energy loads that were generated based, at least in part on, estimating a set of values for one or more unmeasured parameters of the thermal environment of the respective energy loads and determining an energy response relating price and quantity for a load based at least in part on the estimated unmeasured parameters. For example, each of a number of thermostatically-controlled loads (TCLs) can send bids expressed as a single price quantity pair, or as a plurality of two or more price quantity pairs. In other examples, more complex expressions of bids are received. Each of the bids can be associated with a single TCL, or represent an aggregated bid for two or more TCLs. Each of the bids for those TCLs participating in the market are for a finite time duration (e.g., five minutes). Once bids have been received for the associated TCLs, the method proceeds to process block 420. In addition to collecting the bids, the coordinator can also calculate the uncontrolled power load $Q_{uc}$ and the power feeder constraint $O_{lim}$ for the finite time period.

At process block 420, a demand curve is produced by ordering the bids received at process block 410 according to their respective prices. For example, a market coordinator can order the received bids in a decreasing sequence from the highest bid to the lowest bid. Thus, energy can be allocated to TCLs associated with higher bids at a higher priority than TCLs associated with lower bids.

Figure 5:
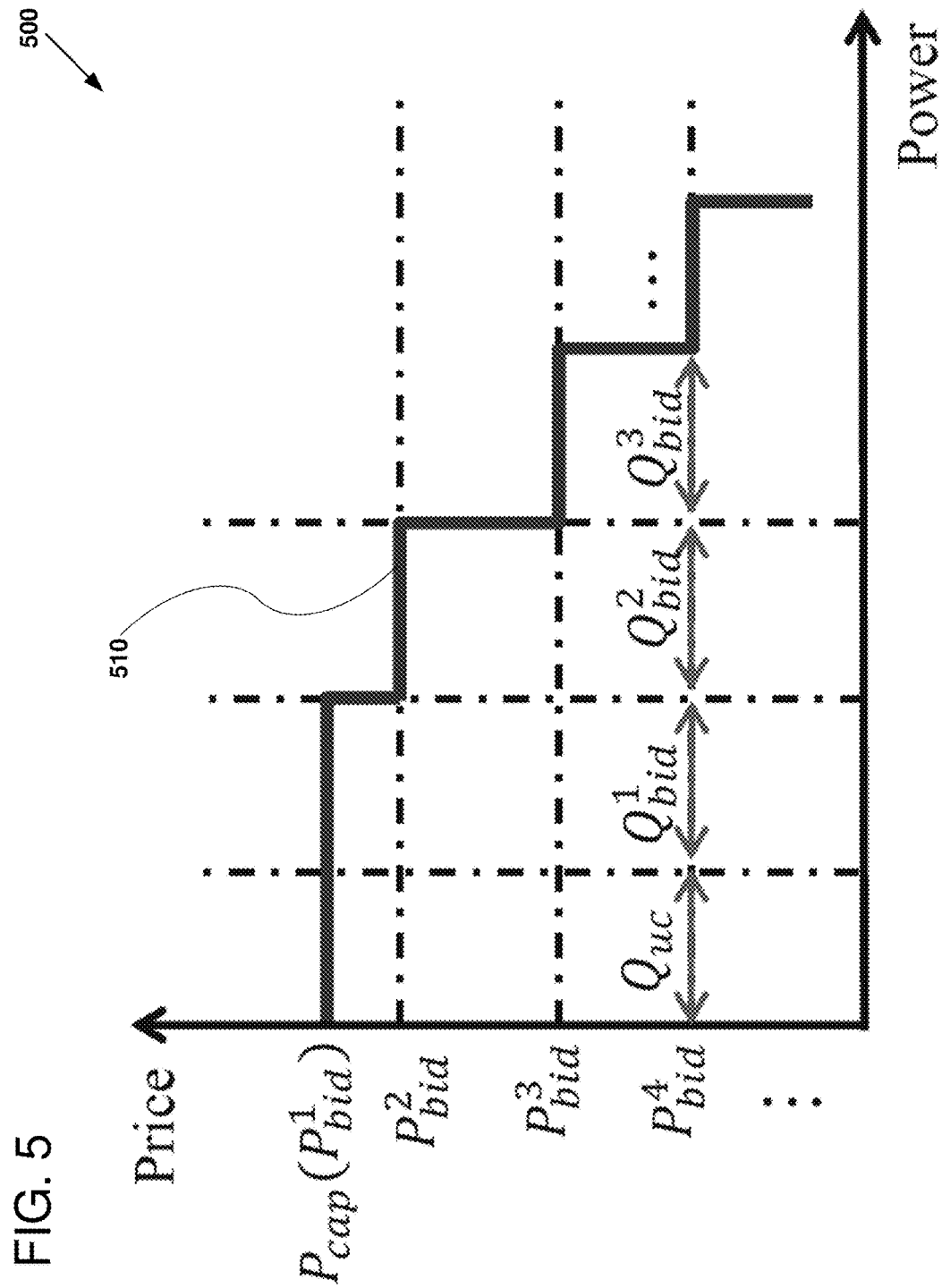
FIG. 5 illustrates an example demand curve based on a number of received user bids, according to certain examples of the disclosed technology.

FIG. 5 is a chart 500 illustrating a demand curve 510 based on a number of received user bids, according to one example of the disclosed technology. As shown in FIG. 5, $P_{bid}^i$ is the bidding price sequence in decreasing order, and $Q_{bid}^i$ is the power of the most recent on cycle. The line $Q_{uc}$ represents the uncontrolled power load, which will consume power essentially regardless of the price. As shown in FIG. 5, the y-axis is ordered according to increasing price, and the x-axis is ordered according to total amount ordered according to the cumulative amount of power bid by the sequenced bids. Thus, the highest bid $P_{bid}^1$ is ordered in the demand curve at the left-most portion and subsequent $P_{bid}^2$, $P_{bid}^3$, $P_{bid}^4$, etc., are arranged in sequence. For example, the demand curve can be produced by the market coordinator 180 described above.

Before each market clearing cycle, the market coordinator collects all the bids from the devices, and orders the bidding price in a decreasing sequence $P_{bid}^1, \ldots, Q_{bid}^1$, where N denotes the number of users. With the price sequence and the associated bidding power sequence $Q_{bid}^1, \ldots, Q_{bid}^N$, the coordinator can construct the demand curve that maps the market energy price to the aggregated power. Using the demand curve 510, the coordinator can clear the market and determine the energy price to ensure that the aggregated power does not exceed the feeder capacity: if the total power demand (the total quantity of power bid) is less than the feeder power constraint, then the clearing price is equal to the base price $P_{base}$ (see FIG. 6, below), which denotes the unit price for the coordinator to purchase energy from the wholesale market; if the total power demand is greater than the feeder power constraint, then the clearing price $P_c$ is determined by the intersection of demand curve and the feeder power constraint (see FIG. 7, below).

Once the demand curve has been produced, the method proceeds to process block 430.

At process block 430, the total power demanded according to all of the bids received is compared to a feeder power constraint. The feeder power constraint indicates the maximum amount of energy that can be provided by energy producers for the upcoming time period that the bids were based on. For example, based on power generation availability, transmission line conditions, and/or regulatory constraints, the feeder power constraint can be determined. If the total power demand is less than the amount of energy according to the feeder power constraint, the method proceeds to process block 440. Conversely, if the total power demand is greater than the feeder power constraint, the method proceeds to process block 450. Comparison of the total power demand to the feeder power constraint can be formed using the market coordinator 180 and the power generation market administrator 190 described above regarding FIG. 1.

At process block 440, because the total power demand was less than the feeder power constraint, the clearing price is set to the wholesale market price. In the depicted embodiment, the clearing price is set to the same value for all bidders in the market for the current finite time period.

Figure 6:
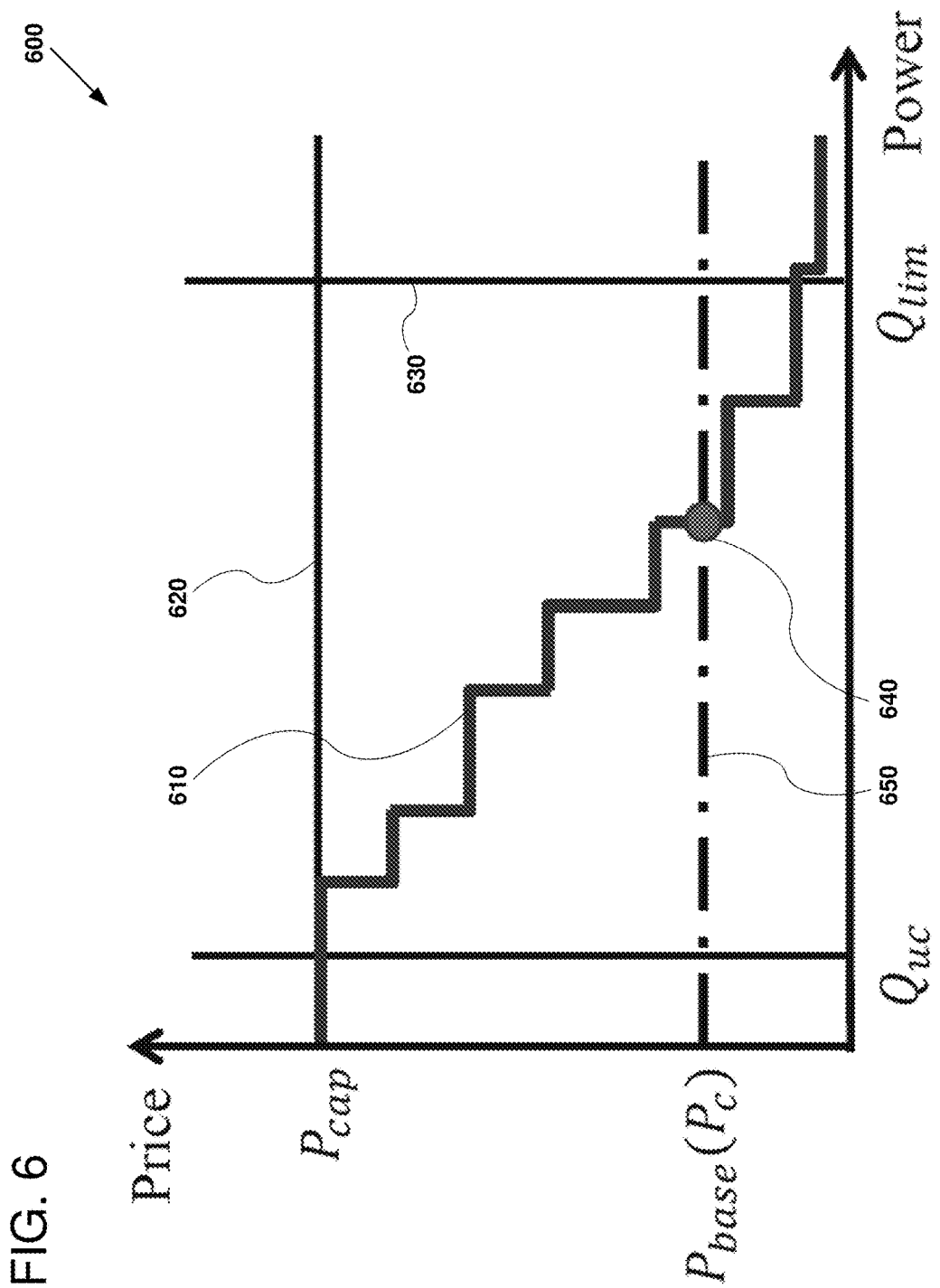
FIG. 6 illustrates an example demand curve constructed based on a number of received bids, where total power demand is less than a feeder power constraint, according to certain examples of the disclosed technology.

FIG. 6 is a chart 600 that illustrates an example demand curve 610 constructed based on all received bids where the total power demand is less than the feeder power constraint, then the clearing price is equal to the base price. A number of constraints are shown in FIG. 6, including $P_{cap}$ 620, which is the maximum price that the power grid is permitted to charge (e.g., due to regulatory constraints), and a feeder power constraint 630 ($Q_{lim}$), which represents the feeder power constraint, in other words, the maximum amount of power available for the finite time period is $Q_{lim}$. $P_{base}$ 650 represents the wholesale market energy price for the finite time period. Thus, because $P_{base}$ intersects the demand curve at a point 640 to the left of the feeder power constraint 630, all of the loads that bid at or above $P_{base}$ will receive power. The market coordinator can effect this by setting the clearing price to the wholesale market price ($P_{base}$).

On the other hand, if it was determined that the total power demand is greater than the feeder power constraint, then method proceeds to process block 450 and the clearing price is set based on the intersection of the total power demand and the feeder power constraint. In the depicted embodiment, the clearing price is set to the same value for all bidders in the market for the current finite time period. In other examples, the clearing price could vary depending on the individual bid received from each of the TCLs.

Figure 7:
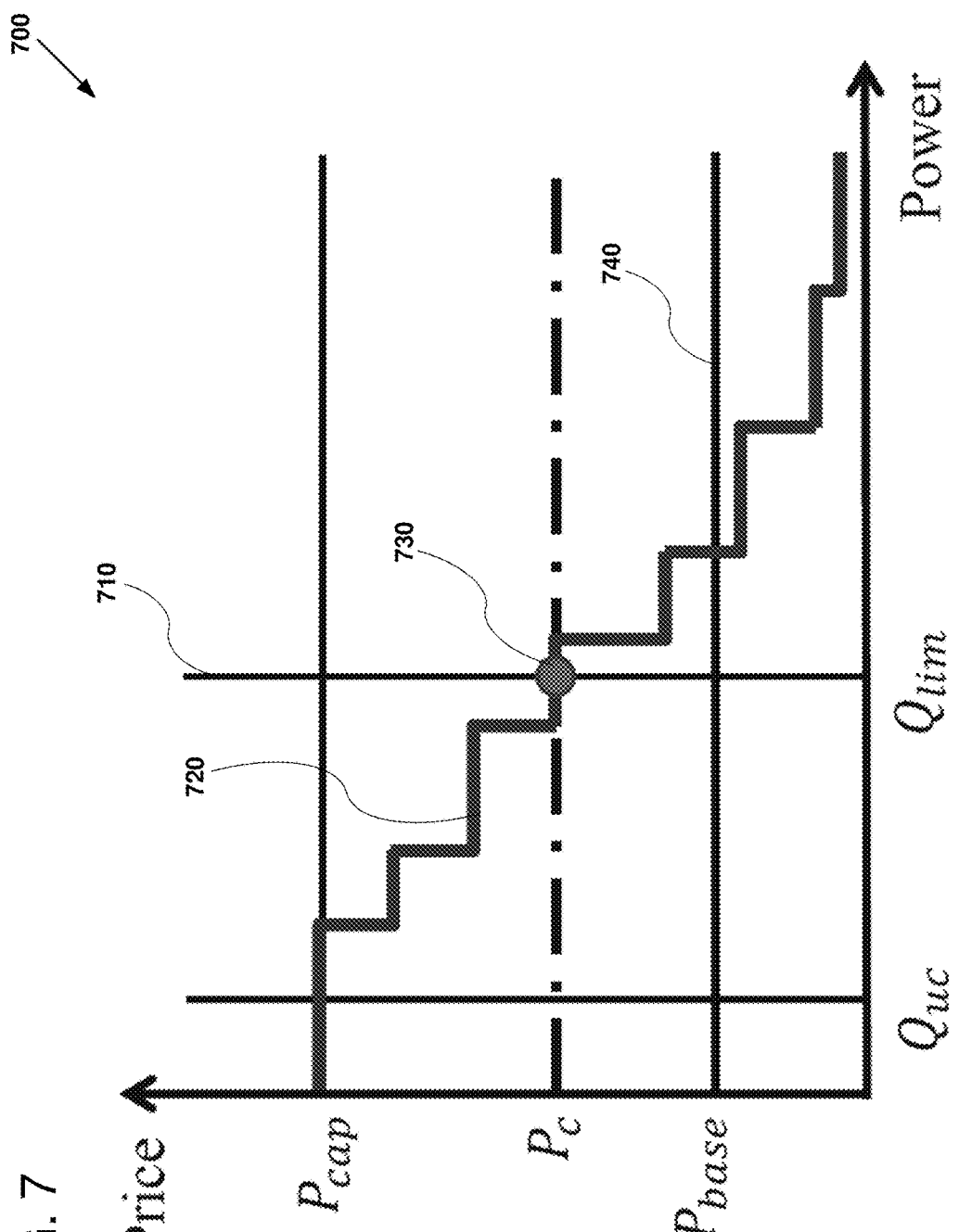
FIG. 7 illustrates an example demand curve constructed based on a number of received bids, where total power demand is greater than a feeder power constraint, according to certain examples of the disclosed technology.

An example of demand curve associated with this situation is illustrated in a chart 700 shown in FIG. 7. As shown, the feeder power constraint 710 ($Q_{lim}$) intersects the demand curve 720 at a point 730. Because the intersection point is above the wholesale energy price 740 ($P_{base}$), power will be allocated to only the highest bidders as shown. In other words, bidders associated with the bids to the left of the feeder power constraint 710 line will receive power, while other, lower bidders will not. The market coordinator 180 can effect this power distribution by setting the clearing price based on the intersection point 730. Thus, bids that were below the clearing price $P_c$ are insufficient for the associated TCL to receive power for the next finite time period. After the clearing price has been set (either at process block 440 or 450), the method proceeds to process block 460.

At process block 460, the clearing price is sent to controllers associated with TCLs that bid in the market. The clearing price can be sent, for example, using a computer network such as computer network 170 from the market coordinator 180 to each of the TCLs. After sending the clearing price to the TCLs, the method proceeds to process block 470.

At process block 470, the controllers associated with each of the bidding TCLs operate their loads according to the clearing price. In other words, if the associated TCL sent a bid greater than or equal to the clearing price, then the associated TCL is allowed to consume the amount of energy that was bid during the market session. For associated TCLs that did not submit a sufficient bid, and did not receive power because the total power demand was greater than the feeder power constraint, the associated controllers will de-activate the associated TCL.

The operations described above in the flowchart 400 can be performed repeatedly for each finite time period. For example, bidding for a next one (or more than one) time period can begin during the time period in which the TCL is operating according to a previously-cleared bid. In some examples, the sequence of bidding and price clearing is performed only once for each finite time period. Thus, communication and processing overhead associated with repeated bidding can be avoided.

In some examples of the method outlined in FIG. 4, each of the plurality of bids includes an energy to price function according to a parameter vector, and the parameter vector is substantially identical for each of the respective loads. Thus, the amount of bid data transmitted with a bid can be reduced by exploiting similarities between different TCLs bidding within the same market.

The example method of market coordination elaborated in FIG. 4 is similar in some respects to uniform price auction models for retail power price settings. In other examples, it may be suitable to adapt the disclosed market coordination technologies to other types of power auction designs, including first-price sealed-bid, pay-as-bid, descending clock, combinatorial, two-sided, or other forms of power auctions, including hybrids of the aforementioned auction designs.

Figure 8:
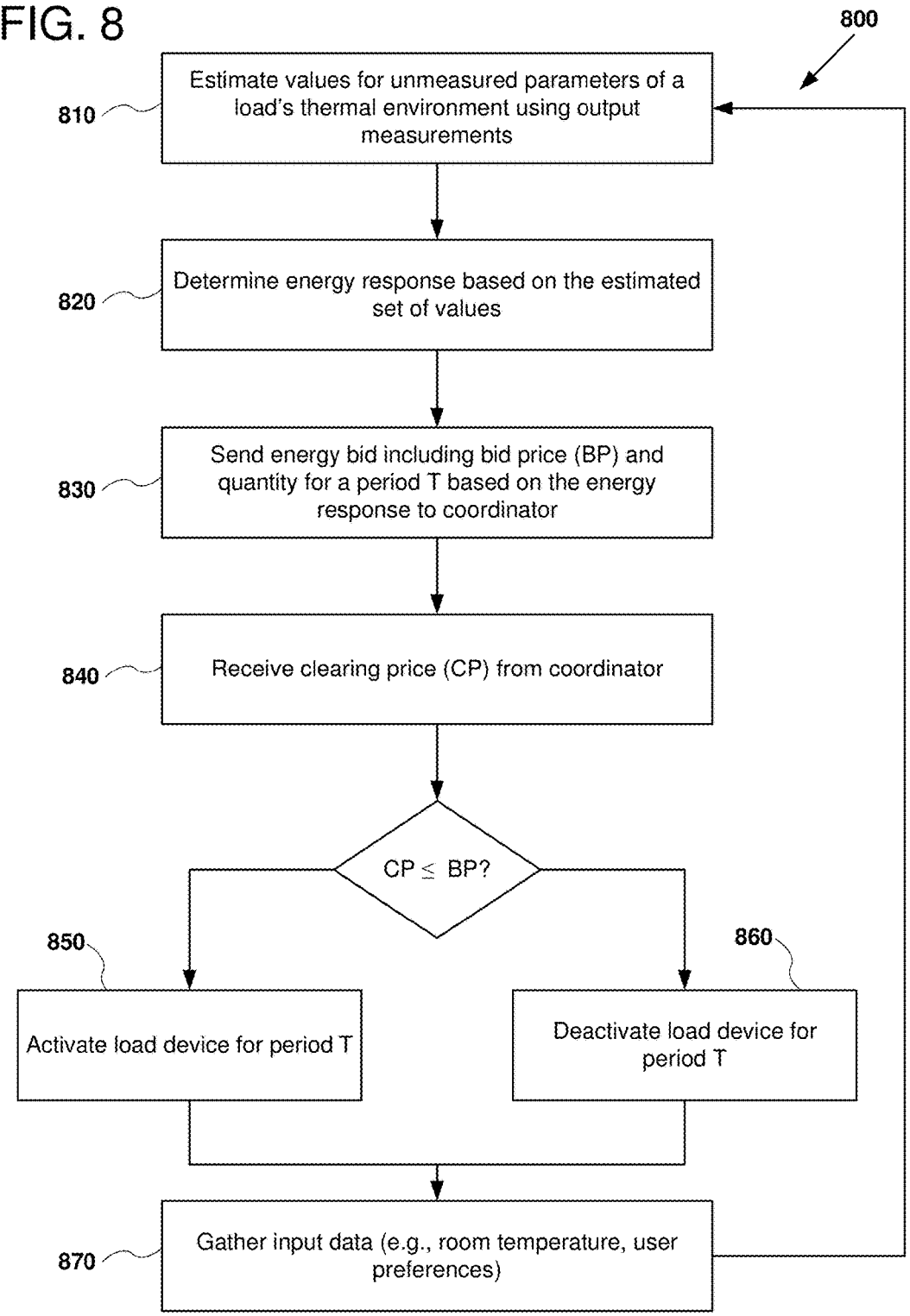
FIG. 8 illustrates an example method of estimating unmeasured parameters and sending an energy bid to a coordinator, as can performed in certain examples of the disclosed technology.

VII. Example Method of Producing Energy Response To Generate Bids for Control of Load Devices FIG. 8 is a flowchart 800 outlining an example method of determining an energy response and sending an associated bid to a market coordinator, as can be performed in certain examples of the disclosed technology. For example, the operations outlined in the flowchart 800 can be performed by controllers coupled to the TCLs illustrated in FIG. 1. A computer network (e.g., computer network 170) can be used to transmit bid data to a market coordinator (e.g., market coordinator 180), and to send data such as clearing price data from the market coordinator to controllers associated with the TCLs.

At process block 810, a set of values for one or more unmeasured parameters of the thermal environment coupled to a TCL are estimated based at least in part on a plurality of output measurements of the thermal environment. For example, certain parameters that affect the demand in the load environment (e.g., inner mass temperature, heat gain/loss from exterior factors, etc.) are not typically measurable. An example method of estimating unmeasured parameters for the TCL are discussed in further detail below regarding FIG. 12. Once the unmeasured parameters, have been estimated, the method proceeds to process block 820.

At process block 820, a controller coupled to a TCL determines an energy response relating price data to quantity data for energy or power to be consumed by the associated load. In some examples, the energy response is modeled using a function based on at least one or more of the following: a consumption state of the load (e.g., whether the load is currently operating or not), an air temperature (e.g., the current room temperature), and/or an inner mass temperature (e.g., the current temperature of solid objects within a region being heated or cooled by the associated load). In some examples, one or more of the variables on which the energy response function is based are estimated. For example, the inner mass temperature may not be available by data from a sensor. Other parameters of the energy response function can be provided by a sensor, for example the consumption state of the load, or the current room temperature. In other examples, other variables can be included in the energy response, including time of day, humidity, weather, outside air temperature, solar gain, or other suitable parameters.

In some examples, the energy response is a function of a user response parameter where the user response parameter relates an energy price and a user-selected comfort level. For example, the user can indicate a desired comfort level in relation to price using a controller, such as the controller 370 discussed above regarding FIG. 3.

In some examples, the energy response is based, at least in part, on an equivalent thermal parameter model and a control policy indicating one or more power states for the load. These parameters are discussed further below. In some examples, the bid includes exactly one price and one corresponding quantity. In other examples, the bid includes two or more prices and two or more respectively corresponding quantities. In some examples, the bid is based on a point between two vectors that relate a state of the load, a model parameter, and a user input parameter. In some examples, the bid is based, at least in part, on an equivalent thermal parameter model. In some examples, the finite time period is less than one hour. In some examples, the finite time period is approximately five minutes or ten minutes.

A further detailed explanation of determination of exemplary energy consumption functions and energy response curves are discussed below and illustrated in FIGS. 9-11.

After determining an energy response, data representing the energy response is encoded and the method proceeds to process block 820.

At process block 830, the energy bid for a finite time period T based on the energy response data generated at process block 820 is sent to a market coordinator. For example, the energy bid data can be sent using a wired computer network, a wireless computer network, satellite or radio communication, or other suitable technologies for sending data to the market coordinator. After sending the energy bid to the market coordinator, the method proceeds to process block 840.

At process block 840, a clearing price is received from the market coordinator. The clearing price is based, at least in part, on the bid submitted by the controller at process block 830 in combination with energy bids that were submitted by other energy consumers associated with the same market coordinator. After receiving the clearing price for the associated time period T, the method compares the clearing price to the bid price. If the clearing price is less than the bid price, then the method proceeds to process block 850. If, on the other hand, the clearing price is greater than the bidding price sent at process block 830, then the method proceeds to process block 860.

At process block 850, one or more load devices associated with the controller and the successful energy bid (e.g., a clearing price that was less than or equal to the bidding price) is used to activate the associated load device for the finite time period T. In some examples, the load device is activated at a finer granularity than on/off. The load device is then permitted to consume its bid amount of energy for the corresponding time period.

At process block 860, the controller associated with the load uses an actuator to de-activate the load device for the finite time period T associated with the bid sent at process block 830. Thus, because the bid sent at process block 830 was insufficient, the load device remains idle for the finite time period. After de-activating the load device, the method proceeds to process block 870.

At process block 870, additional input data is gathered (e.g., room temperature, user preferences, inner mass temperatures, and other suitable data). The input data gathered is to be used for determining an energy response for the next time period. Once sufficient input data is gathered, the method proceeds back to process block 810 in order to determine a second energy response for a second finite time period.

Further details regarding suitable techniques and apparatus for determining pricing and bidding strategies are discussed below in Part A.

A. Introduction to Disclosed Consumer Load Pricing and Bidding Strategies

In some examples of the disclosed technology, an example pricing bidding strategy is present as a coordination problem for a group of TCLs, where the coordinator allocates energy to users to maximize social welfare subject to a feeder power constraint. The details of the examples in this Section can be implemented in modified versions of the method outlined and discussed above regarding FIG. 8. Each device is assumed to be equipped with a smart thermostat that includes two functions. The first function allows the user to specify energy use preferences via a sliding bar to indicate one's trade-off between comfort and cost (e.g., using the control 320 depicted in FIG. 3). For the second function, in each market period the load controller submits a bid to a market coordinator based on the preferences specified by the sliding bar and one or more local device measurements, such as power consumption, "on/off" states, and local temperature. The market coordinator collects the user bids, determines the energy price, and broadcasts the price to all the devices. Each device will then adjust the temperature setpoint in response to the energy prices to maximize the individual utility, which modifies the system dynamics and therefore affects the user bids for the next period. In the immediate scenario, it is assumed that each user is a price taker, indicating that no single buyer is large enough to influence the market price. This is a valid assumption when the market involves a large number of players.

The remainder of this section provides formal mathematical descriptions of the components of a framework that can be used to implement the disclosed technologies.

B. Example Formulation of an Optimization Problem for Application of User Preferences and Utility In the example formulation, assume that there are N self-interested users. Each user is to determine the temperature setpoint to obtain an energy allocation that maximizes each respective individual's utility (e.g., the user's comfort minus the electricity cost). In other words, each user is confronted with the tradeoff between comfort and electricity cost: when the electricity price is high, the load controller will adjust the temperature setpoint to save electricity cost at the sacrifice of some user comfort. Formally, a function $V_i(a_i): \mathbb{R} \to \mathbb{R}$ can be used to represent the comfort level for each user with allocation $a_i$. Assume that $V_i(a_i): \mathbb{R} \to \mathbb{R}$ is concave, continuously differentiable, $V_i(0)=0$, and $V_i'(0)>0$. Let $\theta_i(t_k)$ represent the private information of user i. Denote $E_i^m$ as the energy consumption for the ith load if it is "on" during the entire period, i.e., $a_i < E_i^m$. The individual utility maximization problem can be formulated as follows:

$$\max_{a_i} V_i(a_i; \theta_i(t_k)) - P_c a_i$$

subject to:

$$0 \le a_i \le E_{im} \quad (1)$$

where $P_c$ is the energy price. Let $h_i: \mathbb{R} \to \mathbb{R}$ be the optimal solution to the optimization problem (1), produces:

$$h_i(P_c; \theta_i(t_k)) = \underset{0 \le a_i \le E_i^m}{\mathrm{argmax}} V_i(a_i; \theta_i(t_k)) - P_c a_i \quad (2)$$

It can be verified that with the conditions imposed on V that $h_i$ is continuous and non-increasing with respect to $P_c$ for each $i=1, \ldots, N$. It will be readily apparent to one of ordinary skill in the art that in the example formulation, the user cannot directly choose his optimal energy allocation. Instead, in this example, the user can only determine the temperature setpoint, which affects the energy consumption through the load dynamics.

C. Example Determination of Individual Load Dynamics

Let $\eta_i(t) \in \mathbb{R}^n$ be the continuous state of the ith load. Denote $q_i(t)$ as the "on/off" state: $q_i(t)=0$ when the load (e.g., a TCL) is off, and $q_i(t)=1$ when it is on. The system dynamics can be represented by $f_{on}^i$ and $f_{off}^i: \mathbb{R}^n \to \mathbb{R}^n$ as follows:

$$\dot{\eta}_i(t) = \begin{cases} f_{on}^i(\eta_i(t); \theta_i^m) & \text{if } q_i(t) = 1 \\ f_{off}^i(\eta_i(t); \theta_i^m) & \text{if } q_i(t) = 0 \end{cases} \quad (3)$$

where $\theta_i^m$ is the model parameter, and the state vector $\eta_i(t)$ includes the air temperature ($T_c^i(t)$) and any other suitable measurable parameters.

The power state of the TCL can be regulated by a hysteretic controller based on the control deadband $[u_i(t)-\delta/2, u_i(t)+\delta/2]$, where $u_i(t)$ is the temperature setpoint of the ith TCL and $\delta$ is the deadband. When the TCL controller is operating in the cooling mode, the load is turned off when $T_c^i(t) \le u_i(t)-\delta/2$, is turned on when $T_c^i(t) \ge u_i(t)-\delta/2$, and remains in the same power state otherwise. This example hysteretic control policy can be described as:

$$q_i(t^+) = \begin{cases} 1 & \text{if } T_c^i(t) \geq u_i(t) + \delta/2 \\ 0 & \text{if } T_c^i(t) \leq u_i(t) - \delta/2 \\ q_i(t) & \text{otherwise} \end{cases} \quad (4)$$

For notational convenience, a hybrid state $z_i(t)=[\eta_i(t), q_i(t)]$ is defined that includes of both the temperature and the "on/off" state of the load. Let $[t_k, t_k+T]$ be the kth market clearing period, then the energy consumption of each load during the kth period depends on the system state and setpoint control $u_i(t)$. In this example, the private information consists of system state and model parameters. Therefore, the energy consumption of each load can be represented as $e_i(u_i(t_k), z_i(t_k), \theta_i^m)$. This energy consumption function can be derived by calculating the portion of time that the system is on over the entire market period.

Figure 9:
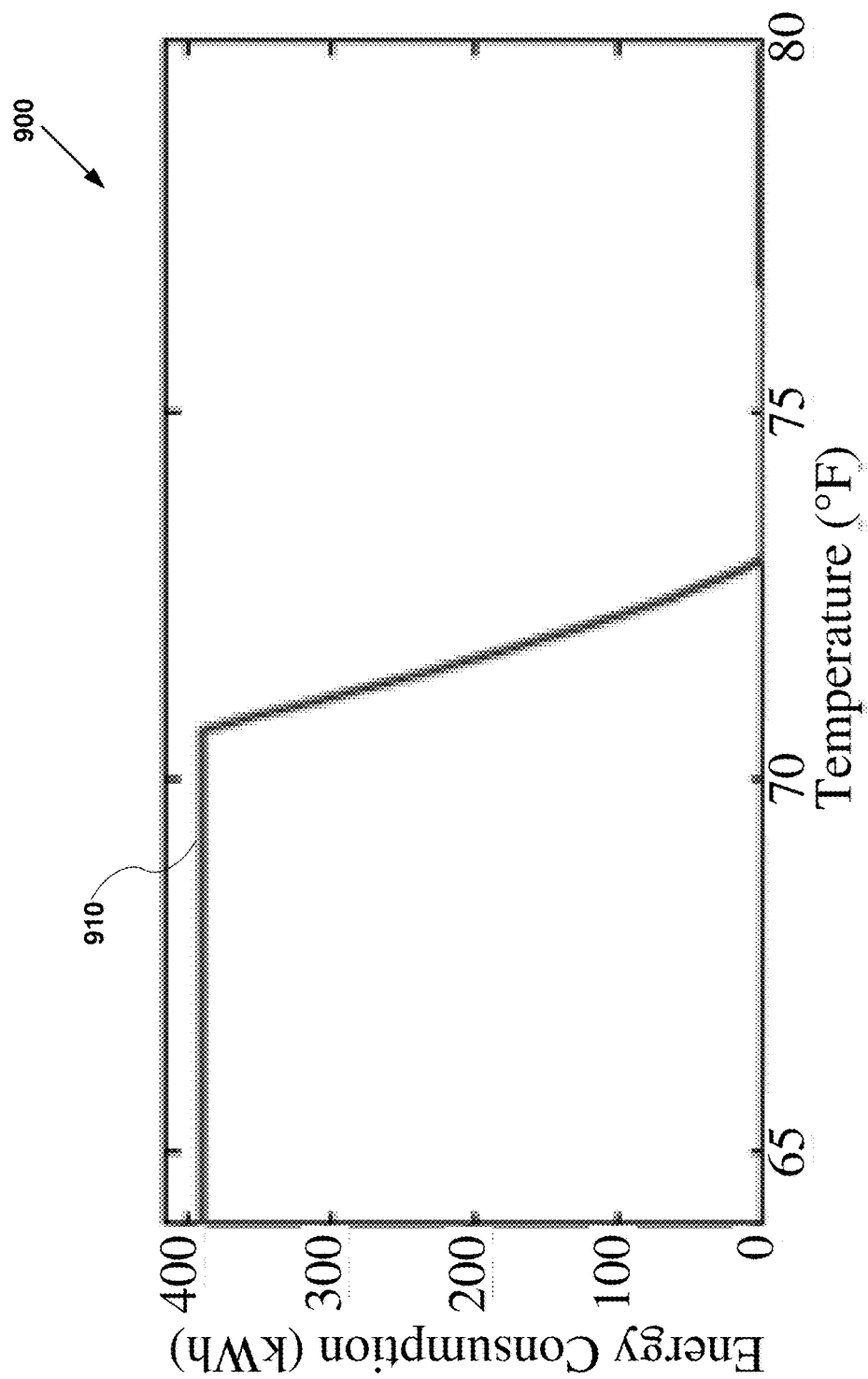
FIG. 9 illustrates energy consumption of a TCL during a market clearing cycle as a function of temperature setpoint, according to certain examples of the disclosed technology.

FIG. 9 is a chart 900 that illustrates a curve 910 for an example energy consumption function according to a second order equivalent thermal parameter model, as can be used in certain examples of the disclosed technology. For the example chart 900, system dynamics by $f_{on}^i$ and $f_{off}^i$ are linear and the initial room temperature is 72.8° F.

As shown, the associated TCL is an air conditioning unit that will consume a maximum amount of energy up to a temperature of about 71 degrees Fahrenheit and will then consume a lower amount of energy according to a slope up to about 73 degrees Fahrenheit. Thus, the temperature represents the thermostat set point associated with the air conditioner TCL.

Figure 10:
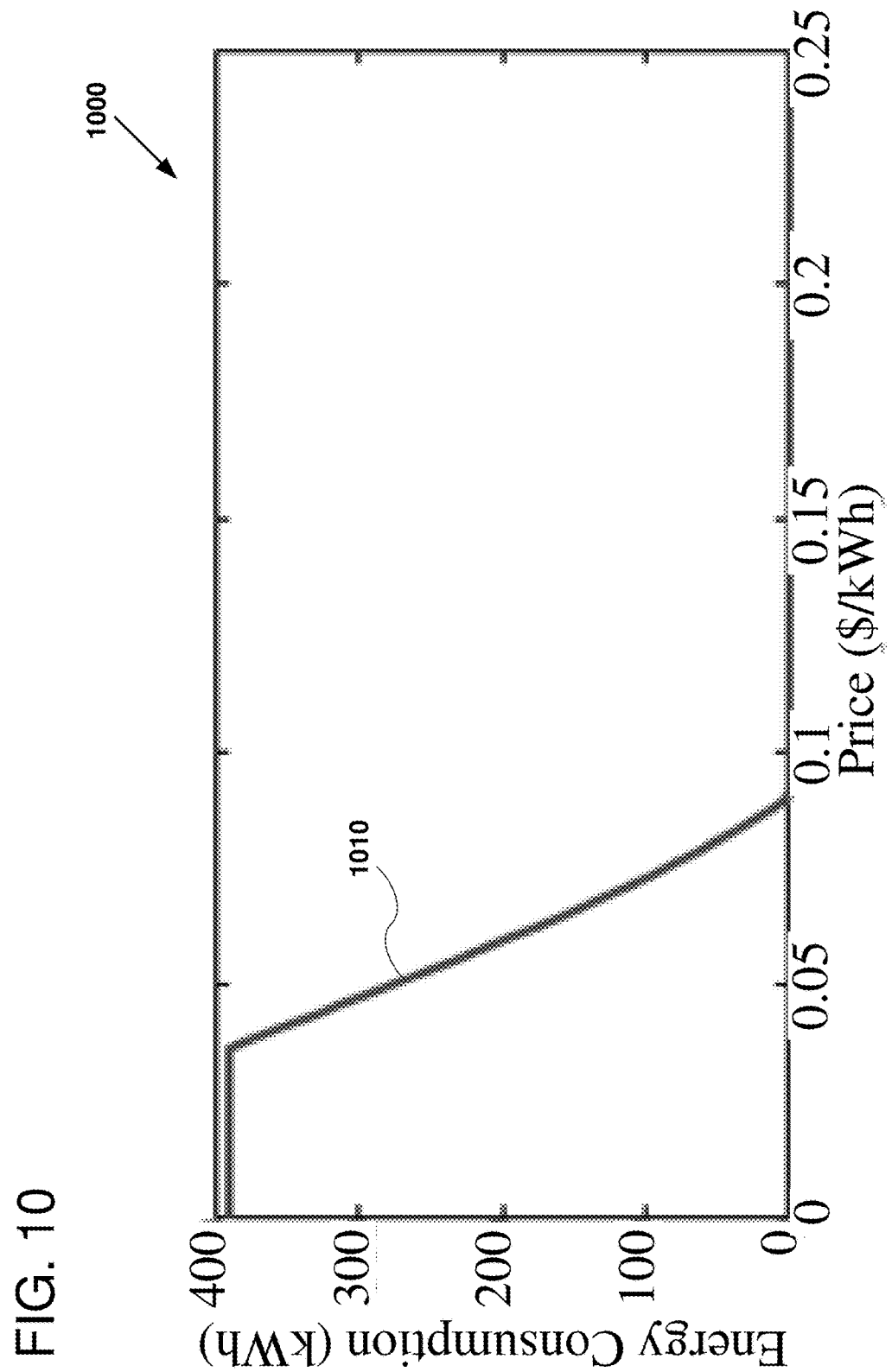
FIG. 10 is energy consumption of the TCL during a market clearing cycle as a function of the energy price, according to certain examples of the disclosed technology.

FIG. 10 is a chart 1000 that illustrates a curve 1010 for the example energy consumption of a TCL during a market-clearing cycle as a function of the energy price, as can be realized in certain examples of the disclosed technology. As shown, when the energy price is approximately four cents or less, the energy consumption is approximately at its maximum, and decreases successfully as the energy price increases up to approximately nine cents.

Determinations of example energy consumption functions, as can be implemented in some examples of the disclosed technology, are discussed in further detail below.

For notational convenience, let $\theta_i(t_k)=(z_i(t_k), \theta_i^m)$ represent user's private information, then the energy function can be written as $e_i(u_i(t_k), \theta(t_k))$. Notice that the private information for users is time varying, as it contains the system state.

After the market is cleared, each user attempts to determine the control action $u_i(t_k)$ such that the resulting energy consumption equals the optimal solution to (1). Since the optimal control depends on the energy price, a user response function can be defined, $\varphi_i: \mathbb{R} \to \mathbb{R}$ with $u_i(t_k)=\varphi_i(P_c)$. Therefore the optimal energy allocation function $h_i$ as defined in (2) should satisfy the following:

$$h_i(\cdot; \theta_i(t_k))=e_i(\varphi_i(\cdot), \theta_i(t_k)) \quad (5)$$

The left side of equation (5) represents the optimal energy allocation for a given price, while the right side arises from the physical property of the individual loads, and indicates that the user can specify the control action $u_i$ to match the actual energy consumption to the optimal allocation.

Figure 11:
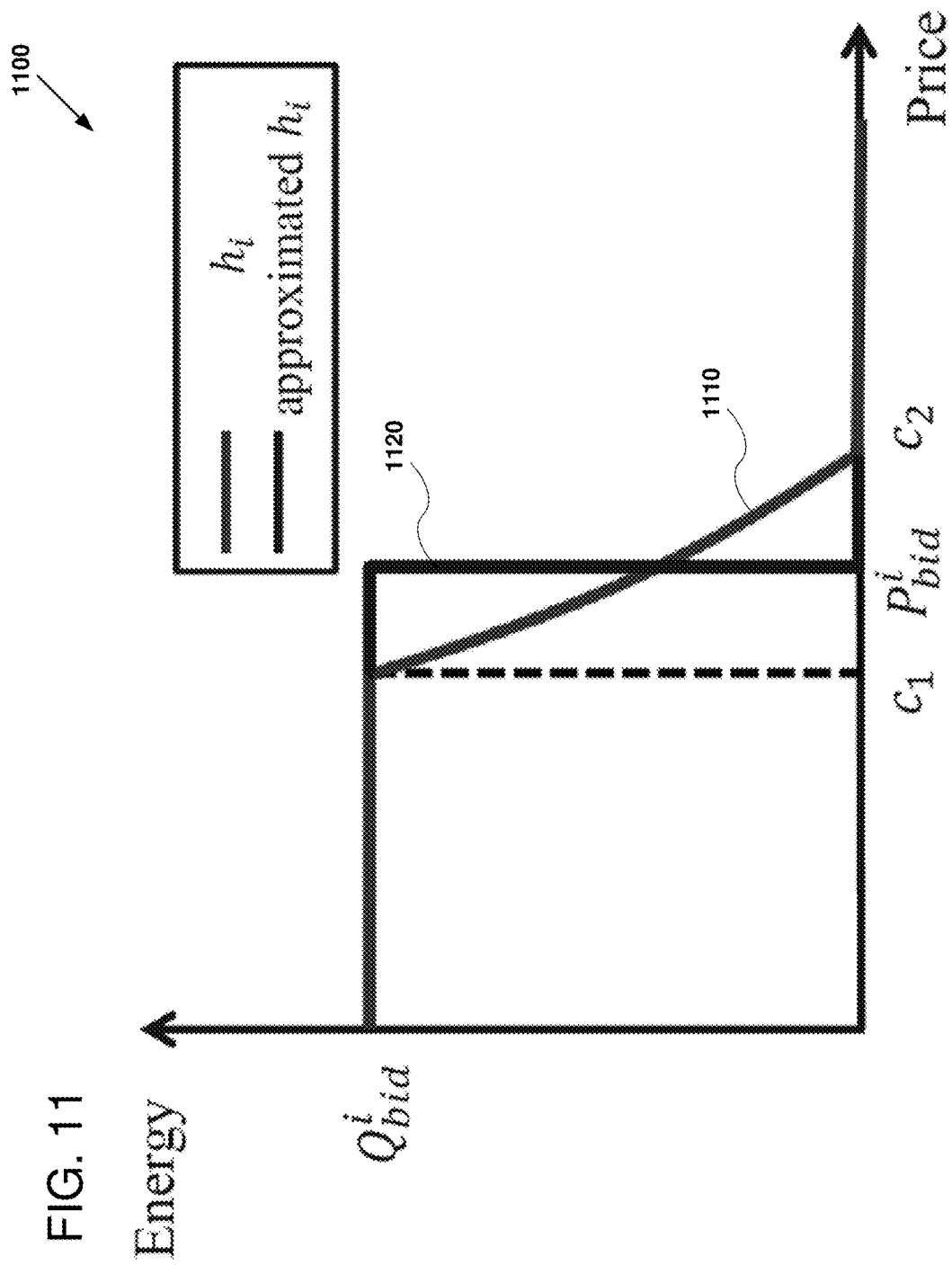
FIG. 11 is a chart illustrating an energy response curve and its approximation using a step function.

FIG. 11 is a chart 1100 depicting an energy response curve 1110 and an approximated energy response curve 1120 that can be used to submit bids to a market coordinator according to the disclosed technology. An example of function $h_i$ is shown in FIG. 11, where the system dynamics are linear, the bidding curve is piece-wise linear (as shown in FIG. 2), and the initial room temperature is 72.8° F. As shown in the chart 1100, increasing energy consumed is plotted along the y-axis, and increasing bid price is plotted along the x-axis. The energy response curve 1110 corresponds to an energy function $h_i$. As shown, $h_i$ is set at a maximum energy consumption for the associated TCL up to a first price point $c_1$ which the energy consumption bid decreases down to zero energy consumption at point $c_2$. The approximated energy response curve 1120 shown in FIG. 11 is a step function that intersects the true energy response function at a point half way between points $c_1$ and $c_2$. In other examples, the approximated energy response function 1120 can be represented using different types of approximations (e.g., a piece-wise linear model, a parameterized sigmoid function, or other suitable approximation). In some examples, the bid includes the energy response function itself. Design choices as to whether and how to approximate the energy response function can take into account available network resources, capabilities of the market coordinator and other suitable parameters for consideration. Thus, the energy response function $h_i$ can be represented as a single pair $[P_{bid}, Q_{bid}]$.

D. Example Determination of Clearing Price

The market coordinator purchases energy from the wholesale market at a cost denoted as $C(\Sigma_{i=1}^N a_i): \mathbb{R} \to \mathbb{R}$. We assume that $C(\cdot)$ is differentiable and convex. The energy is then allocated to users to maximize the social welfare, which can be defined as:

$$\Sigma_{i=1}^N V_i(a_i; \theta_i(t_k)) - C(\Sigma_{i=1}^N a_i).$$

After the market price is determined, individual user will respond by adjusting the control setpoint, and there always exists a resulting energy allocation, $a=(a_1, \ldots, a_N)$. However, the inverse is not necessarily true: for a given energy allocation, the coordinator cannot always find a price to realize it.

Example Determination 1

As an example, consider two users with $V_i(a_1; \theta_1(t_k))=a_1$, $V_2(a_2; \theta_2(t_k))=3a_2$. The energy cost for the coordinator is $C(a_1+a_2)=2a_1+2a_2$. The group objective is to maximize the social welfare subject to a feeder power constraint, for example:

$$\max_a \sum_{i=1}^2 V_i(a_i; \theta_i(t_k)) - C(a_1 + a_2) \quad (6)$$

subject to:

$$\begin{cases} a_1 + a_2 \leq 1 \\ 0 \leq a_i \leq 2, \end{cases}$$

for $i = 1, 2$

The optimal solution to Determination (6) is $a_1=0$, $a_2=1$. However, according to (1), given any energy price, $a_i$ is either 0 or 2. Therefore, the optimal energy allocation cannot be achieved.

To address this concern, the concept of realizable energy allocation can be applied as follows.

Example Energy Allocation Vector:

An energy allocation vector, $a=(a_1, \ldots, a_N)$, can be realized if there exists a price $P_c$, such that $a_i=h_i(P_c; \theta_i, (t_k))$ for all i=1, ..., N. In this case, $P_c$ realizes the energy allocation a in the kth market period.

With the above energy allocation vector, a set $\mathbb{R}_k$ can be defined to denote all the realizable energy allocation:

$$\mathcal{R}_k = \{a | \exists P_c, s.t. a_i = h_i(P_c; \theta_i(t_k)), \forall i=1, \ldots, N\} \quad (7)$$

Thus, an optimal energy allocation is in this set, and therefore there exists a price to realize the allocation. Analysis of such an allocation can be formally described as follows:

Example Problem 1

Design a bidding and clearing strategy, such that the cleared price realizes the allocation a* that maximizes the social welfare subject to a feeder power constraint, e.g., a* is the solution to the following optimization problem:

$$\max_{a \in \mathcal{R}_k} \sum_{i=1}^{N} V_i(a_i; \theta_i(t_k)) - C\left(\sum_{i=1}^{N} a_i\right) \quad (8)$$

subject to:

$$\begin{cases} \sum_{i=1}^{N} a_i \leq D \\ 0 \leq a_i \leq E_i^m, \forall i = 1, \ldots, N \end{cases}$$

It should be noted that Example Problem 1 is a convex optimization problem. However, due to limited communication resources, privacy issues, and unknown load parameters in real-world environments, it is infeasible for the market coordinator to have all the global information available in real time. Thus, the market coordinator can motivate self-interested individual users to submit useful information for the collective decision-making by applying targeted market rules.

The example feeder power constraint couples individual allocations through an inequality. In such cases, a price does not always exist to realize the optimal energy allocation taking into account the feeder power constraint. The set $\mathbb{R}_k$ can be used to ensure that the solution to the optimization problem (8), as stated above, is realized.

The exemplary proposed framework is different from the wholesale energy market, at least in that it incorporates the internal dynamics of TCLs into the decision-making. The clearing energy price triggers changes on setpoint control, which in turn modifies the system dynamics and affects the power consumption. In this manner, the load dynamics become important for the overall price response.

E. Example Aggregation of User Preferences

An example proper bidding and pricing strategy is presented, such that when each user (e.g., TCL consumers) selfishly attempts to maximize individual utility, the resulting outcome can also achieve a desired group objectives (e.g., by attempting to maximize social welfare).

Let $x \in X$ be the outcome of the mechanism that consists of the energy allocation and the energy price, e.g., $x=(a_1, \ldots, a_N, P_c)$. The utility of each user (comfort minus electricity cost) depends on the outcome. Moreover, it is assumed that at time $t_k$, each user can privately observe his utility, $U_i$ over different outcomes. In other words, the example model assumes that user i privately observes a parameter $\theta_i$ that determines its local utility. It should be noted that for ease of explanation, the dependence of $\theta_i$ on $t_k$ is omitted throughout the rest of this disclosure for notational convenience. In the exemplary mechanism design, $\theta_i \in \Theta_i$, is referred to as the user i's type, where $\Theta_i$ denotes the set of all the possible types. The user type contains the system state, $z_i(t_k)$, and the model parameter, $\theta_i^m$, in particular:

$$U_i(x; \theta_i) = V_i(a_i; \theta_i) - P_c a_i \quad (9)$$

where $\theta_i = [z_i(t_k), \theta_i^m]$.

As the user preferences are private, to determine the optimal energy price, the market coordinator requests that each user submit a bid to reveal at least a portion of the private information. Formally, this can be formulated as a message space $M = M_1 \times \ldots \times M_N$, where $M_i$ denotes the space of messages (bids) the ith user can communicate to the coordinator. The structure of $M_i$ depends on particular applications. In some examples each load device controller submits a price and a quantity, such that $(P_{bid}^i, A_{bid}^i) \in M_i$. In other examples, each load device controller submits the slope of a demand curve, $\beta_i$, in which case $\beta_i \in M_i$. After collecting the user bids, the market is cleared with an energy price and a corresponding energy allocation. The clearing strategy can be represented by an outcome function, $g: M \to X$, that maps the bids to an outcome, x. The message space and the outcome function together can fully characterize the rules governing the procedure for making the collective choice, and this is typically referred to as a mechanism:

Example Mechanism Definition 2

A mechanism $\Gamma = (M_1, \ldots, M_N, g(\cdot))$ is a collection of N message spaces $(M_1, \ldots, M_N)$ and an outcome function, $g: M \to X$.

Each controller observes $\theta_i$ privately and determines what to bid to maximize local load utility. This process can be represented by a bidding strategy $m_i: \Theta_i \to M_i$ that maps the type to a message. A number of different solution concepts for the mechanism can be applied, The present explanation applies a dominant strategy equilibrium as follows, although other suitable solution concepts can be applied, such as Nash equilibrium, Bayesian Nash equilibrium, etc. Denote $m_{-i}$, as a collection of strategies of all the users other than i, then an example dominant strategy equilibrium can be defined as follows:

Example Dominant Strategy Equilibrium:

Strategy profile $(m_1^*(\cdot), \ldots, m_N^*(\cdot))$ is a dominant strategy equilibrium of mechanism $\Gamma = (M_1, \ldots, M_N, g(\cdot))$ if for all i and all $\theta_i \in \Theta_i$, $U_i(g(m_i^*(\theta_i), m_{-i}), \theta_i) \geq U_i(g(m'_i(\theta_i), m_{-i}), \theta_i)$ for all $m'_i(\theta_i) \in M_i$ and all $m_{-i} \in M_{-i}$.

For Nash equilibrium, each agent plays the equilibrium strategy only when the agent has a correct forecast of the actions of other agents. When such knowledge is unavailable, it typically takes multiple iterations of information exchanges between the agents and coordinator to elicit the equilibrium strategy of the game. In contrast, the dominant strategy equilibrium discussed above is typically robust, as a rational agent always follows the equilibrium strategy regardless of other agent's actions. In other words, even when the load controller does not have knowledge regarding the actions of other loads, the controller still plays the equilibrium strategy. This enables each controller to only bid once at each market period, which can significantly reduce the communication overhead in certain examples of the disclosed technology.

The equilibrium strategy characterizes the individual' TCL's self-interested behavior: each TCL is controlled to maximize its associated consumer's individual welfare. However, for the market coordinator, it may be more desirable to find the best choice for the overall social welfare. For this reason, a social choice function $f: \Theta \to X$ can be defined to represent the desired social outcome of the coordinator. More specifically, $f(\bullet)$ determines what outcome will be chosen by the coordinator if had access to all the consumer private information. In our problem, $f$ consists of the optimal energy allocation to optimization problem (8) and the price that realizes this allocation. If we define $\theta=(\theta_1, \ldots, \theta_N)$, the conflict between the personal interest and social interest can be captured by the concept of the implementation described by Example Definition 4:

Example Definition 4 (Implementation)

A mechanism $\Gamma=(M_1, \ldots, M_N, g(\bullet))$ implements the social choice function $f(\bullet)$ in dominant strategies if there exists a dominant strategy equilibrium $m^*(\bullet)$ of $\Gamma$, such that $g(m_1^*(\theta_1), \ldots, m_N^*(\theta_N))=f(\theta)$ for all $\theta \in \Theta$.

In the above definition, $g(m_1^*(\theta_1), \ldots, m_N^*(\theta_N))$ represents the resulting outcome of individual maximization, while $f(\theta)$ denotes the desired social outcome. The concept of implementation characterizes the social choice that can be realized when all the users take actions to selfishly maximize the individual utility. To this end, Problem 1 can be equivalently stated as the following Problem 2:

Problem 2:

Design a mechanism to implement the social choice function $f(\bullet)$ that maximizes the social welfare subject to a feeder power constraint, $f(\theta)$, is the solution to the optimization problem (8).

The design of a mechanism includes specifying the message space and the outcome function for each user. In the mechanism design problem, the coordinator needs to design the message space and the market clearing rule such that the optimal social welfare can be implemented when each user selfishly maximizes the individual utility, and very importantly, the feeder power constraint needs to be respected. Notice that although a power capping problem is considered in this paper, the proposed framework can be easily adapted to other demand response application, such as load following and frequency regulation.

F. Constructing the Example Mechanism $\Gamma$

Let $f^*(\theta)=(a_1^*, \ldots, a_N^*, P_c^*)$ be the social choice function that maximizes the social welfare subject to the feeder power constraint. Specifically, $(a_1^*, \ldots, a_N^*)$ is the optimal solution to (8), and $f^*(\theta)$ satisfies the following condition:

$$a^*_i = h_i(P_c^*; \theta_i(t_k)), \forall i=1, \ldots, N \quad (10)$$

This subsection constructs a mechanism to implement $f^*(\bullet)$.

Consider a mechanism $\Gamma^*$, where each device is asked to submit function $h_i(\bullet; \theta_i)$. Due to the assumption on the convexity of $V_i$, it can be verified from (1) that the curve $h_i(P_c; \theta_i)$ is non-increasing with respect to $P_c$. In this case, the message space is the function space of all possible $h_i$ (non-increasing functions). It should be noted that the user's actual bids may deviate from function $h_i$, unless they are motivated to bid $h_i$. Let $b_i(\bullet; \theta_i)$ be a non-increasing function that represents the user's actual bid. The aggregated demand curve $b(\bullet; \theta)$ can be obtained by adding individual bidding functions, i.e., $b(\bullet; \theta)=\Sigma_{i=1}^N b_i(\bullet; \theta_i)$. In this example mechanism, each user is required to submit a function, which requires considerable communication resources. This bidding strategy will be simplified in the next subsection to reduce the communication overhead.

The following outcome function $g(b_1, \ldots, b_N) = (a_1^*, \ldots, a_N^*, P_c)$ can then be used to clear the market:

$$\begin{cases} a_i^* = b_i(P_c; \theta_i) \text{ for all } i = 1, \ldots, N & (11) \\ P_c = \min\{\overline{P}, P^*\} & (12) \\ P^* = C'\left(\sum_{i=1}^N a_i^*\right) & (13) \\ b(\overline{P}, \theta) = D & (14) \end{cases}$$

where C' represents the derivative of the cost function $C(\bullet)$, and the market price $P_c$ is the smaller of $P^*$ and $\overline{P}$. According to (13) and (14), $P^*$ is the marginal production cost of procuring $\Sigma_{i=1}^N a_i^*$ amount of energy, while $\overline{P}$ is the energy price at which the aggregated demand is equal to the feeder capacity. One might think that social welfare is maximized when the market price equals the marginal production cost, $P_c=P^*$. However, in equation (14), the function b is non-increasing with respect to price, which indicates that any feasible price that respects the feeder power constraint should be greater than $\overline{P}$. Therefore, in the proposed outcome function, the clearing price equals to $P^*$ whenever $P^*>\overline{P}$, ad equals to $\overline{P}$ otherwise. When the energy price is determined, the allocation exactly follows the user bids, i.e., $a_i^*=b_i(P_c; \theta_i)$.

The following discussing illustrates some properties of the mechanism discussed above.

Proposition 1:

When each user is a price taker, the strategy profile $(h_1(\bullet; \theta 1), \ldots, h_N(\bullet; \theta_N))$ is a dominant strategy equilibrium of the proposed mechanism $\Gamma^*$.

Proof:

It suffices to prove that submitting $h_i$ maximizes the individual utility, which is defined as $V_i(a_i; \theta_i)-P_c a_i$. It should be noted that $P_c$ is not affected by the bids under the price taker assumption. Therefore, if suffices to prove that bidding $h_i$ results in an energy allocation, $a_i^*$, that satisfies $a_i^* = \arg\max_{0 \leq a_i \leq E_i^m} [V_i(a_i; \theta_i)-P_c a_i]$. In other words, solve for $a_i^*=h_i(P_c; \theta_i)$. According to (11), if we $b_i=h_i$, then the proof is complete.

Remark 4:

The result of Proposition 1 only holds when there are a large population of users such that the influence of an individual user on the market price is negligible. In other cases (such as an oligopolistic market), the mechanism needs to be designed differently. In addition, the price taker assumption does not indicate that individual can not affect his utility via his bid. Instead, it only suggests that the bid from an individual consumer does not affect the market price $P_c$. Notice that the utility function not only depends on $P_c$ but also depends on $a_i$. Under the price taker assumption, the consumer can still affect $a_i$ via its bid, which further determines the consumer utility.

In the proposed mechanism, the optimal bid of each user does not depend on the bidding decisions of others. Therefore, if the bidding decision of one user has to depend on the action of another, then the equilibrium strategy cannot be achieved unless all the users have accurate predictions on other user's action, which may not be a reasonable assumption. As a result, we can establish the following property of the example mechanism:

Proposition 2:

The proposed mechanism $\Gamma^*$ implements the social choice function $f^*(\bullet)$.

The proposed pricing strategy maximizes the social welfare subject to the feeder power constraint. Roughly speaking, one can view the result as clearing the market at the intersection point of the market demand curve and the market supply curve (the feeder power constraint can be regarded as the case of limited supply).

G. Example Bidding Strategy

The proposed mechanism provides a general solution to the coordination problem formulated in this paper. In real-world applications, directly submitting function $h_i$ requires considerable communication resources, and might impinge on customer privacy. To simplify the message space and reduce the communication overhead, we consider the thermal dynamics of TCLs, which can be captured by the second-order Equivalent Thermal Parameter (ETP) model:

$$\dot{\eta}_i(t) = \begin{cases} A_i \eta_i(t) + B_{on}^i & \text{if } q_i(t) = 1 \\ A_i \eta_i(t) + B_{off}^i & \text{if } q_i(t) = 0 \end{cases} \quad (15)$$

where $n/(t)$ consists of the air temperature and the inner mass temperature, $q/(t)$ is the "on/off" state of the TCL, and the model parameters include $A_i$, $B_{on}^i$ and $B_{off}^i$, i.e., $\theta_i^m = [A_i, B_{on}^i, B_{off}^i]^T$. The optimal energy allocation function, $h_i$, corresponding to the ETP model is shown in FIG. 8.

Remark 5:

The ETP model uses ordinary differential equations to describe the thermal behaviors of the buildings, and is widely used in the literature to characterize the energy performance of the TCLs. It can be categorized in two forms: first-order ETP model and second-order ETP model. The first-order model only considers the air temperature, and can be regarded as a special case of the second-order model, where the inner mass temperature is also taken into account. While the first-order ETP model is appropriate for small TCLs, such as refrigerators, it is not appropriate for HVAC systems, which have a large heat capacity due to furnishing and building material.

Due to the complicated nature of the hybrid system dynamics, directly submitting the function $h_i$ may require considerable communication resources in the real time implementation. To reduce the message space, $h_i$ is approximated with a step function as illustrated in FIG. 11, where $c_1$ and $c_2$ are computed based on the control setpoint and consumer type. For notational convenience, define $c_1 = e_i(u_1, \theta_i)$ and $c_2 = e_i(u_2, \theta_i)$, where $u_1$ and $u_2$ are the temperature setpoint control corresponding to $c_1$ and $c_2$, respectively. For example, using the second-order ETP model and control policy, $u_1$ and $u_2$ for the ith device can be obtained as:

$$\begin{cases} u_1 = T_c^i(t_k) + \delta/2 \\ u_2 = L A_i^{-1} e^{A_i T}(A_i \eta_i(t_k) + B_{on}^i) - L A_i^{-1} B_{on}^i + \delta/2 \end{cases} \quad (16)$$

where $L=[1,0]$, where $T_c^i(t_k)$ is the current air temperature and $\delta$ is the control deadband, and the power state of the ith TCL is "on" at $t_k$.

The step function (in FIG. 11 can be fully characterized by two scalars: $P_{bid}^1$ and $Q_{bid}^1$, where $P_{bid}^1$ is the middle point of $c_1$ and $c_2$, while $Q_{bid}^1$ is the power consumption when the device is on during the market period. In this case, the message space of each user $M_i$ is reduced from a function space to a space of $\mathbb{R}_+^2$, and each bid is of the form $[P_{bid}^1, Q_{bid}^1]$.

In some examples, the bidding strategy assumes complete knowledge of ETP model parameters. In practice these parameters can be difficult to derive, and the users can only bid based on local measurements (air temperature, "on/off" state). In addition, the ETP model used in the framework may be inaccurate in terms of characterizing the real energy consumption of the TCLs. To address these challenges, we present a joint state and parameter estimation framework is discussed below that enables users to compute bidding prices according to the disclosed technology, even when there is incomplete knowledge of all ETP model parameters.

VIII. Example Determination of Unmeasured Parameters

It can be observed that the bidding strategy discussed above assumes full knowledge of the system state and model parameters. However, in many examples the TCL controller can only measure the air temperature, while the inner mass temperature and the model parameters ($A_i$, $B_{on}^i$, and $B_{off}^i$) are not available. To address this issue, methods are disclosed to estimate the unknown system state and model parameters based on the output measurements.

Figure 12:
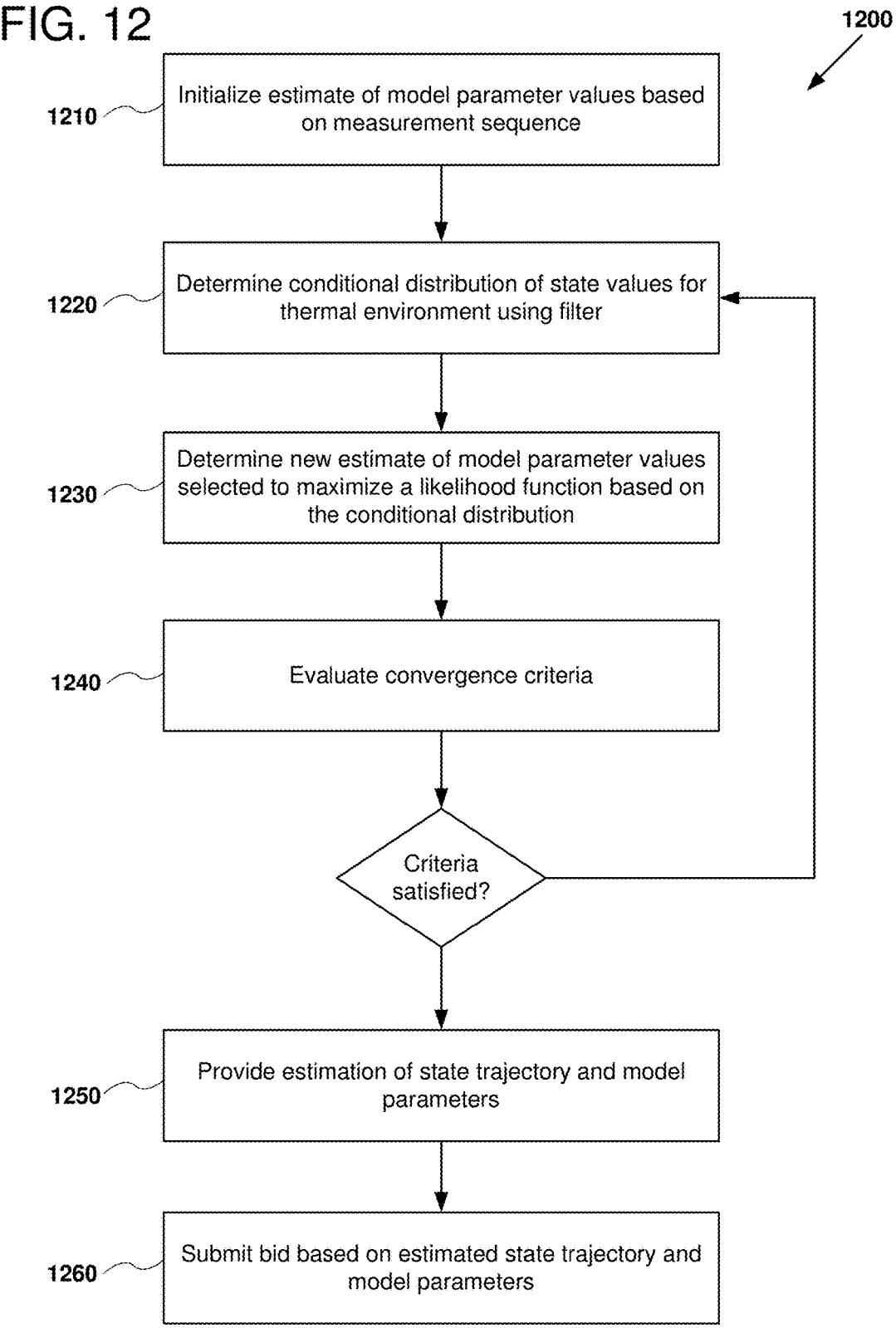
FIG. 12 illustrates an example method of determining unmeasured parameters, as can be performed in some examples of the disclosed technology.

FIG. 12 is a flow chart 1200 outlining an example method of submitting a bid determining by estimating unmeasured model parameter values, as can be performed in certain examples of the disclosed technology. For example, the computing environment 200 discussed above can be used to implement the method outlined in FIG. 12. Further, aspects of the techniques outlined in FIG. 12 can be used in estimating values of unmeasured parameters in process block 810, as discussed above regarding the method of FIG. 8.

At process block 1210, an initial selection for the model parameters, void is made. In some examples, the initial selection is based on default values stored in a computer-readable storage medium coupled to a TCL controller. The default values can be programmed when the controller is manufactured, as part of a firmware or software update, or updating from previous iterations of performing the illustrated methods.

Assume that we have some rough statistical information about the model parameters. Specifically, the system dynamics can be captured with an uncertain discrete dynamic model with Gaussian noise:

$$\begin{cases} \eta_i(t_{k+1}) = \overline{A}_i \eta_i(t_k) + \overline{B}_{on}^i(\overline{B}_{off}^i) + w_n^i \\ y_i(t_k) = L \eta_i(t_k) + v_n^i \end{cases} \quad (17)$$

where $L=[1,0]$, and $y_i(t_k)$ is the output measurement (air temperature). Let $\eta_i(t_1) = m_0^i + \mu_i$ be the initial state ($\mu_1$ is the noise). It can be assumed that all the noise terms follow the Gaussian distributions:

$$\begin{cases} w_n^i \sim \mathcal{N}(w_n^i \mid 0, \Omega_i) \\ v_n^i \sim \mathcal{N}(v_n^i \mid 0, \Sigma_i) \\ \mu_i \sim \mathcal{N}(\mu_i \mid 0, \Phi_0^i) \end{cases} \quad (18)$$

Let $\sigma_i=[\overline{A}_i, \overline{B}_{on}{}^i, \overline{B}_{off}{}^i, \Omega_i, \Sigma_i, m_0{}^i, \Phi_0{}^i]$ be the unknown parameter to be estimated. The problem can be then formulated as estimating $\sigma_i$ base on local measurements, $Y_i=T_c{}^i(t_1), \ldots, T_c{}^i(t_M))$. This can be solved using a two-stage iterative optimization technique for finding a maximum likelihood solution for the unknown parameters. In other words, the disclosed method finds the optimal $\sigma_i$ that maximizes the likelihood function $p(Y_i|\sigma_i)$, where $Y_i=T_c{}^i(t_1), \ldots, T_c{}^i(t_M))$.

After performing an initial estimation of values for a set of model parameters, the method proceeds to process block 1220.

A. Example Determining of a Distribution for System State Vector

At process block 1220, in a first iterative stage (also dubbed "E-step"), a posterior distribution of the state $p(Z_i|Y_i, \sigma_{old})$ is evaluated assuming that all the parameters are known, where $Z_i=(\eta_i(t_1), \ldots, \eta_i(t_M))$. In the second stage (dubbed "M-step"), discussed in further detail below regarding process block 1230, the derived posterior distribution is used to find updates of the estimated parameter $\sigma_i$ selected to substantially maximize the expectation of the logarithm of the complete-data likelihood function, which is:

$$Q(\sigma_i, \sigma_{old}) = \sum_{Z_i} p(Z_i|Y_i, \sigma_{old}) \ln(p(Y_i, Z_i|\sigma_i)) \tag{19}$$

After the update for the parameter estimation is derived in the M step, the updated estimation is applied to $\sigma_{old}$ and the method returns to E-step for another iteration. This technique is iterated until the estimations of the state and parameters converges. An example estimation algorithm for an ETP model can be summarized as follows:

An example technique for determining a distribution for a system state vector (E step) finds a distribution for the system state $\eta_i(t_k)$ conditioned on a full observation sequence, $Y_i=(y_i(t_1), \ldots, y_i(t_M))$, assuming that the model parameters are known as $\sigma_{old}$. This inference problem can be solved efficiently using the sum-product algorithm in two steps: first, the distribution of state $\eta_i(t_k)$ conditioned on a partial observation sequence $(y_i(t_1), \ldots, y_i(t_M))$ can be derived with a Kalman filter; second, the conditional distribution $p(\eta_i(t_k)|Y_i)$ can be found with a Kalman smoother.

Denote $\alpha(\eta_i(t_k))$ as the conditional distribution $p(\eta_i(t_k)|y_i(t_1))$, which satisfies:

$$\hat{\alpha}(\eta_i(t_k)) = \mathcal{N}(\eta_i(t_k)|\mu_k, \Phi_k) \tag{19}$$

In the context of linear-Gaussian systems, the sum-product algorithm gives the following recursion equations:

$$\begin{cases} \mu_k = \overline{A}_i \mu_{k-1} + \overline{B}_i + K_k(y_i(t_k) - L\overline{A}_i \mu_{k-1} - L\overline{B}_i) \\ \Phi_k = (I - K_k L) P_{k-1} \end{cases}$$

where $\overline{B}_i = \overline{B}_{on}{}^i$ if the ith load is "on," and $\overline{B}_i = \overline{B}_{off}{}^i$ otherwise. In this illustrative example, $P_k$ and the Kalman gain matrix are defined as:

$$\begin{cases} P_{k-1} = \overline{A}_i \Phi_{k-1} \overline{A}_i^T + \Omega_i \\ K_k = P_{k-1} L^T (L P_{k-1} L^T + \Sigma_i)^{-1} \end{cases} \tag{20}$$

The initial conditions for the recursion equation is given by:

$$\begin{cases} \mu_1 = m_0 + K_1(y_i(t_1) - Lm_0) \\ \Phi_1 = (I - K_1 L) \Phi_0^i \end{cases} \tag{21}$$

where $$K_1 = \Phi_0^i L^T (L\Phi_0^i L^T + \Sigma_i)^{-1}.$$

With the above recursion equations, the distribution for $\eta_i(t_k)$ can be derived conditioned on the observations from $y_i(t_1)$ to $y_i(t_k)$.

A probability distribution for $\eta_i(t_k)$ given all observations $y_i(t_1)$ to $y_i(t_M)$ can then be determined. Denote the conditional distribution $p(\eta_i(t_k)|Y_i)$ as $\gamma(\eta_i(t_k))$, which satisfies:

$$\gamma(\eta_i(t_k)) = \mathcal{N}(\eta_i(t_k)|\hat{\mu}_k, \hat{\Phi}_k) \tag{22}$$

The sum-product algorithm gives the following recursion equations:

$$\begin{cases} \hat{\mu}_k = \mu_k + J_k(\hat{\mu}_{k+1} - \overline{A}_i \mu_k - \overline{B}_i) \\ \hat{\Phi}_k = \Phi_k + J_k(\hat{\Phi}_{k+1} - P_k) J_k^T \end{cases} \tag{23}$$

where $$J_k = \Phi_k \overline{A}_i^T (P_k)^{-1}.$$

With the recursion equation presented above, the conditional distribution $p(\eta_i(t_k)|Y_i)$ can be computed using backward induction. After a distribution for a system state vector conditioned on the output measurements is determined, the method proceeds to process block 1230.

B. Updating Values for Model Parameters to Maximize Likelihood Function

At process block 1230, values for model parameters to maximize a likelihood function can be determined (M step) by attempting to select a parameter update that maximizes the logarithm of a complete-data likelihood function (19). Equation (19) indicates that aside from the conditional distribution $p(\eta_i(t_k)|Y_i, \theta_{old})$ (which can be obtained by determining a distribution for a system state vector conditioned on the output measurements), the likelihood function also depends on a joint distribution $p(Z_i, Y_i|\sigma_i)$, as given by:

$$\ln p(Z_i, Y_i|\sigma_i) = \sum_{k=2}^{M} \ln p(\eta_i(t_k)|\eta_i(t_{k-1}), \overline{A}_i, \overline{B}_i, \Omega_i) + \sum_{k=1}^{M} \ln p(y_i(t_k)|\eta_i(t_k), L, \Sigma_i) + \ln p(\eta_i(t_1)|m_0^i, \Phi_0^i) \tag{24}$$

where the dependence of the joint distribution on the unknown model parameters is made explicit. The complete-data likelihood function $Q(\sigma_i, \sigma_{old})$ can be then obtained by taking the expectation of (24) over $Z_i$ using the posterior distribution $p(\eta_i(t_k)|Y_i, \theta_{old})$ derived in at process block ___.

Let $\overline{A}_i', \overline{B}_{i,on}', \overline{B}_{i,off}', \Omega_i', \Sigma_i', m_0', \Phi_0')$ be the update of the unknown parameter at process block 1220: $\sigma_i' = \arg \max_{\sigma_i} Q(\sigma_i, \sigma_{old})$. An explicit formula for each component of $\sigma_i'$ is given as follows:

(i) Maximizing Equation (19) over $m_0^i$ and $\Phi_0$, the updates can be derived as:

$$\begin{cases} m'_0 = \mathbb{E}[\eta_i(t_1)] \\ \Phi'_0 = \mathbb{E}[\eta_i(t_1)\eta_i(t_1)^T] - \mathbb{E}[\eta_i(t_1)]\mathbb{E}[\eta_i(t_1)^T] \end{cases}$$

(ii) Maximizing the likelihood function (19) over $\bar{A}_i$, the update of $\bar{A}_i$ is given by:

$$\bar{A}'_i = \left(\sum_{k=1}^{M} \mathbb{E}[\eta_i(t_k)\eta_i(t_{k-1})^T] - \bar{B}_i\mathbb{E}[\eta_i(t_{k-1})^T]\right) \times \left(\sum_{k=1}^{M} \mathbb{E}[\eta_i(t_k)\eta_i(t_{k-1})^T]\right)^{-1} \quad (25)$$

(iii) Maximizing the likelihood function (19) over $\bar{B}_{on}^i$ and $\bar{B}_{off}^i$. The updates are given as:

$$\begin{cases} \bar{B}'_{i,on} = \vartheta_1 \sum_{k \in M1} (\mathbb{E}[\eta_i(t_k)] - \bar{A}'_i\mathbb{E}[\eta_i(t_{k-1})]) \\ \bar{B}'_{i,off} = \vartheta_2 \sum_{k \in M2} (\mathbb{E}[\eta_i(t_k)] - \bar{A}'_i\mathbb{E}[\eta_i(t_{k-1})]) \end{cases} \quad (26)$$

where $M1 \subseteq \{1, 2, \ldots, M\}$ denotes the time instants when the system is on, and $\vartheta_{on}$ represents the size of $M_1$. $M_2$ and $\theta_{on}$ are defined similarly.

(iv) The update function for $\Omega_i$, can also be derived by maximizing the likelihood function with respect to $\Omega_i$, which gives:

$$\Omega'_i = \frac{1}{M-1} \sum_{k=2}^{M} \{\bar{A}'_i\mathbb{E}[\eta_i(t_{k-1})\eta_i(t_{k-1})^T]\bar{A}'^T_i + \mathbb{E}[\eta_i(t_k)\eta_i(t_k)^T] - \bar{A}'_i\mathbb{E}[\eta_i(t_{k-1})\eta_i(t_k)^T] - \mathbb{E}[\eta_i(t_k)\eta_i(t_{k-1})^T]\bar{A}'_i\} \quad (27)$$

(v) The update for $\Sigma_i$ can also be obtained similarly:

$$\Sigma'_i = \frac{1}{M} \sum_{k=1}^{M} \{y_i(t_k)y_i(t_k)^T - L\mathbb{E}[\eta_i(t_k)]y_i(t_k)^T - y_i(t_k)\mathbb{E}[\eta_i(t_k)^T]L + L\mathbb{E}[\eta_i(t_k)\eta_i(t_k)^T]L\} \quad (28)$$

In the above update equations, $E[\eta_i(t_k)(\eta_i(t_k)^T]$ can be computed based on the conditional distribution $p(\eta_i(t_k)|Y_i)$ obtained at process block 1220, while the pairwise expectation $E[\eta_i(t_k)(\eta_i(t_{-1})^T]$ can be derived using Bayesian Theorem. The expressions for these expectations are as follows:

$$\begin{cases} \mathbb{E}[\eta_i(t_k)] = \hat{\mu}_k \\ \mathbb{E}[\eta_i(t_k)\eta_i(t_{k-1})^T] = J_{k-1}\hat{\Phi}_k + \hat{\mu}_k\hat{\mu}_{k-1} \\ \mathbb{E}[\eta_i(t_k)\eta_i(t_k)^T] = \hat{\Phi}_k + \hat{\mu}_k\hat{\mu}_k^T \end{cases} \quad (29)$$

After the estimate of model parameter values has been determined and updated (e.g., after the second iteration, the initial estimate of values is updated with $\sigma_i'$. Thus, after the update $\sigma_i'$ of the estimated parameter is derived, the updated estimation parameter is assigned to $\sigma_{old}$. The method proceeds to process block 1240.

At process block 1240, convergence criteria for the method are evaluated to determine whether another iteration should be performed. For example, the convergence criteria can evaluate whether the model parameters are converging to a stable value by comparing update model parameters to previous values. In some examples, a predefined amount of change in criteria is used to determine that the model values are sufficiently converged.

If the evaluated convergence criteria are not satisfied, the method proceeds back to process block 1220 to perform another iteration of determining a conditional distribution of a set of state values for the thermal environment and determining new values for the set of model parameters selected to maximize a likelihood function based on the conditional distribution. repeating the determining the conditional distribution and the determining new values for the set of model parameters until the set of convergence criteria is met. Once it is determined that the convergence criteria have been satisfied, the method proceeds to process block 1250.

At process block 1250, once the estimation for $\sigma_i$ is obtained, the estimated state trajectory and/or updated model parameters are provided, which can be used to determine an energy response to perform bid generation. For example, the Example Bidding Strategy discussed above at part VII.G can be used to determine an energy response (or approximated energy response), and a bid quantity and price are determined. After determining a bid based on the estimated state trajectory and/or updated model parameters, the method proceeds to process block 1260.

At process block 1260, the bid determined at process block 1250 is submitted to a market coordinator. For example, the example method outlined above with respect to FIG. 8 outlines suitable techniques and apparatus for sending bids to a market coordinator, receiving a clearing price, and operating a load responsive to the clearing price.

IX. Experimental Results

This section applies an example disclosed market mechanism and the learning scheme to a TCL coordination problem, and presents simulation results to demonstrate the effectiveness of the proposed market mechanism. The simulation results were performed on a model similar to that illustrated in the diagram of FIG. 1. Further, the overall mechanism design framework is validated through extensive numerical simulations based on real weather and price data. In the simulations, the proposed mechanism is compared with other coordination approaches, and sensitivity analysis is conducted for a few important parameters to evaluate the performance of the proposed approach in different scenarios. Simulation results demonstrate that the disclosed coordination frameworks can accurately achieve the desired load responses and improve the operation efficiency of the power gird in an economically feasible way.

A. Simulation Setup

A realistic scenario is considered where each consumer is equipped with a smart thermostat that can measure the room temperature and communicate to the market coordinator. At each period, the TCL controller device measures the current room temperature and submits a bidding price based on a bidding curve. The coordinator collects all the user bids and clears the energy market with a price. Each device will then determine the control setpoint in response to this energy price, which modifies the load dynamics and affects the bids for the next period. This framework is validated in MATLAB using parameters generated in GridLab-D.

A second-order ETP model is used to capture the load dynamics of the TCLs. The ETP model parameters depend on various building parameters, such as glass type, floor area, area per floor, glazing layers and material, etc. In the simulation, 1000 sets of building parameters are generated. A few parameters are randomly, while the rest take their default values from GridLAB-D. Throughout the example simulation, the aggregated power of the unresponsive loads is assumed to be 12 MW, and the feeder power capacity is 15 MW.

Weather data and the Typical Meteorological Year (TMY2) data for Columbus, Ohio, which includes air temperature and solar radiation were. The wholesale energy prices are from the PJM market. The prices are modified to a retail rate in $1 per kWh plus a retail modifier; this retail price is used as the base price.

First the proposed mechanism is evaluated in the deterministic case, where each user can accurately estimate the unknown parameters. Each user submits a bid (e.g., as described above regarding FIG. 11) and the market is cleared (e.g., using a method similar to that discussed above regarding FIG. 4). Air temperature record is on Aug. 20 (mild day), 2009 in Columbus, Ohio, and the aggregated power trajectory is presented in FIG. 13.

Figure 13:
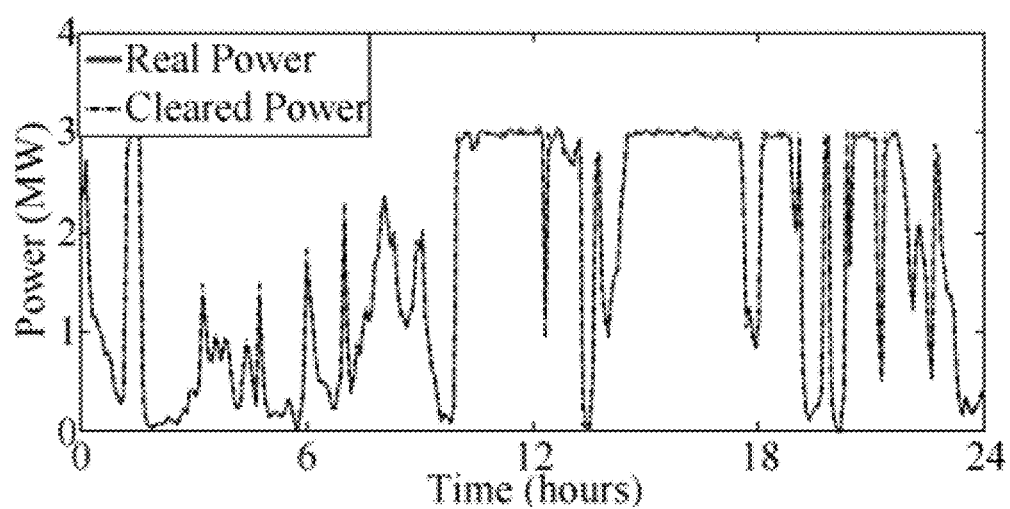
FIGS. 13-28 are a series of charts illustrating results generated according to exemplary simulations of disclosed bidding and price clearing techniques.
Figure 14:
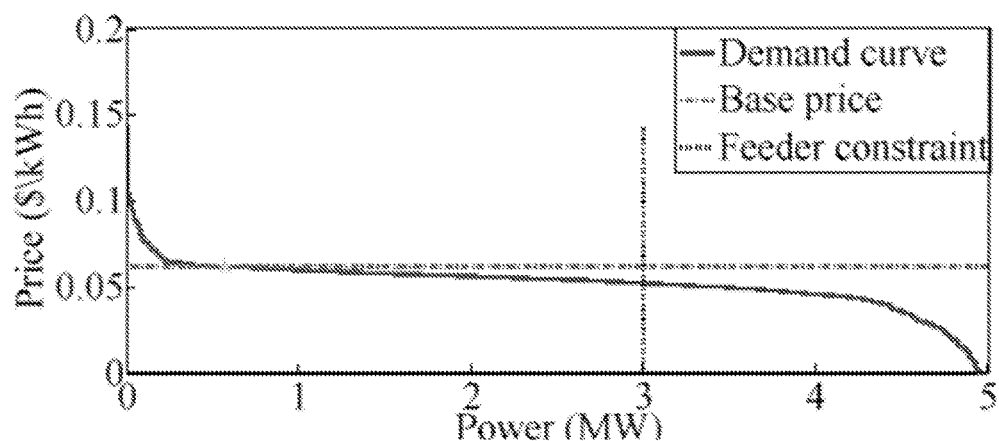
Figure 15:
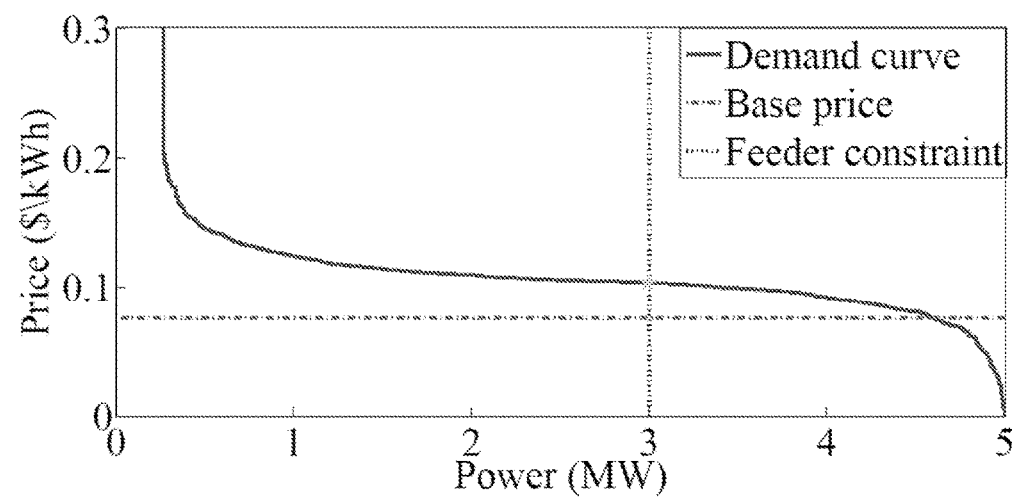

FIG. 13 shows that the power trajectory is effectively capped below the feeder power capacity for the entire day. Notice that whenever the coordinator clears the market with an energy price, there is a corresponding power on the aggregated demand curve. This can be called the cleared power, which stands for the coordinator's estimation on the aggregated power consumption before the market is cleared. Simulation result demonstrates that this cleared power accurately matches the real power consumption. This enables the coordinator to select proper prices to effectively achieve the desired aggregated power consumption. To demonstrate how it works, we randomly choose two market periods and present their market clearing procedures in FIGS. 14 and 15, respectively. When there is no power congestion, the coordinator can directly pass the base price to individual users. This case is shown in FIG. 14, which corresponds to 08:20 AM. When the power congestion occurs, the coordinator should clear the market at the intersection of the aggregated demand curve and the curve of the feeder power constraint. This case is presented in FIG. 15, which corresponds to 04:40 PM.

Figure 16:
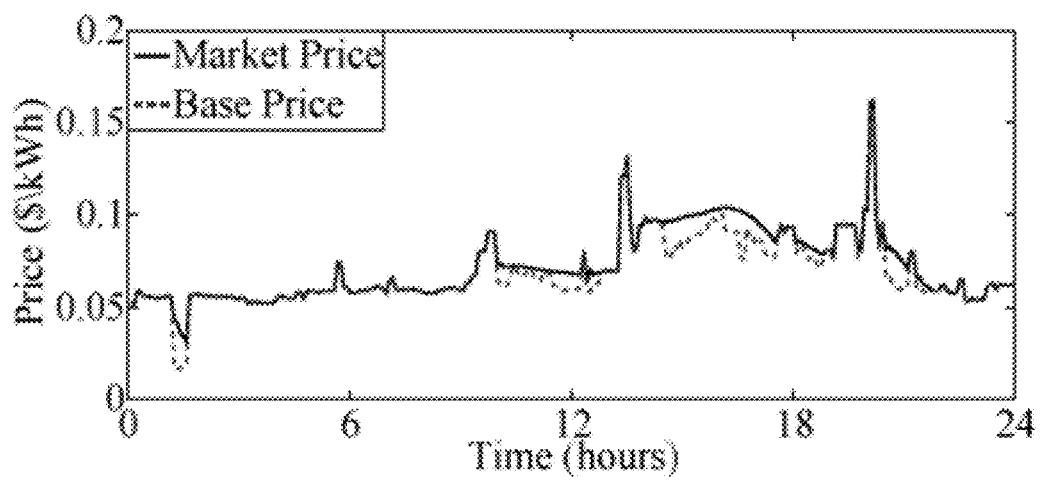

The trajectories of the market clearing price and the base price are shown in FIG. 16. The figure shows that the market-clearing price is equal to the base price when there is no congestion, and is higher than the base price during congestion hours. Notice that when $C'(\alpha) \neq P_{base}$, the market price can be different from base price in uncongested periods as well, where $\alpha$ is the total energy purchased from the wholesale market and $C(\cdot)$ is the cost. In addition, a few price spikes can be observed in the simulation result. However, these spikes are not created by the proposed framework, but instead caused by the fluctuations of the base price.

Figure 17:
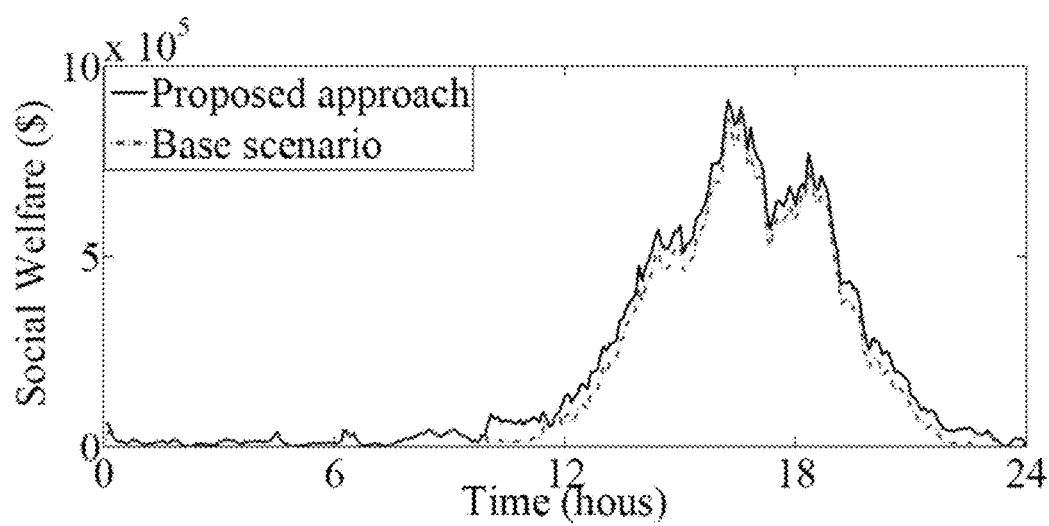

Furthermore, to evaluate the proposed mechanism in terms of social welfare maximization, we compare it with another scenario, where Real Time Pricing (RTP) is adopted to cap the power in a heuristic way. More specifically, when there is no congestion, the market clearing price is equal to the base price. When the power congestion occurs, the clearing price is the base price multiplied by a fixed ratio $\gamma$, which is greater than 1 and can cap the aggregated power below the limit effectively. A number of simulations can be performed to find such ratios, and among all the possible ratios, the minimum one is chosen that can cap the aggregated power below the feeder capacity. Since the social welfare of the two scenarios will be the same during the uncongestion period ($\gamma=1$), the weather data on Aug. 16, 2009, is used where more power congestion can be observed due to the elevated temperature. In this case $\gamma=2.6$, and the social welfare of the two pricing strategies is shown in FIG. 17. The simulation results demonstrate that the proposed optimal pricing strategy always outperforms the base scenario in terms of social welfare. Notice that in this paper we run simulations for different values of $\gamma$ to find the minimum value that can cap the aggregated power. However, this ratio is difficult to derive in practice, and therefore a much more conservative value is typically used to operate the power grid safely. This will further reduce the social welfare of the base scenario.

B. Example Application of an Output-Based Bidding

Figure 18:
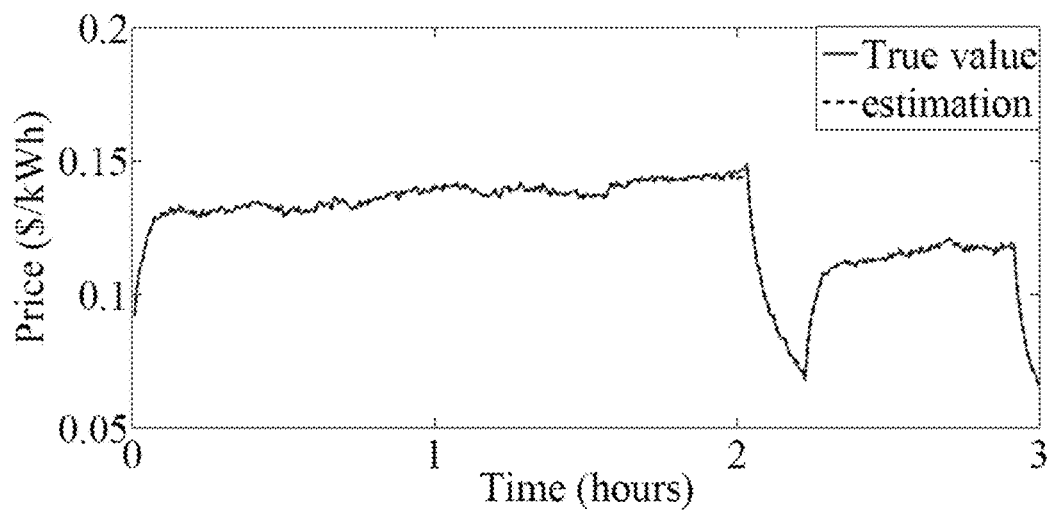

This subsection shows how the proposed output-based bidding algorithm can be used to accurately estimate the bidding prices. In the simulation, it is assumed that each device can locally measure its room temperature every 30 seconds, and store all the measurements for the past 3 hours, in which case M=360. The algorithm is started with an initial guess $\sigma_{old}$ with 10% error. In other words, each element of the initial guess $\sigma_{old}$ is generated by randomly selecting a value between 90% and 110% of its true value. With the estimated parameters derived in the output-based bidding algorithm, each consumer controller can compute the bidding prices. Here a random coordinator in a random market period is chosen and its estimation result is present in FIG. 18. In this figure, the estimated bidding price is derived from the output-based bidding algorithm, while the true bidding price is computed based on the true value of the unknown parameters. It can be seen that the estimated bid closely follows the true value, with an average estimation error less than 1%.

Figure 19:
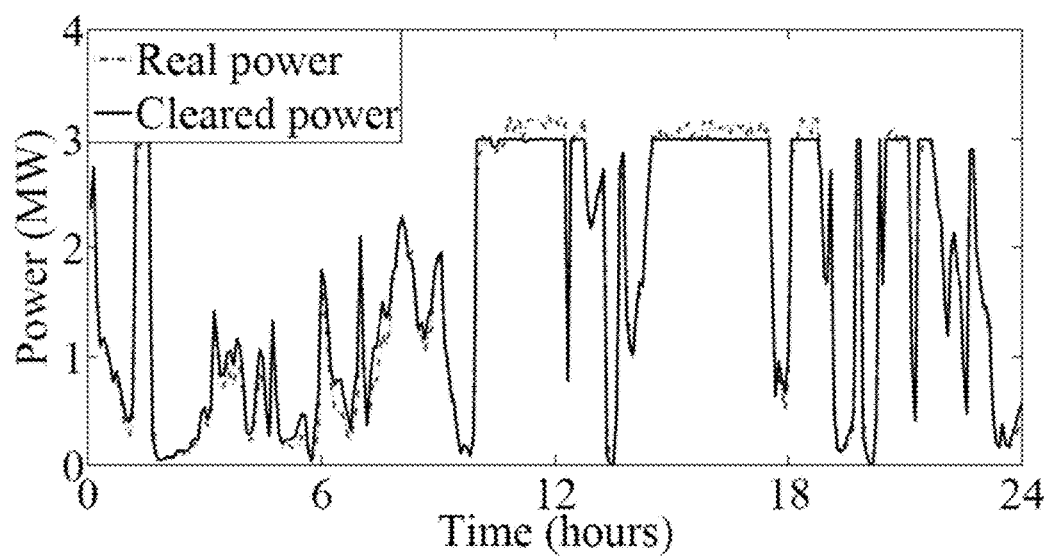

When all the users apply the output-based bidding technique to compute the biding prices, an error (of less than 1%) will be introduced. Next we evaluate how this estimation error can affect the aggregated power response. To implement the estimation framework, each device will locally perform the output-based bidding algorithm during each market period, which just takes 5.5 seconds on a laptop with 2.5 GHz Intel i5 processor and 8G memory. However, it is computationally intensive to do the centralized simulations for all the users over 24 hours to show how the estimation error affects the aggregated power response. For this reason, instead of directly incorporating the output-based bidding algorithm in individual simulations, we add a simulated error of 2% (this simulated error is larger than the actual error of the output-based bidding method) to each controller's bidding price. The simulation results with this bidding error are presented in FIG. 19. It can be seen that the aggregated power is effectively capped below the feeder power capacity during 84% of the time. In the cases where the feeder power constraint is violated, the aggregated power exceeds the power limit by 1.1% on average, and the maximum violation occurred at 4:15 PM, where the power limit is exceeded by 3.3%. Notice that these small violations can be easily fixed by adjusting the feeder power constraint in the formulation to be slightly more conservative.

C. Comparison with Other Strategies

Figure 20:
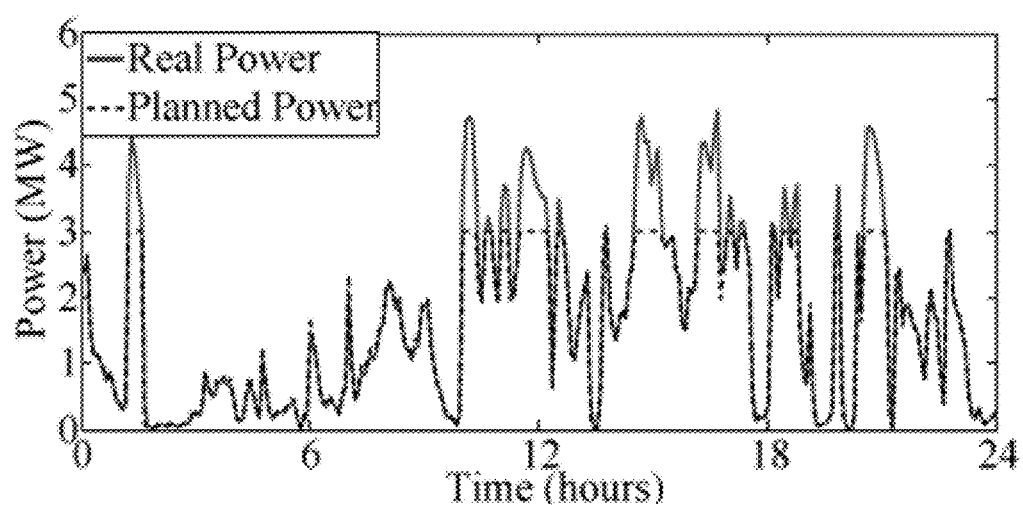
Figure 21:
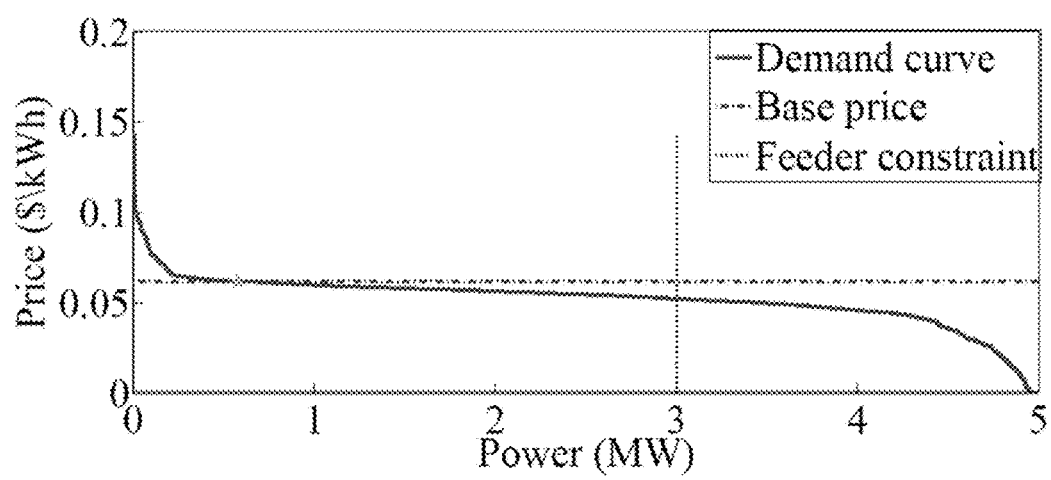
Figure 22:
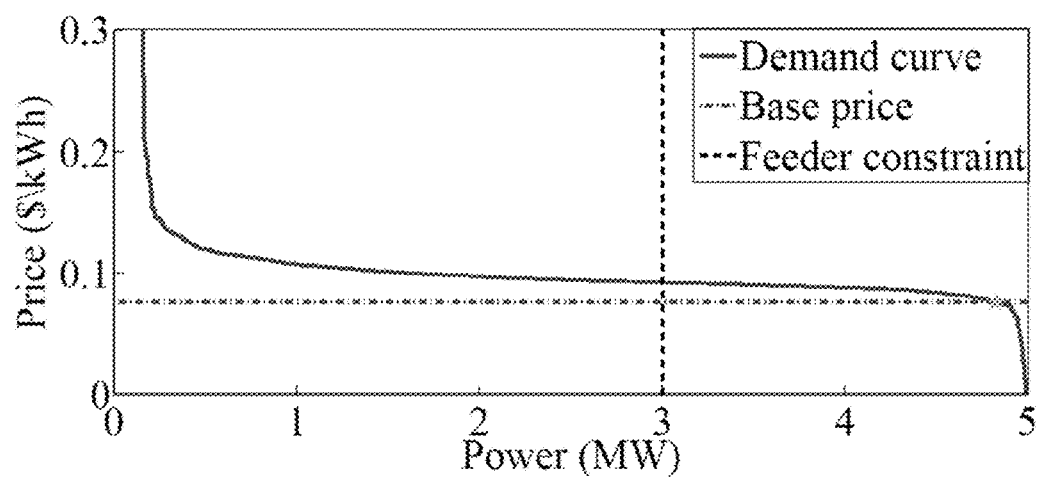

In this subsection we first compare the proposed mechanism with Real Time Pricing (RTP). RTP can incentivize users to shift demand from high price periods to low price periods to reduce electricity expenditures. However, as such an approach directly passes the base price to the retail market, it does not typically achieve predictable and reliable aggregated power response, which is essential in many demand response programs. To illustrate these limitations, we compare the example simulation approach with RTP by applying RTP in the considered problem. In this simulation the coordinator clears the market by directly passing the base price to individual users, and the devices respond to the energy price according to the response curve described in the companion paper. Except for the pricing strategy, all the parameters are the same as in the simulation in subsection IX.B, and the result is presented in FIG. 20. When there is no congestion, the real time pricing scheme has the same performance as the proposed mechanism, and efficient energy allocation can be achieved. However, during the power congestion period, the RTP method cannot prevent the aggregated power from exceeding the feeder power limit. The detailed market clearing process is presented in FIGS. 21 and 22, which correspond to 8:20 AM and 4:40 PM, respectively. In these examples, the market is always cleared at the intersection point of the curve of base price and the demand curve. In the case of FIG. 21, this clearing point happens to be on the left side of the feeder constraint curve, indicating that the feeder power constraint is respected. However, due to the increased power demand in the afternoon, the market clearing point in FIG. 22 exceeds the feeder power limit. This issue is solved in the proposed mechanism with an elevated energy price during power congestion.

Figure 23:
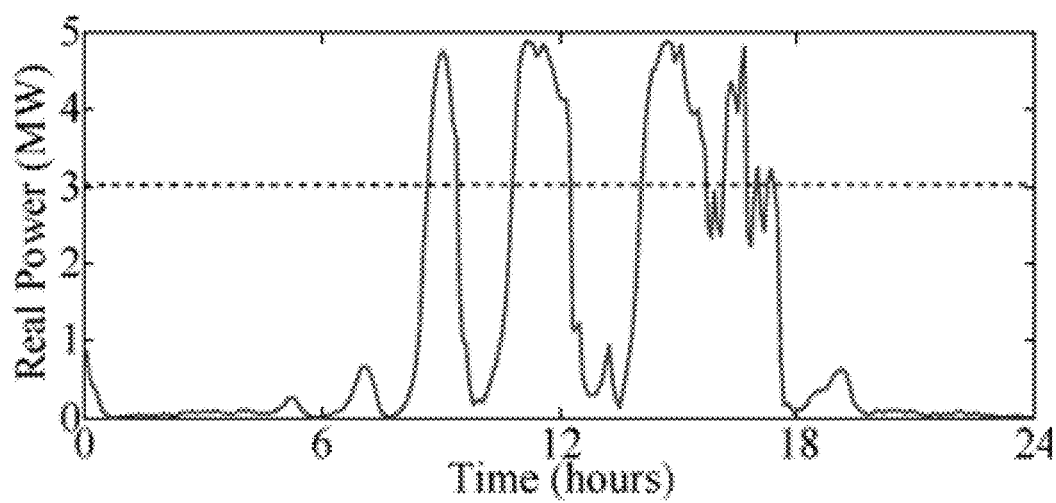

In addition, the proposed mechanism is also compared with another base scenario simulation. In that simulation, the market clearing strategies of the two cases are the same, while the bidding strategies are different. In the base scenario, each device submits a bid based on the current temperature, while the device in the proposed mechanism computes the bid according to FIG. 11. Except for the bidding strategy, all the parameters are the same as in the simulation discussed above for section IX.B, and the result of the base scenario is presented in FIG. 23. In this case, the consumer controller bids only depend on the room temperature, and the information regarding the model parameter is missing. Therefore, although the same pricing strategy is applied, the coordinator does not achieve the desired aggregated power response.

D. Effect of Adjusting Certain Parameters

This subsection discusses how adjusting certain parameters can affect the performance of disclosed methods for bidding and clearing prices.

Number of Households:

In this subsection we use numerical simulations to investigate to what extent the assumption that every consumer is a price taker can be justified. In particular, the influence of an individual bid on the market price is simulated to show how this influence changes with the growing number of participating households. This can be done by perturbing the bidding price of a user i, and observing how the market price changes with this perturbation while the bids of all the other users remain the same. It can be verified that under an example clearing strategy (e.g., as discussed above regarding FIG. 4), the user bid affects the market price in two ways: by changing the market price by a fixed value (regardless of how big the perturbation is), by having or no influence at all. To quantitatively represent this market influence, we define an influence index, which is the maximum market price change (in percentage) that a user could incur by perturbing its bidding price. When the individual bid has no influence on the market clearing price, the influence index is zero, and the price-taker assumption holds.

The simulation can be done in the following steps. First, randomly choose a group of users (e.g., 100 users) and a market period, simulate the market bidding and clearing process, and derive the corresponding market clearing price. Second, choose one user from this group, perturb his bid, and rerun the market clearing process to obtain another market price. Third, compute the influence index based on the market clearing prices derived from the first two steps. Fourth, enlarge the group and repeat all the procedures described above. Notice that when there is no congestion, the clearing price is the base price, and the influence index is zero (0). Therefore, the simulations are done in a market period during which power congestion occurs. In addition, to enforce a fair comparison, we assume that the feeder power constraint changes according to the number of participating household. For example, if the maximum power of each air conditioning load is 5 kW, and there are N loads in the project, then the maximum aggregated power is 5N kW, and the feeder power capacity is 60% of the maximum power, 3N kW.

Figure 24:
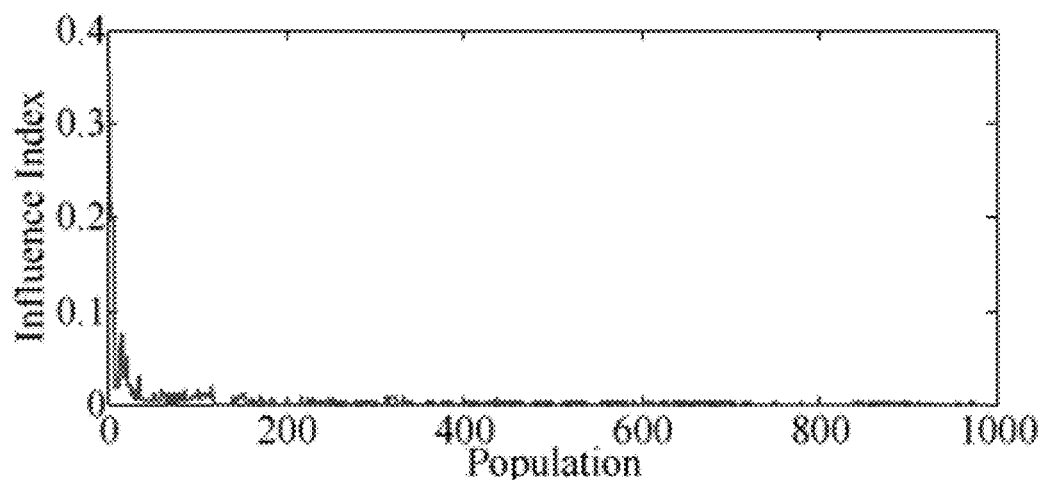

The simulation result is shown in FIG. 24. It starts with 10 users and the inference index in this case is around 35%. This influence drops rapidly as the number of the participating loads increases. When there are more than 200 loads, the influence index is always less than 1%. When the population size is larger than 500, the inference index is less than 0.4%, in which case the influence of individual users on the market price can be safely neglected.

Figure 25:
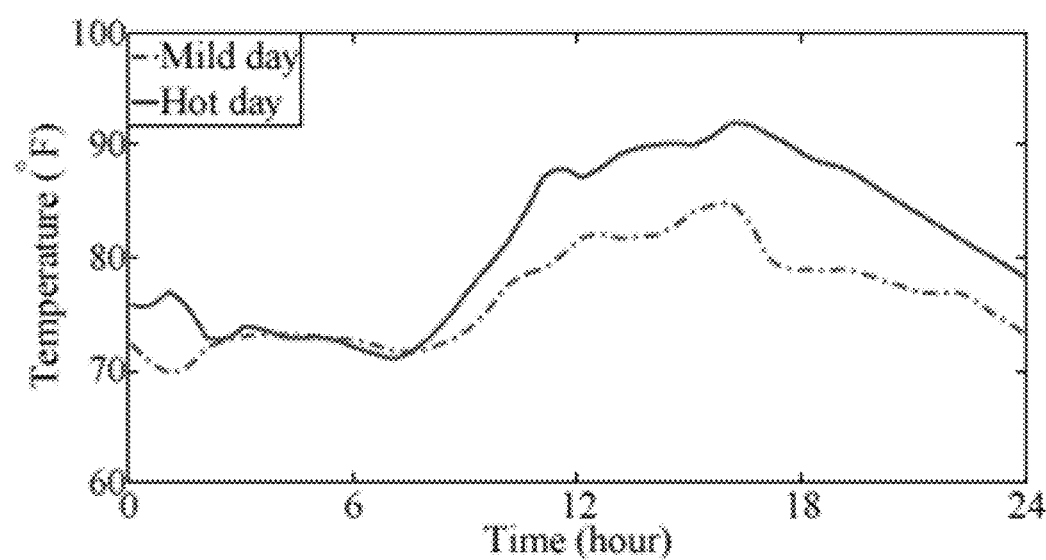

Weather Information:

Aside from the number of participating households, the outside temperature data is also an important parameter that affects the performance of the proposed mechanism. The high temperature period can significantly increase the aggregated power demand of the air conditioning loads, and therefore cause more power congestion. For this reason, we evaluate the proposed method with a different temperature record. The data is obtained for Aug. 16 (hot day), 2009 in Columbus, Ohio, as shown in FIG. 25, a relatively hot day.

Figure 26:
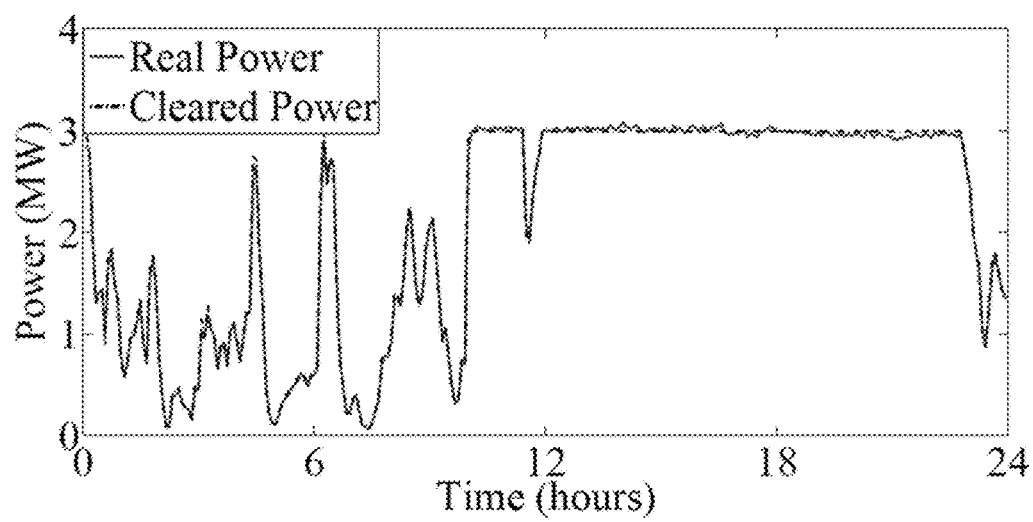
Figure 27:
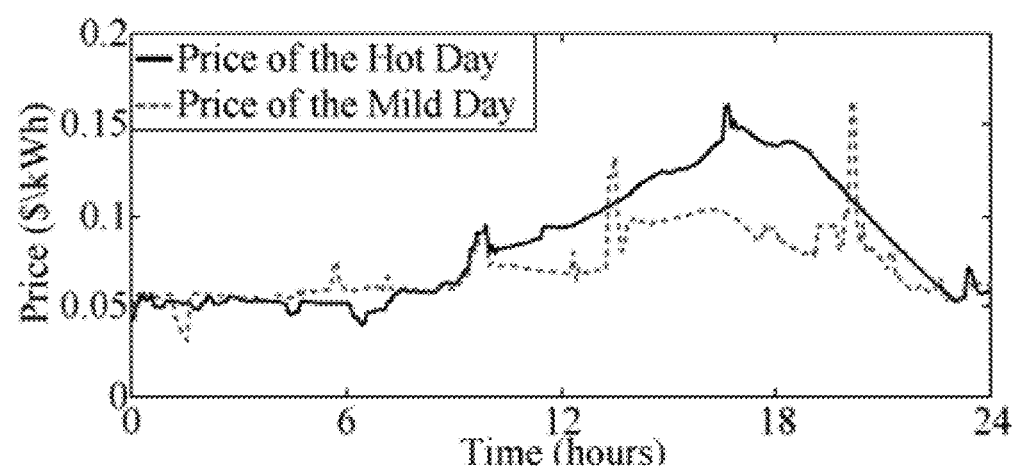

The power trajectory and the market clearing prices are presented in FIGS. 26 and 27, respectively. Since the elevated temperature increases the power demand, much more power congestion can be observed during the hot day. Despite the power congestion, the simulation result shows that the proposed framework can still effectively cap the aggregated power below the power limit, and the real power accurately matches the planned power.

Figure 28:
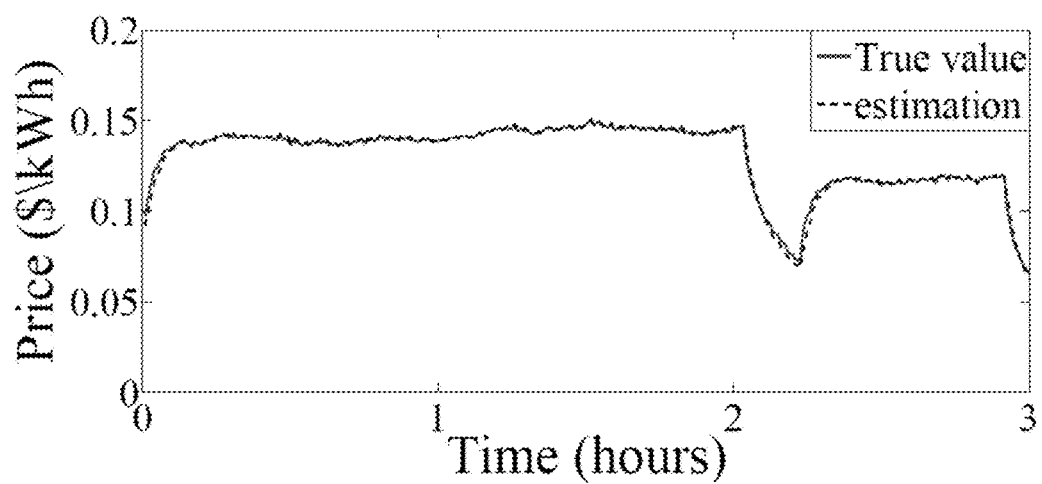

Initial Guess of the Output-Based Bidding Algorithm:

The initial guess of the output-based bidding algorithm also affects performance of the estimation result. In the previous simulations discussed above, the initial guess is generated by randomly selecting a value between 90% and 110% of its true value. Therefore, to implement the output-based bidding algorithm, we assume that users have some prior knowledge of the unknown parameters to guarantee that initial guess is within this range (from 90% to 110%) of the true value). In particular, we use the same model parameters, and gradually increase the error of the initial guess to evaluate the corresponding estimation performance. An estimation result is shown in FIG. 28, where the initial guess has an error of ±30%. Further simulation shows that the output-based bidding algorithm can accurately estimate the bidding prices when the error of the initial guess is less than or equal to, for example, 30%.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method of operating a load coupled to a thermal environment with power received from a power grid by submitting bids to a coordinator, the method comprising:
estimating a set of values for one or more unmeasured parameters of the thermal environment based at least in part on a plurality of output measurements of the thermal environment;
determining an energy response function that relates price data to quantity data for power to be consumed by the load based on the estimated set of values for the unmeasured parameters; and
transmitting a bid for power for a finite time period based on the determined energy response function to the coordinator, the bid indicating one price and one corresponding quantity of power.

2. The method of claim 1, further comprising receiving a clearing price from the coordinator responsive to the transmitted bid, the clearing price being based at least in part on the transmitted bid and on bids received from a plurality of additional loads; and
responsive to the received clearing price, determining to send power received from the power grid to the load.

3. The method of claim 1, wherein the estimating comprises determining a distribution for a system state vector based in part on the output measurements, the output measurements including a time-ordered sequence of air temperatures, the system state vector being based in part on values determined for one or more model parameters.

4. The method of claim 1, wherein the estimating comprises updating a set of values for one or more model parameters to substantially maximize a likelihood function.

5. The method of claim 1, wherein the energy response function is determined based at least in part on the following: a measured air temperature, a control deadband value, and the set of unmeasured parameters.

6. The method of claim 1, wherein the set of values for the one or more unmeasured parameters is determined using an equivalent thermal parameter model to estimate an inner mass temperature of the thermal environment.

7. The method of claim 1, further comprising estimating a state trajectory, wherein the determining the energy response function is based at least in part on the state trajectory.

8. The method of claim 1, wherein the estimating the parameters comprises:
performing an initial estimation of values for the one or more unmeasured parameters; and
determining a conditional distribution of a state of the thermal environment using a recursive Bayes filter.

9. The method of claim 8, wherein the recursive Bayes filter is a Kalman filter.

10. The method of claim 1, wherein the estimating the set of values for the unmeasured parameters comprises:
performing an initial estimation of values for a set of model parameters;
determining a conditional distribution of a set of state values for the thermal environment;
determining new values for the set of model parameters selected to maximize a likelihood function based on the conditional distribution;
repeating the determining the conditional distribution and the determining new values for the set of model parameters until a set of convergence criteria is met; and
after the convergence criteria has been met, providing an estimation of state trajectory and an updated set of parameters for determining the energy response function.

11. The method of claim 1, wherein the estimating is performed using means for estimating the set of values.

12. One or more computer-readable storage media storing computer-executable instructions that cause a computer to perform the method of claim 1.

13. A controller for operating a thermostatically-controlled load, the controller comprising:
one or more sensors configured to generate temperature data used to determine the energy response function;
a network adapter configured to transmit the bid to the coordinator;
one or more processors, the thermostatically-controlled load being configured to be activated and/or deactivated responsive to one or more signals received from the processors; and
one or more computer-readable storage media storing computer-executable instructions that cause the controller to perform the method of claim 1.

14. The method of claim 1, wherein the coordinator is configured to send clearing prices for a retail power market to a plurality of controllers configured to operate thermostatically-controlled loads, the coordinator comprising one or more processors configured to, for each of the loads:
receive the transmitted bid;
determine a clearing price for the transmitted bid; and
transmit the clearing price to the load.

15. A method of allocating power, comprising:
receiving one respective bid for power for each of a plurality of loads coupled to a power grid, the bid for each load being generated by a controller coupled to the load based on an energy response function that relates price data to quantity data for power to be consumed by the load, the controller being configured to determine the energy response function by estimating a respective set of values for one or more unmeasured parameters of a thermal environment of each of the loads;
determining a clearing price for the plurality of received bids;
transmitting the clearing price to each of the loads; and
sending power via the power grid to a selected one or more of the loads, the loads being selected based on the received bids and the clearing price.

16. A power grid, comprising:
an electric power distribution system configured to transmit electric power from one or more power sources to a plurality of thermostatically controlled loads; and
a market coordinator configured to perform the method of claim 15.

17. The method of claim 15, wherein the unmeasured parameters comprise an inner mass temperature of the thermal environment.

18. The method of claim 15, further comprising, for each of the plurality of loads:
when the received bid for the load is greater than or equal to the clearing price, activating the load via the controller coupled to the load; and
when the received bid for the load is less than the clearing price, de-activating the load via the controller coupled to the load.

19. A market-based control system configured to coordinate a group of thermostatically controlled loads to achieve system-level objectives with pricing incentives, the system comprising:
- a market coordinator configured to generate clearing price data based on a plurality of bids specifying a quantity and a price for consuming power;
- a plurality of thermostatically controlled loads (TCLs), each of the TCLs being configured to transmit bid data to the market coordinator specifying a bid quantity and a bid price for power received via a power grid for a predetermined time period, the transmitted bid data determined based on an energy response function that relates price data to quantity data for power to be consumed by the load, the energy response function being determined based at least in part on estimating unmeasured parameters for a thermal environment to which each of the respective TCLs is coupled to supply heating or cooling to, each of the TCLs being further configured to consume or not consume power from the power grid based at least in part on the clearing price data and the TCL's respective bid data for the predetermined time period; and
- a computer network configured to transmit the bid data and the clearing price data between the market coordinator and each of the TCLs.

20. The system of claim 19, further comprising the power grid, the power grid being configured to distribute power to the TCLs based at least in part on a market cleared by the market coordinator.

21. The system of claim 19, further comprising a power generation market administrator configured to send wholesale energy price data to the market coordinator, the wholesale energy price data being used at least in part to determine the clearing price data.

22. The system of claim 19, further comprising means for determining the bid quantity and the bid price based at least in part on estimated unmeasured parameters for each TCL's respective thermal environment.

* * * * *